(12) United States Patent
Nishizeki et al.

(10) Patent No.: US 7,169,446 B2
(45) Date of Patent: Jan. 30, 2007

(54) OXETANE COMPOUND, ACTINIC RAY CURABLE COMPOSITION, INK COMPOSITION FOR INK JET RECORDING, AND IMAGE FORMATION METHOD

(75) Inventors: Masato Nishizeki, Hachioji (JP); Kimihiko Okubo, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 253 days.

(21) Appl. No.: 10/861,572

(22) Filed: Jun. 7, 2004

(65) Prior Publication Data

US 2004/0252171 A1 Dec. 16, 2004

(30) Foreign Application Priority Data

Jun. 10, 2003 (JP) ............... 2003-165126

(51) Int. Cl.
*C08G 65/18* (2006.01)
*C09D 11/10* (2006.01)
*B05D 1/26* (2006.01)
*C07D 493/02* (2006.01)

(52) U.S. Cl. ............ 427/466; 522/168; 522/31; 549/510; 549/511

(58) Field of Classification Search ........ 549/510; 522/168; 427/466
See application file for complete search history.

(56) References Cited

U.S. PATENT DOCUMENTS

| | | | |
|---|---|---|---|
| 5,463,084 A | 10/1995 | Crivello et al. | |
| 6,117,944 A * | 9/2000 | Nishikubo et al. | 525/109 |
| 6,124,402 A * | 9/2000 | Nishikubo et al. | 525/109 |
| 6,166,100 A * | 12/2000 | Hiwara et al. | 522/110 |
| 6,232,361 B1 * | 5/2001 | Laksin et al. | 522/84 |
| 6,844,150 B2 * | 1/2005 | Nishikubo et al. | 430/258 |
| 7,014,310 B2 * | 3/2006 | Hirai | 347/102 |
| 2005/0215657 A1 * | 9/2005 | Nishizeki et al. | 522/31 |
| 2005/0234163 A1 * | 10/2005 | Xu | 524/170 |
| 2006/0041032 A1 * | 2/2006 | Crivello | 522/31 |

FOREIGN PATENT DOCUMENTS

JP 2001 181386 7/2001

OTHER PUBLICATIONS

European Search Report.

* cited by examiner

Primary Examiner—Susan Berman
(74) Attorney, Agent, or Firm—Finnegan, Henderson, Farabow, Garrett & Dunner, L.L.P.

(57) ABSTRACT

Disclosed is an oxetane compound represented by the following formula (I), (II), (III), (IV) or (V):

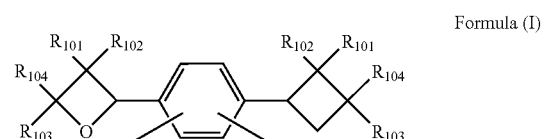

Formula (I)

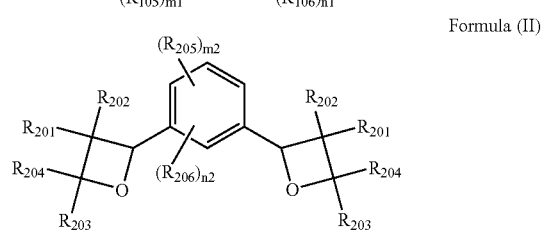

Formula (II)

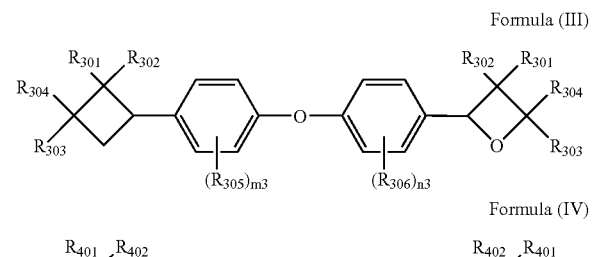

Formula (III)

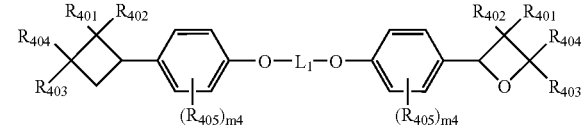

Formula (IV)

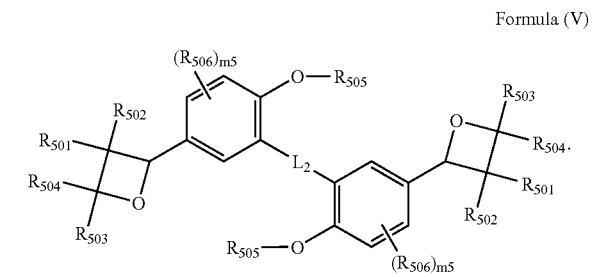

Formula (V)

14 Claims, No Drawings

OXETANE COMPOUND, ACTINIC RAY CURABLE COMPOSITION, INK COMPOSITION FOR INK JET RECORDING, AND IMAGE FORMATION METHOD

FIELD OF THE INVENTION

The present invention relates to an oxetane compound, an actinic ray curable composition containing the oxetane compound, an ink composition for ink jet recording containing the oxetane compound and an image formation method, and particularly to a photocurable ink composition for ink jet recording containing a cation polymerizable oxetane compound with high reactivity which can provide a high quality image, and an image formation method employing the photocurable ink composition.

BACKGROUND OF THE INVENTION

In recent years, an ink jet recording method has found wide application in various kinds of graphic art fields such as photography, various kinds of printing, marking and specific printing such as a color filter, since it can form images easily and inexpensively. Particularly, it has also become possible to obtain image quality comparable to silver salt photograph images by utilizing a recording apparatus, which ejects and controls fine dots; ink in which a color reproduction range, durability and ejection suitability have been improved; and exclusive paper in which ink absorption, color forming property of colorants and surface gloss have been greatly improved. Image quality improvement of an ink jet recording method of today has been achieved only when a complete set of a recording apparatus, ink and exclusive paper is prepared. Image quality improvement of an ink jet recording method of today has been achieved only when a complete set of a recording apparatus, ink and exclusive paper is prepared.

However, an ink jet system which requires exclusive paper is problematic in respect to limitation of a recording medium and cost up of a recording medium. Therefore, many attempts have been made which record on a recording medium different from exclusive paper, employing an ink jet recording. Concretely, there are methods such as a phase-conversion ink jet method utilizing wax which is solid at room temperature, a solvent-type ink jet method utilizing an ink which is mainly comprised of a rapid-drying organic solvent and a UV ink jet method in which an ink is cross-linked by ultraviolet (UV) light after recording.

Among them, a UV ink jet method has been noted recently in respect to odor relatively lower than that of a solvent-type ink jet method, rapid drying property and capability of recording on a recording medium having no ink absorption. Various UV-curable ink jet inks are disclosed (for example, in Japanese Patent Publication Nos. 6-200204 and 2000-504778).

It is known that the UV ink can be divided mainly into a radical polymerization type and a cationic polymerization type. In an ultraviolet curable ink jet recording method, image quality, i.e. the diameter of dots, is controlled by factors such as light exposure timing after ink has been ejected, intensity or energy of exposed light, ink droplet size, photosensitivity of ink, surface energy, ink viscosity, wettability of recording medium, pattern of dots, and error diffusion pattern. Specifically, factors, which mainly affect image quality, are photosensitivity, viscosity, and surface tension of ink, wettability of recording medium, and exposure conditions. In the radical polymerization type, photosensitivity largely depends on ink layer thickness and exposure illuminance, since polymerization is inhibited by oxygen, while in the cationic polymerization type, photosensitivity largely depends on humidity as well as temperature.

In order to minimize the polymerization inhibition due to oxygen In the radical polymerization type, known are a method which employs monomers, initiators and initiation aids which are not influenced by oxygen, and a method in which oxygen purging is performed employing inert gases such as nitrogen.

In order to minimize the humidity dependency in the cation polymerization UV curable ink, known is a method in which ink after ejected is heated (see for example, Japanese Patent O.P.I. Publication No. 2000-137375). Known as cation polymerizable monomers employed in the cation polymerization UV curable ink are an epoxy compound having an oxirane ring, an oxetane compound, and a vinyl ether compound.

In particular, it is known that a combined use of an epoxy compound and an oxetane compound markedly increase polymerization rate. For example, pertinent publications include Toa Gosei Kenkyu Nenpo (Toa Gosei Annual Research Report) TREND No. 2 (1999), "Oxetane Kagobutsu no Hikari Cation Koka System eno Oyo (Application of Oxetane Compounds to Cation Photocurable System of Oxetane Compounds)" and Japanese Patent O.P.I. Publication No. 2679586". Specifically, since the oxetane compound results in excellent heat resistance, adhesive property, and chemical resistance, it is useful to use the oxetane compound together with the epoxy compound which enhances reactivity.

Japanese Patent O.P.I. Publication No. 2001-220526 discloses application of this technique to ultraviolet curable ink jet printing. In recent years, the ultraviolet curable ink jet recording system, in which ink is cured by ultraviolet radiation, has been noted as an image formation method employing a recording medium with less ink absorbability.

Generally, well known and practically used as ultraviolet curable ink is a radical polymerization type ink. On the other hand, cation polymerization type ink exhibits advantages such that polymerization inhibition due to oxygen, as found in the radical polymerization type ink, does not occur, low intensity light sources are usable, unpleasant odors usually generated by acryl monomers are not produced, and components used are less irritant, however, it has not been put into practical use.

The reasons is that the radical polymerization type ink has properties in that photosensitivity markedly decreases under high humidity and depends on temperature. Such an ambience-dependent ink has substantial problems in which image quality varies depending on various ambience.

Japanese Patent O.P.I. Publication No. 2002-137375 discloses a method in which cation polymerization type ink is employed, and ink to have been ejected is heated and subsequently exposed to light. However, from the viewpoint of printer cost and use of low heat resistant components, the use of the heating mechanism does not seem to be preferable. Further, Japanese Patent O.P.I. Publication No. 2001-181386 discloses 2-(4-metoxyphenyl)-3,3-dimethyloxetane as a compound to increase the reaction rate. In an ink composition containing an oxetane compound such as di[1-ethyl(3-oxetanyl)]methyl ether and an alicyclic epoxy compound, the alicyclic epoxy compound can be replaced with the above reaction rate increasing compound. Reactivity of the ink composition in which the alicyclic epoxy compound has been replaced with the above reaction rate increasing compound is equal to that of the ink composition before replaced. However, when low intensity light sources such as a fluorescent lamp are employed, the ink photosensitivity is not sufficient under high humidity ambience.

SUMMARY OF THE INVENTION

The present invention has been made in view of the above. An object of the invention is to provide an actinic ray curable composition and ink composition for ink jet recording, each comprising the oxetane compound of the present invention, which provide excellent curability as well as excellent adhesion to a substrate, and high quality images with no bleeding without being influenced by an ambient humidity, even when exposure was carried out employing a light source with a low light intensity, and to provide an image formation method employing the ink composition for ink jet recording.

DETAILED DESCRIPTION OF THE INVENTION

The above object has been achieved by any one of items 1 through 14 described below.

1. An oxetane compound represented by the following formula (I), (II), (III), (IV) or (V):

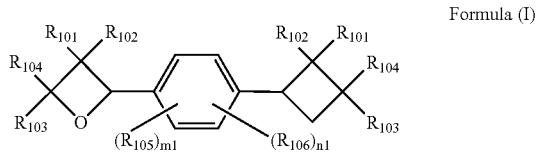

Formula (I)

wherein $R_{101}$ through $R_{104}$ independently represent a hydrogen atom or a substituent; $R_{105}$ represents a substituted or unsubstituted alkoxy group or a substituted or unsubstituted aryloxy group; m1 represents an integer of 0 to 2; $R_{106}$ represents a substituent; and n1 represents an integer of 0 to 3,

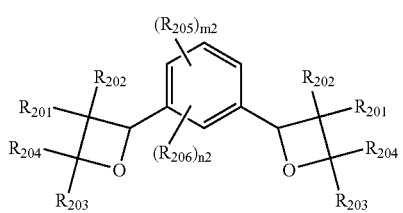

Formula (II)

wherein $R_{201}$ through $R_{204}$ independently represent a hydrogen atom or a substituent; $R_{205}$ represents a substituted or unsubstituted alkoxy group or a substituted or unsubstituted aryloxy group; m2 represents an integer of 0 to 2; $R_{206}$ represents a substituent; and n2 represents an integer of 0 to 3,

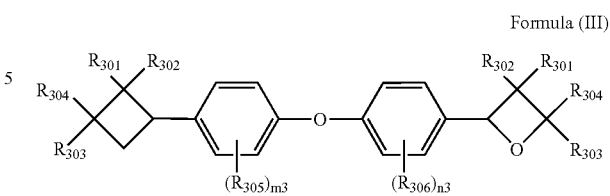

Formula (III)

wherein $R_{301}$ through $R_{304}$ independently represent a hydrogen atom or a substituent; $R_{305}$ through $R_{306}$ independently represent a substituent; and m3 and n3 independently represent an integer of 0 to 4,

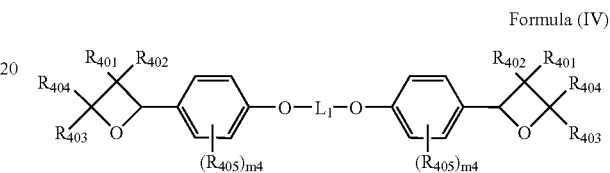

Formula (IV)

wherein $R_{401}$ through $R_{404}$ independently represent a hydrogen atom or a substituent; $R_{405}$ represents a substituent; m4 represents an integer of 0 to 4; and $L_1$ represents a divalent linkage group having a carbon atom number of from 1 to 15, provided that the divalent group may contain an oxygen atom or a sulfur atom in the main chain of the divalent group,

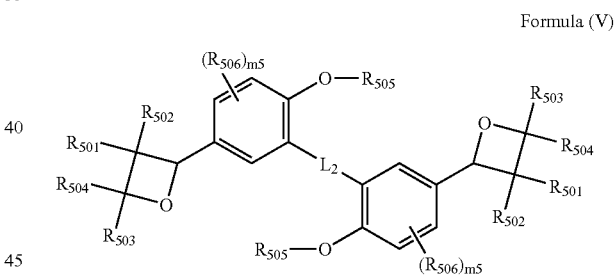

Formula (V)

wherein $R_{501}$ through $R_{504}$ independently represent a hydrogen atom or a substituent; $R_{505}$ represents a substituted or unsubstituted alkyl group; $R_{506}$ represents a substituent; m5 represents an integer of 0 to 3; and $L_2$ represents an oxygen atom or a divalent linkage group having a carbon atom number of from 1 to 15, provided that the divalent group may contain an oxygen atom or a sulfur atom in the main chain of the of the divalent group.

2. The oxetane compound of item 1 above, wherein in formula (I) $R_{101}$ and $R_{102}$ are not simultaneously hydrogens, in formula (II) $R_{201}$ and $R_{202}$ are not simultaneously hydrogens, in formula (III) $R_{301}$ and $R_{302}$ are not simultaneously hydrogens, in formula (IV) $R_{401}$ and $R_{402}$ are not simultaneously hydrogens, and in formula (V) $R_{501}$ and $R_{502}$ are not simultaneously hydrogens.

3. The oxetane compound of item 1 above, wherein in formula (I) $R_{101}$ and $R_{102}$ independently represent a substituted or unsubstituted alkyl group, in formula (II) $R_{201}$ and $R_{202}$ independently represent a substituted or unsubstituted alkyl group, in formula (III) $R_{301}$ and $R_{302}$ independently represent a substituted or unsubstituted alkyl group, in formula (IV) $R_{401}$ and $R_{402}$ independently represent a substituted or unsubstituted alkyl group, and in formula (V) $R_{501}$ and $R_{502}$ independently represent a substituted or unsubstituted alkyl group.

4. An actinic ray curable composition containing a compound generating an acid on irradiation of actinic ray and the oxetane compound represented by formula (I), (II), (III), (IV) or (V) above.

5. The actinic ray curable composition of item 4 above, wherein the compound generating an acid on irradiation of actinic ray is an onium salt.

6. The actinic ray curable composition of item 5 above, wherein the onium salt is a sulfonium salt.

7. The actinic ray curable composition of item 6 above, wherein the sulfonium salt is represented by the following formula (I-1), (I-2) or (I-3):

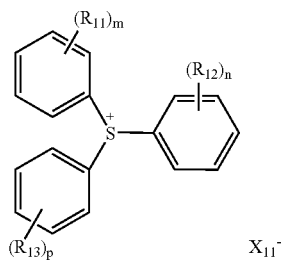

Formula (I-1)

wherein $R_{11}$, $R_{12}$ and $R_{13}$ independently represent a substituent; m, p, and n independently represent an integer of from 0 to 2; and $X^-_{11}$ represents a counter ion,

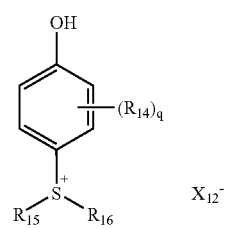

Formula (I-2)

wherein $R_{14}$ represents a substituent; q represents an integer of from 0 to 2; $R_{15}$ and $R_{16}$ independently represent a substituted or unsubstituted alkyl group; a substituted or unsubstituted alkenyl group, a substituted or unsubstituted alkinyl group or a substituted or unsubstituted aryl group; and $X^-_{12}$ represents a counter ion,

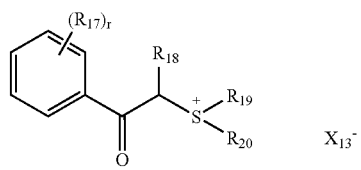

Formula (I-3)

wherein $R_{17}$ represents a substituent; r represents an integer of from 0 to 3; $R_{18}$ represents a hydrogen atom or a substituent; $R_{19}$ and $R_{20}$ independently represent a substituted or unsubstituted alkyl group; a substituted or unsubstituted alkenyl group, a substituted or unsubstituted alkinyl group or a substituted or unsubstituted aryl group; and $X^-_{13}$ represents a counter ion.

8. An ink composition for ink jet recording comprising a compound generating an acid on irradiation of actinic ray and the oxetane compound represented by formula (I), (II), (III), (IV) or (V) above.

9. The ink composition for ink jet recording of item 8 above, further containing an oxetane compound having no substituent at the 2-position of an oxetane ring in the molecule.

10. The ink composition for ink jet recording of item 8 above, further containing a vinyl ether compound.

11. The ink composition for ink jet recording of item 9 above, further containing an epoxy compound.

12. The ink composition for ink jet recording of item 11 above, wherein the epoxy compound is an alicyclic epoxy compound represented by the following formula (VI), (VII), or (VIII),

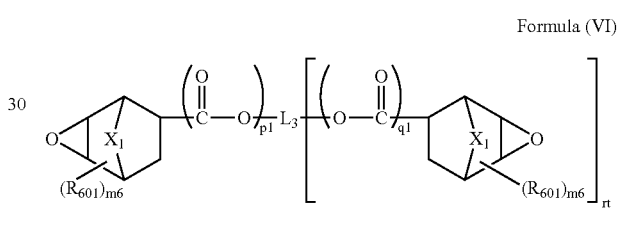

Formula (VI)

wherein $R_{601}$ represents an aliphatic group; m6 represents an integer of from 0 to 2; $X_1$ represents $-(CH_2)_{n6}-$ or $-(O)_{n6}-$, in which n6 represents an integer of 0 or 1; p1 and q1 independently represent an integer of from 0 or 1; r1 represents an integer of from 1 to 3; $L_3$ represents a simple bond or a (r1+1)-valent linkage group having a carbon atom number of from 1 to 15, provided that the (r1+1)-valent linkage group may contain an oxygen atom or a sulfur atom in the main chain of the linkage group,

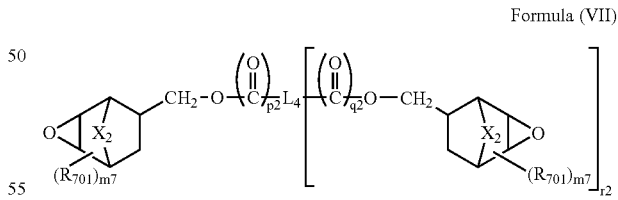

Formula (VII)

wherein $R_{701}$ represents an aliphatic group; m7 represents an integer of from 0 to 2; $X_2$ represents $-(CH_2)_{n7}-$ or $-(O)_{n7}-$, in which n7 represents an integer of 0 or 1; p2 and q2 independently represent an integer of from 0 or 1; r2 represents an integer of from 1 to 3; $L_4$ represents a simple bond or a (r2+1)-valent linkage group having a carbon atom number of from 1 to 15, provided that the (r2+1)-valent linkage group may contain an oxygen atom or a sulfur atom in the main chain of the linkage group,

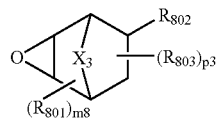

Formula (VIII)

wherein $R_{801}$ represents an aliphatic group; m8 represents an integer of from 0 to 2; $X_3$ represents —$(CH_2)_{n8}$— or —$(O)_{n8}$—, in which n8 represents an integer of 0 or 1; $R_{802}$ and $R_{803}$ represent a substituent; and p3 represents an integer of from 0 or 1.

13. The ink composition for ink jet recording of item 11 above, wherein the composition contains the oxetane compound having no substituent at the 2-position of an oxetane ring in the molecule in an amount of from 50 to 80 parts by weight, the epoxy compound in an amount of from 0 to 50 parts by weight, and the oxetane compound represented by formula (I), (II), (III), (IV) or (V) above in an amount of from 1 to 20 parts by weight.

14. An image formation method employing the ink composition for ink jet recording of item 8 above, the method comprising the steps of ejecting the ink composition as ink droplets from a recording head onto a recording medium to form an ink image, the recording head comprising at least one nozzle capable of selectively ejecting the ink droplets; and exposing the resulting ink image to actinic ray to cure the ink.

In view of the above, the present inventors have made an extensive study. As a result, they have found that ink for ink jet recording containing a bifunctional oxetane compound having a specific linkage group (hereinafter also referred to as the bifunctional oxetane compound in the invention) among bifunctional oxetane compounds having two oxetane rings connected through a divalent linkage group at the 2-position is capable of being cured with light with a low light intensity without being influenced by ambient humidity, and can provide a high quality image, and completed the invention.

Further, it has been found that an ink composition containing the bifunctional oxetane compound in the invention in a small amount compared with an amount contained of other polymerizable compounds has sufficient resistance to inhibition of curing reaction due to ambient humidity.

Japanese Patent O.P.I. Publication No. 2001-181386 discloses 2-(4-methoxyphenyl)-3,3-dimethyl-dimethyloxetane, as a monofunctional oxetane compound with an oxetane ring having at the 2-position an electron-donating group-substituted benzene ring, but does not positively disclose bifunctional oxetane compounds.

The above patent document discloses an ink composition containing 20 to 40 parts by weight of 2-(4-methoxyphenyl)-3,3-dimethyl-dimethyloxetane and 60 to 80 parts by weight of other oxetane compounds provides an excellent curing property, but does not disclose whether or not an ink composition containing an oxetane compound in a small amount compared with an amount contained of other polymerizable compounds provides sufficient curing property.

An ink composition containing the bifunctional oxetane compound in the invention in an amount of from 1 to 20% by weight based on the amount contained of other polymerizable compounds has sufficient resistance to inhibition of curing reaction due to ambient humidity. It is unexpected that such a small content of the oxetane compound exhibits the effects described above.

It has been found that the bifunctional oxetane compound in the invention having an electron withdrawing group at the 4-position of the oxetane ring further increases its reactivity.

The bifunctional oxetane compound in the invention having a substituent at the 3-position of the oxetane ring increases its compatibility with other polymerizable compounds, and an ink, composition containing such a bifunctional oxetane compound makes it possible to suitably adjust safety, hydrophobicity, viscosity, surface tension, and other physical properties.

An ink composition for ink jet recording containing the bifunctional oxetane compound in the invention and an oxetane compound with an oxetane ring having no substituent at the 2-position provides a low viscosity, which is preferable as ink for ink jet recording, and can increase reactivity and strength of cured ink film. An epoxy compound or a vinyl ether compound is another cation-polymerizable compound used in combination with the bifunctional oxetane compound in the invention, and a combined use thereof makes it possible to suitably adjust physical properties of film, adhesion to a substrate and physical properties of ink.

The oxetane compound of the invention is represented by formula (I), (II), (III), (IV) or (V) above. The oxetane compound of the invention will be detailed below.

Examples of the substituent represented by $R_{101}$ through $R_{104}$ of formula (I) $R_{201}$ through $R_{204}$ of formula (II) $R_{301}$ through $R_{304}$ of formula (III), $R_{401}$ through $R_{404}$ of formula (IV) and $R_{501}$ through $R_{504}$ of formula (V) include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, a n-butoxy group or a tert-butoxy group); an acyl group (for example, an acetyl group, a propionyl group, or a trifluoroacetyl group); an acyloxy group (for example, an acetoxy group, a propionyloxy group, or a trifluoroacetoxy group); an alkoxycarbonyl group (for example, a methoxycarbonyl group, an ethoxycarbonyl group or a butoxycarbonyl group); and an aryloxycarbonyl group.

Two substituents bonding to the same carbon atom such as $R_{101}$ and $R_{102}$, $R_{103}$ and $R_{104}$, $R_{201}$ and $R_{202}$, $R_{203}$ and $R_{204}$, $R_{301}$ and $R_{302}$, $R_{303}$ and $R_{304}$, $R_{401}$ and $R_{402}$, $R_{403}$ and $R_{404}$, $R_{501}$ and $R_{502}$, and $R_{503}$ and $R_{504}$ may combine with each other to form a ring.

These substituents have further a substituent. Examples of the substituent include a halogen atom (for example, a chlorine atom, a bromine atom, or a fluorine atom); an alkoxy group having a carbon atom number of from 1 to 6 (for example, a methoxy group, an ethoxy group, an n-propoxy group, an isopropoxy group, an n-butoxy group or a tert-butoxy group); an acyl group (for example, an acetyl group, a propionyl group, or a trifluoroacetyl group); an acyloxy group (for example, an acetoxy group, a propionyloxy group, or a trifluoroacetoxy group); an alkoxycarbonyl group (for example, a methoxycarbonyl group, an ethoxycarbonyl group or a tert-butoxycarbonyl group); an aryloxycarbonyl group; an alkylsulfonyl group; an arylsulfonyl group; a cyano group; and a nitro group. The preferred substituent is a halogen atom, an alkoxy group, an acyloxy group or an alkoxycarbonyl group.

The oxetane compound of the invention is preferably an oxetane compound with an oxetane ring having one or more substituents at the 3-position. Preferred examples of the substituent include an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkoxy group having a carbon atom number of from 1 to 6 (for example, a methoxy group, an ethoxy group, an n-propoxy group, an isopropoxy group, a n-butoxy group or a tert-butoxy group); an acyl group (for example, an acetyl group, a propionyl group, or a trifluoroacetyl group); an acyloxy group (for example, an acetoxy group, a propionyloxy group, or a trifluoroacetoxy group); and an alkoxycarbonyl group (for example, a methoxycarbonyl group, an ethoxycarbonyl group or a butoxycarbonyl group). These substituents have further a substituent. Preferred examples of the substituent are a halogen atom, an alkoxy group, an acyloxy group and an alkoxycarbonyl group.

The oxetane compound of the invention is preferably an oxetane compound with the oxetane ring having a substituted or unsubstituted alkyl group at the 3-position, and more preferably an oxetane compound with the oxetane ring having two alkyl groups at the 3-position. Preferred examples of the substituent of the substituted alkyl group are a halogen atom, an alkoxy group, an acyloxy group and an alkoxycarbonyl group.

In the oxetane compound of the invention, the oxetane compound with an oxetane ring having an electron withdrawing group at the 4-position makes it possible to more increase its reactivity. The electron withdrawing group is a substituent having a positive Hammett's substituent constant σp. Examples of the electron withdrawing group include —$NO_2$, —CN, —$SO_2$-Alkyl, —CO-Alkyl, —CO-Aryl, —COO-Alkyl, —COO-Aryl, and a halogen atom (for example, a fluorine atom, a chlorine atom or a bromine atom). Preferred examples of the electron withdrawing group as the substituent at the 4-position are an alkyl group having, at the α, β and γ carbon atom, the above electron withdrawing group, particularly a fluorine atom.

Detailed explanation will be made below.

In formula (I), $R_{105}$ represents a substituted or unsubstituted alkoxy group, or a substituted or unsubstituted aryloxy group; and m1 represents 0, 1 or 2. The alkoxy group is preferably an alkoxy group having a carbon atom number of from 1 to 6 (for example, a methoxy group, an ethoxy group, an n-propyl group, an iso-propoxy group, or an n-butoxy group). m1 is preferably not less than 1, and more preferably 2. When m1 is 2 or more, plural $R_{105}$s are the same or different.

The substitution position of $R_{105}$ is preferably at the ortho position to the oxetane ring. When m1 is 2, two alkoxy groups are preferably positioned at the ortho or para position on the benzene ring. When m1 is 2, and two alkoxy groups are positioned at the ortho position on the benzene ring, the two alkoxy groups may combine with each other to form a ring. When m1 is 2 and one $R_{105}$ is an aryloxy group, a divalent arylenedioxy group such as o-phenylenedioxy may be formed on the benzene ring to form a ring.

$R_{106}$ represents a substituent; and n1 represents 0, 1, 2 or 3. Examples of the substituent represented by $R_{106}$ include a halogen atom (for example, a chlorine atom, a bromine atom, or a fluorine atom); and a substituted or unsubstituted alkyl group having a carbon atom number of from 1 to 6 (for example, a methyl group, an ethyl group, a propyl group, an isopropyl group, a butyl group). Examples of the substituent of the alkyl group include a halogen atom (for example, a chlorine atom, a bromine atom, or a fluorine atom); an alkoxy group having a carbon atom number of from 1 to 6 (for example, a methoxy group, an ethoxy group, an n-propoxy group, an isopropoxy group, an n-butoxy group or a tert-butoxy group); an acyl group (for example, an acetyl group, a propionyl group, or a trifluoroacetyl group); an acyloxy group (for example, an acetoxy group, a propionyloxy group, or a trifluoroacetoxy group); and an alkoxycarbonyl group (for example, a methoxycarbonyl group, an ethoxycarbonyl group or a tert-butoxycarbonyl group). The preferred substituent is a halogen atom, an alkoxy group, an acyloxy group or an alkoxycarbonyl group. When n1 is 2 or more, plural $R_{106}$s are the same or different. When $R_{105}$ and $R_{106}$ are adjacent to each other, $R_{105}$ and $R_{106}$ may combine with each other to form a ring.

In formula (II), $R_{205}$ represents a substituted or unsubstituted alkoxy group, or a substituted or unsubstituted aryloxy group; and m2 represents 0, 1, 2 or 3. The alkoxy group is preferably an alkoxy group having a carbon atom number of from 1 to 6 (for example, a methoxy group, an ethoxy group, an n-propyl group, an iso-propoxy group, or an n-butoxy group). m2 is preferably not less than 1, and more preferably 2. When m2 is 2 or more, plural $R_{205}$s are the same or different.

The substitution position of $R_{205}$ is preferably at the ortho position to the oxetane ring. When the two oxetane rings are at the 1-, and 3-positions on the benzene ring and m2 is 1, $R_{205}$ is preferably at the 4-position, and when the two oxetane rings are at the 1-, and 3-positions on the benzene ring and m2 is 2, the two $R_{205}$s are preferably at the 4-, and 6-positions. When m2 is 2 and the two alkoxy groups are adjacent to each other, they may combine with each other to form a ring. When m2 is 2 and one $R_{205}$ is an aryloxy group, a divalent arylenedioxy group such as o-phenylenedioxy may be formed on the benzene ring to form a ring.

$R_{206}$ represents a substituent; and n2 represents 0, 1, 2 or 3. Examples of the substituent represented by $R_{206}$ include a halogen atom (for example, a chlorine atom, a bromine atom, or a fluorine atom); and a substituted or unsubstituted alkyl group having a carbon atom number of from 1 to 6 (for example, a methyl group, an ethyl group, a propyl group, an isopropyl group, a butyl group). Examples of the substituent of the alkyl group include a halogen atom (for example, a chlorine atom, a bromine atom, or a fluorine atom); an alkoxy group having a carbon atom number of from 1 to 6 (for example, a methoxy group, an ethoxy group, an n-propoxy group, an isopropoxy group, an n-butoxy group or a tert-butoxy group); an acyl group (for example, an acetyl group, a propionyl group, or a trifluoroacetyl group); an acyloxy group (for example, an acetoxy group, a propionyloxy group, or a trifluoroacetoxy group); and an alkoxycarbonyl group (for example, a methoxycarbonyl group, an ethoxycarbonyl group or a tert-butoxycarbonyl group). The preferred substituent is a halogen atom, an alkoxy group, an acyloxy group or an alkoxycarbonyl group. When n2 is 2 or more, plural $R_{206}$s are the same or different. When $R_{205}$ and $R_{206}$ are adjacent to each other, $R_{105}$ and $R_{106}$ may combine with each other to form a ring.

In formula (III), $R_{305}$ and $R_{306}$ independently represent a substituent; and m3 and n3 independently represent 0, 1, 2, 3 or 4. Examples of the substituent represented by $R_{305}$ and $R_{306}$ include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); an alkoxy group having a carbon atom number of from 1 to 6 (for example, a methoxy group, an ethoxy group, an n-propoxy group, an isopropoxy group, an n-butoxy group or a tert-butoxy group); an acyl group (for example, an acetyl group, a propionyl group, a trifluoroacetyl group, or a benzoyl group); an acyloxy group (for example, an acetoxy group, a propionyloxy group, or a trifluoroacetoxy group); and an alkoxycarbonyl group (for example, a methoxycarbonyl group, an ethoxycarbonyl group or a tert-butoxycarbonyl group). When m3 and n3 each are 2 or more, plural $R_{305}$s and $R_{306}$s each are the same or different.

When both $R_{305}$ and $R_{306}$ are at the ortho position to the oxygen atom through which combines the two benzene rings, they may combine with each other to form a ring. Example of the divalent group for forming the ring include —O—, —S—, >C=O, >C=S, —CH$_2$—, —CHR—, —C(R)$_2$—, in which R represents a substituent. Examples of the substituent represented by R are the same as those denoted in $R_{101}$ through $R_{104}$ above.

In formula (IV), $R_{405}$ represents a substituent, and m4 is an integer of from 0 to 4. Examples of the substituent represented by $R_{405}$ include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, an n-butoxy group or a tert-butoxy group), an acyl group (for example, an acetyl group, a propionyl group, or a trifluoroacetyl group), and an acyloxy group (for example, an acetoxy group, a propionyloxy group, or a trifluoroacetoxy group).

When m4 is 2 or more, plural $R_{405}$s may be the same or different.

$L_1$ represents a divalent linkage group having a carbon number of from 1 to 15, provided that the divalent linkage group may contain an oxygen atom or a sulfur atom in the main chain. Examples of the divalent linkage group include the followings:

a methylene group [—CH$_2$—], an ethylidene group [>CHCH$_3$], an isopropylidene group [>C(CH$_3$)$_2$], a 1,2-ethylene group [—CH$_2$CH$_2$—], a 1,2-propylene group [—CH(CH$_3$)CH$_2$—], a 1,3-propanediyl group [—CH$_2$CH$_2$CH$_2$—], a 2,2-dimethyl-1,3-propanediyl group [—CH$_2$C(CH$_3$)$_2$CH$_2$—], a 2,2-dimethoxy-1,3-propanediyl group [—CH$_2$C(OCH$_3$)$_2$CH$_2$—], a 2,2-dimethoxymethyl-1,3-propanediyl group [—CH$_2$C(CH$_2$OCH$_3$)$_2$CH$_2$—], a 1-methyl-1,3-propanediyl group [—CH(CH$_3$)CH$_2$CH$_2$—], a 1,4-butanediyl group [—CH$_2$CH$_2$CH$_2$CH$_2$—], a 1,5-pentanediyl group [—CH$_2$CH$_2$CH$_2$CH$_2$CH$_2$—], an oxydiethylene group [—CH$_2$CH$_2$OCH$_2$CH$_2$—], a thiodiethylene group [—CH$_2$CH$_2$SCH$_2$CH$_2$—], a 3-oxothiodiethylene group [—CH$_2$CH$_2$SOCH$_2$CH$_2$—], a 3,3-dioxothiodiethylene group [—CH$_2$CH$_2$SO$_2$CH$_2$CH$_2$—], a 1,4-dimethyl-3-oxa-1,5-pentanediyl group [—CH(CH$_3$)CH$_2$O CH(CH$_3$)CH$_2$—], a 3-oxopentanediyl group [—CH$_2$CH$_2$COCH$_2$CH$_2$—], a 1,5-dioxo-3-oxapentanediyl group [—COCH$_2$OCH$_2$CO—], a 4-oxa-1,7-heptanediyl group [—CH$_2$CH$_2$CH$_2$OCH$_2$CH$_2$CH$_2$—], a 3,6-dioxa-1,8-octanediyl group [—CH$_2$CH$_2$OCH$_2$CH$_2$OCH$_2$CH$_2$—], a 1,4,7-trimethyl-3,6-dioxa-1,8-octanediyl group [—CH(CH$_3$)CH$_2$O CH(CH$_3$) CH$_2$OCH(CH$_3$)CH$_2$—], a 5,5-dimethyl-3,7-dioxa-1,9-nonanediyl group [—CH$_2$CH$_2$OCH$_2$C(CH$_3$)$_2$CH$_2$OCH$_2$CH$_2$—], 5,5-dimethoxy-3,7-dioxa-1,9-nonanediyl group [CH$_2$CH$_2$OCH$_2$C(OCH$_3$)$_2$CH$_2$OCH$_2$CH$_2$—], a 5-dimethoxymethyl-3,7-dioxa-1,9-nonanediyl group [—CH$_2$CH$_2$OCH$_2$C(CH$_2$OCH$_3$)$_2$CH$_2$OCH$_2$CH$_2$—], a 4,7-dioxo-3,8-dioxa-1,10-decanediyl group [—CH$_2$CH$_2$O—COCH$_2$CH$_2$CO—OCH$_2$CH$_2$—], a 3,8-dioxo 4,7-dioxa-1,10-decanediyl group [—CH$_2$CH$_2$CO—OCH$_2$CH$_2$O—COCH$_2$CH$_2$—], a 1,3-cyclopentanediyl group [-1,3-C$_5$H$_8$—], a 1,2-cyclohexanediyl group [-1,2-C$_6$H$_{10}$—], a 1,3-cyclohexanediyl group [-1,3-C$_6$H$_{10}$—], a 1,4-cyclohexanediyl group [-1,4-C$_6$H$_{10}$—], a 2,5-tetrahydrofuranediyl group [2,5-C$_4$H$_6$O—], a p-phenylene group [—P—C$_6$H$_4$—], a m-phenylene group [-m-C$_6$H$_4$—], an α,α'(-o-xylylene group [-o-CH$_2$—C$_6$H$_4$—CH$_2$—], an α,α'-o-xylylene group [-m-CH$_2$—C$_6$H$_4$—CH$_2$—], an α,α'-p-xylylene group [-p-CH$_2$—C$_6$H$_4$—CH$_2$—], a furane-2,5-diyl-bismethylene group [2,5-CH$_2$—C$_4$H$_2$O—CH$_2$—], a thiophene-2,5-diyl-bismethylene group [2,5-CH$_2$—C$_4$H$_2$S—CH$_2$—], an isopropylidene-p-phenylene group [-p-C$_6$H$_4$—C(CH$_3$)$_2$-p-C$_6$H$_4$—].

$L_1$ may have a substituent. Examples of the substituent include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, an alkyl group, and an alkoxy group. $R_{405}$ and the substituent of $L_1$ and $R_{405}$ may combine with each other to form a ring.

$L_1$ is preferably a divalent linkage group having a carbon atom number of from 1 to 8, which may contain an oxygen atom or a sulfur atom in the main chain, and more preferably a divalent linkage group having a carbon atom number of from 1 to 5, the main chain of which consists of a carbon atom.

In formula (V), $R_{505}$ represents a substituted or unsubstituted alkyl group, and preferably an alkyl group having a carbon atom number of from 1 to 6 (for example, a methyl group, an ethyl group, a propyl group, an isopropyl group, or a butyl group). Examples of the substituent include an alkoxy group having a carbon atom number of from 1 to 6 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, and an alkoxy group.

$R_{506}$ represents a substituent, and m5 is an integer of from 0 to 3. Examples of the substituent represented by $R_{506}$ include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, a n-butoxy group or a tert-butoxy group). When m5 is 2 or more, plural $R_{506}$s may be the same or different.

$L_2$ represents an oxygen atom or a divalent linkage group having a carbon number of from 1 to 15, provided that the divalent linkage group may contain an oxygen atom or a sulfur atom in the main chain. Examples of the divalent linkage group include the following groups and a group having a carbonyl group at each of the both ends thereof:

a methylene group [—$CH_2$—], an ethylidene group [>$CHCH_3$], an isopropylidene group [>$C(CH_3)_2$], a 1,2-ethylene group [—$CH_2CH_2$—], a 1,2-ethylene-1,2-dioxy group [—O—$CH_2CH_2$—O—], a 1,2-propylene-1,2-dioxy group [—O—$CH(CH_3)CH_2$—O—], a 1,3-propanediyl-1,3-dioxy group [—O—$CH_2CH_2CH_2$—O—], a 2,2-dimethyl-1,3-propanediyl-1,3-dioxy group [—O—$CH_2C(CH_3)_2CH_2$—O—], a 2,2-dimethoxy-1,3-propanediyl-1,3-dioxy group [—O—$CH_2C(OCH_3)_2CH_2$—O—], a 2,2-dimethoxymethyl-1,3-propanediyl group [—O—$CH_2C(CH_2OCH_3)_2CH_2$—O—], a 1-methyl-1,3-propanediyl-1,3-dioxy group [—O—$CH(CH_3)CH_2CH_2$—O—], a 1,4-butanediyl-1,4-dioxy group [—O—$CH_2CH_2CH_2CH_2$—O—], a 1,5-pentanediyl-1,5-dioxy group [—O—$CH_2CH_2CH_2CH_2CH_2$—O—], an oxydiethylene-1,5-dioxy group [—O—$CH_2CH_2OCH_2CH_2$—O—], a thiodiethylene-1,5-dioxy group [—O—$CH_2CH_2SCH_2CH_2$—O—], a 3-oxothiodiethylene-1,5-dioxy group [—O—$CH_2CH_2SOCH_2CH_2$—O—], a 3,3-dioxothiodiethylene-1,5-dioxy group [—O—$CH_2CH_2SO_2CH_2CH_2$—O—], a 1,4-dimethyl-3-oxa-1,5-pentanediyl-1,5-dioxy group [—O—$CH(CH_3)CH_2OCH(CH_3)CH_2$—O—], a 3-oxopentanediyl-1,5-dioxy group [—O—$CH_2CH_2COCH_2CH_2$—O—], a 1,5-dioxo-3-oxapentanediyl-1,5-dioxy group [—O—$COCH_2OCH_2CO$—O—], a 4-oxa-1,7-heptanediyl-1,7-dioxy group [—O—$CH_2CH_2CH_2OCH_2CH_2CH_2$—O—], a 3,6-dioxa-1,8-octanediyl-1,8-dioxy group [—O—$CH_2CH_2OCH_2CH_2OCH_2CH_2$—O—], a 1,4,7-trimethyl-3,6-dioxa-1,8-octanediyl-1,8-dioxy group [—O—$CH(CH_3)CH_2O$ $CH(CH_3)CH_2OCH(CH_3)CH_2$—O—], a 5,5-dimethyl-3,7-dioxa-1,9-nonanediyl-1,9-dioxy group [—O—$CH_2CH_2OCH_2C(CH_3)_2CH_2OCH_2CH_2$—O—], a 5,5-dimethoxy-3,7-dioxa-1,9-nonanediyl-1,9-dioxy group [—O—$CH_2CH_2OCH_2C(OCH_3)_2CH_2OCH_2CH_2$—O—], a 5,5-dimethoxymethyl-3,7-dioxa-1,9-nonanediyl-1,9-dioxy group [—O—$CH_2CH_2OCH_2C(CH_2OCH_3)_2CH_2OCH_2CH_2$—O—], a 4,7-dioxo-3,8-dioxa-1,10-decanediyl-1,10-dioxy group [—O—$CH_2CH_2O$—$COCH_2CH_2CO$—$OCH_2CH_2$—O—], a 3,8-dioxo-4,7-dioxa-1,10-decanediyl-1,10-dioxy group [—O—$CH_2CH_2CO$—$OCH_2CH_2O$—$COCH_2CH_2$—O—], a 1,3-cyclopentanediyl-1,3-dioxy group [-1,3-O—$C_5H_8$—O—], a 1,2-cyclohexanediyl-1,2-dioxy group [-1,2-O—$C_6H_{10}$—O—], a 1,3-cyclohexanediyl-1,3-dioxy group [-1,3-O—$C_6H_{10}$—O—], a 1,4-cyclohexanediyl-1,4-dioxy group [-1,4-O—$C_6H_{10}$—O—], a 2,5-tetrahydrofuranediyl-2,5-dioxy group [2,5-O—$C_4H_6O$—O—], a p-phenylene-1,4-dioxy group [-p-O—$C_6H_4$—O—], a m-phenylene-1,3-dioxy group [-m-O—$C_6H_4$—O—], an o-xylylene-α,α'-dioxy group [-o-O—$CH_2$—$C_6H_4$—$CH_2$—O—), a m-xylylene-α,α'-dioxy group [-m-O—$CH_2$—$C_6H_4$—$CH_2$—O—], a p-xylylene-α,α'-dioxy group [-p-O—$CH_2C_6H_4$—$CH_2$—O—], a furane-2,5-diyl-bismethylene-α,α'-dioxy group [2,5-O—$CH_2$—$C_4H_2O$—$CH_2$—O—], a thiophene-2,5-diyl-bismethylene-α,α'-dioxy group [2,5-O—$CH_2$—$C_4H_2S$—$CH_2$—O—]

$L_2$ may have a substituent. Examples of the substituent include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, an alkyl group, and an alkoxy group. $R_{505}$ and the substituent of $L_2$ may combine with each other to form a ring.

$L_2$ is preferably an oxygen atom or a divalent linkage group having a carbon atom number of from 1 to 8, which may contain an oxygen atom or a sulfur atom in the main chain, and more preferably an oxygen atom or a divalent linkage group having a carbon atom number of from 1 to 5, which may contain an oxygen atom or a sulfur atom in the main chain.

Examples of the oxetane compound of the invention will be listed below, but the invention is not limited thereto.

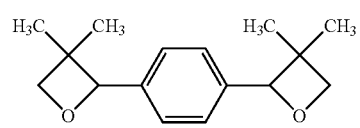

I-1

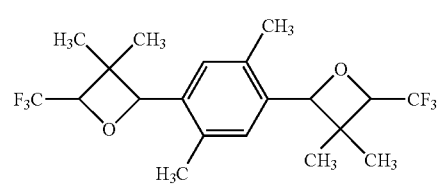

I-2

-continued
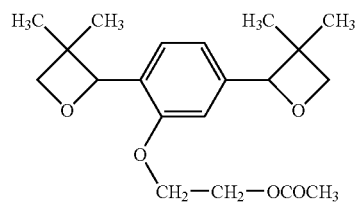
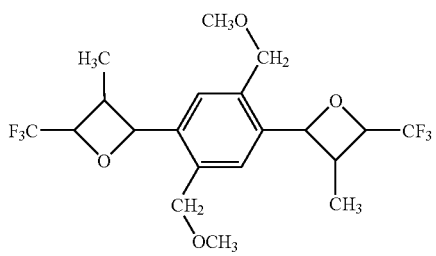
I-3
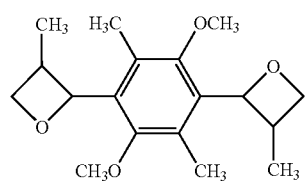
I-4
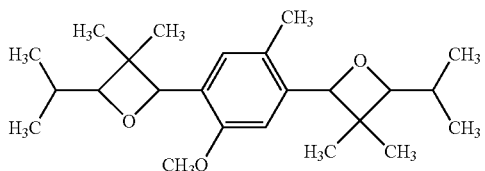
I-5
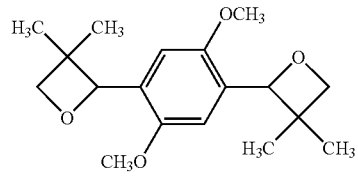
I-6
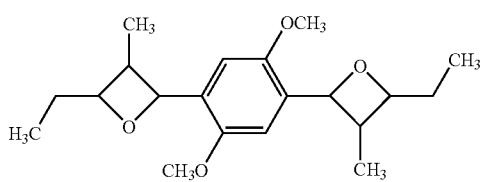
I-7
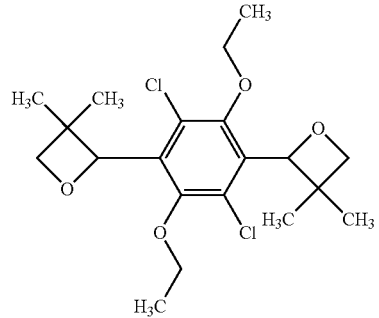
I-8
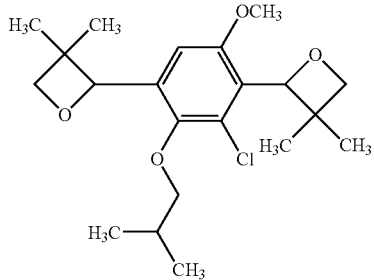
I-9
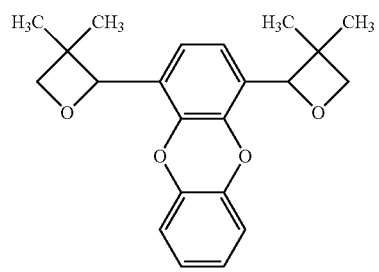
I-10
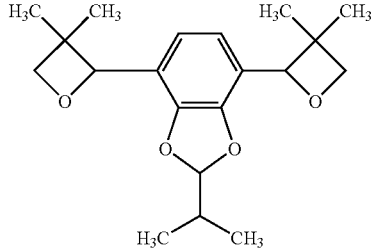
I-11
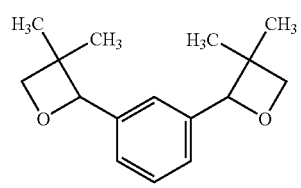
I-12
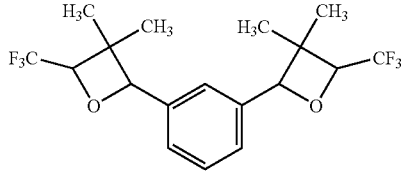
II-1
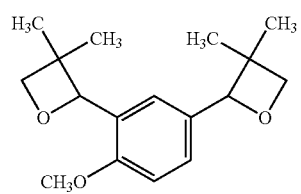
II-2
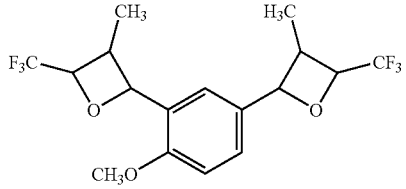
II-3
II-4

-continued
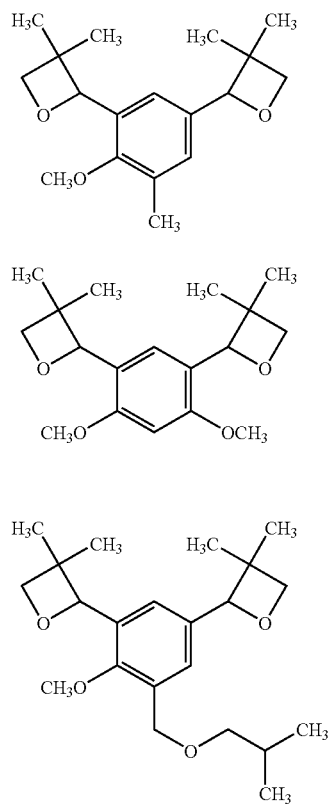
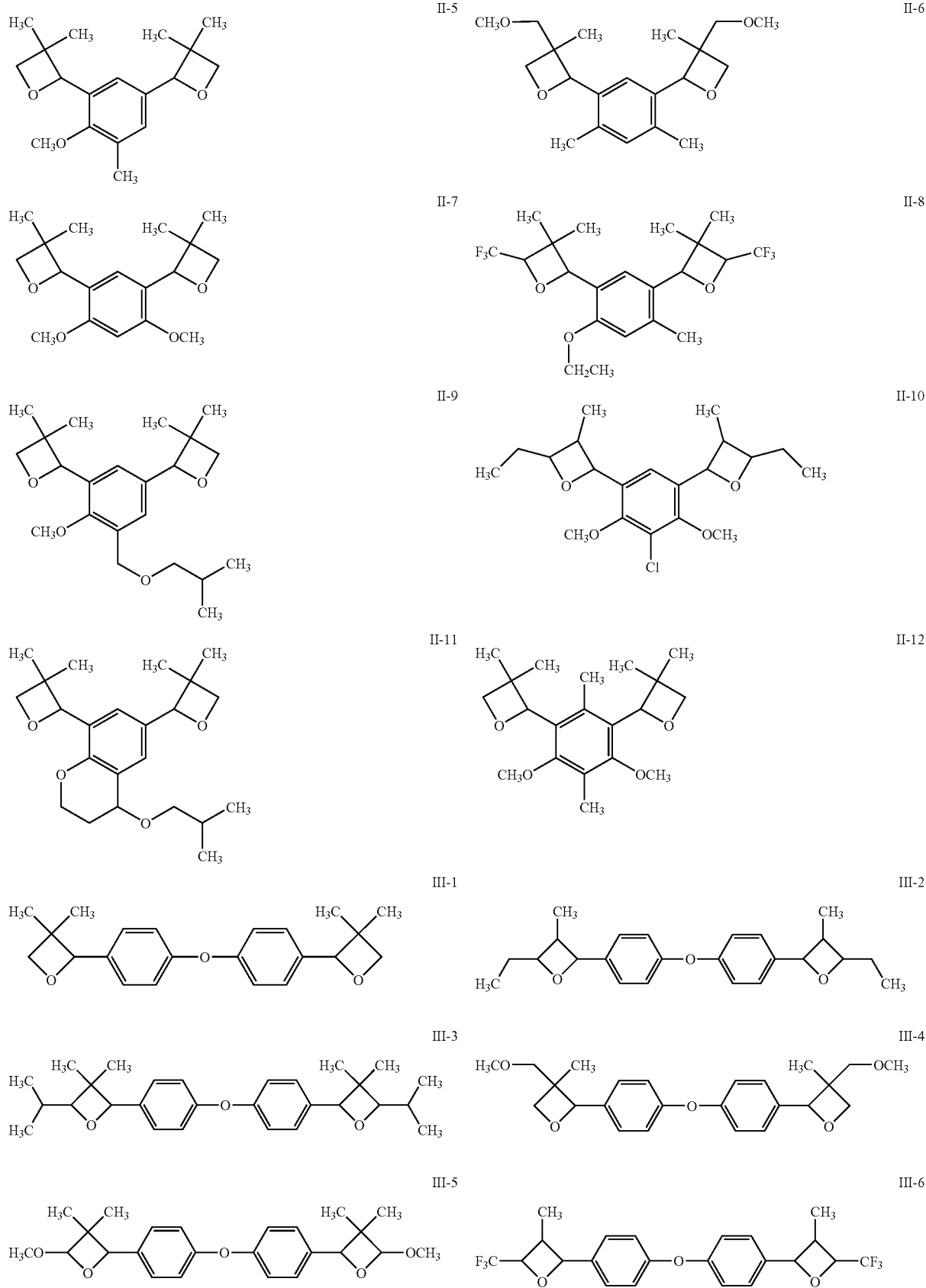

-continued
III-7
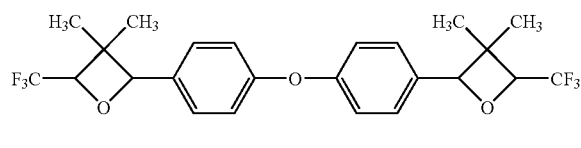
III-8
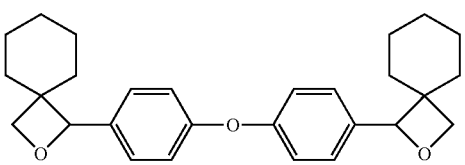
III-9
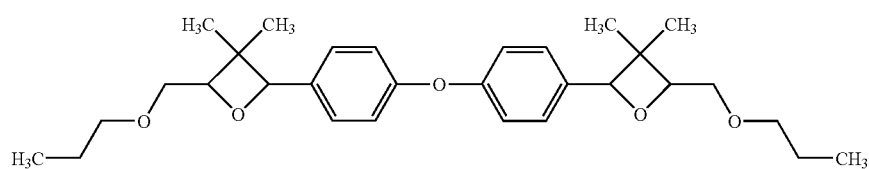
III-10
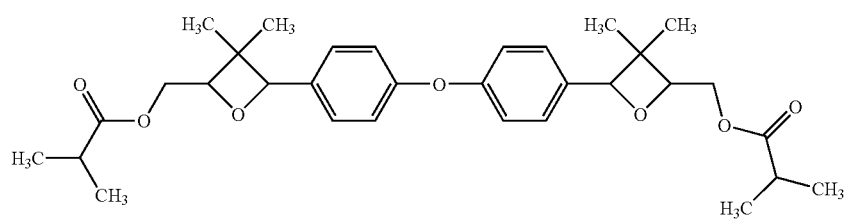
III-11
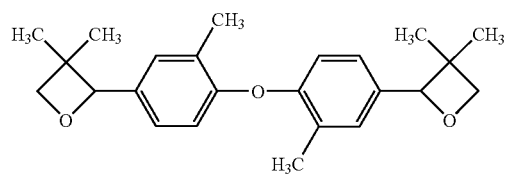
III-12
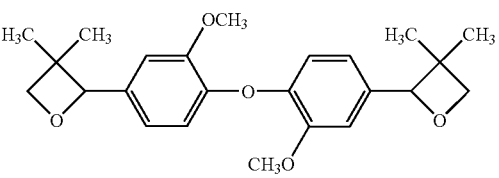
III-13
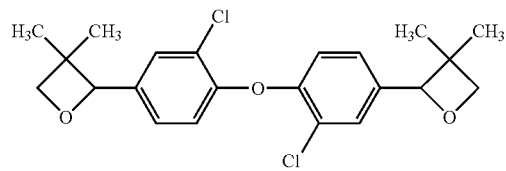
III-14
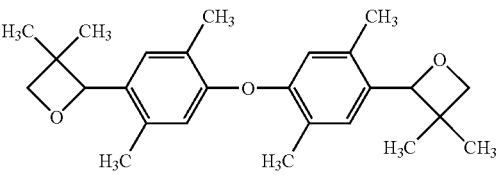
III-15
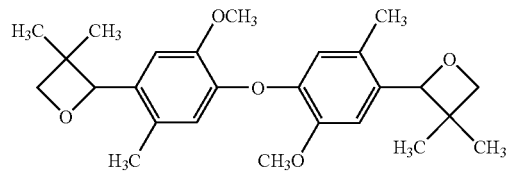
III-16
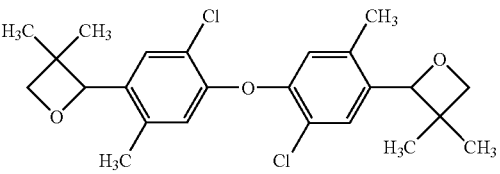
III-17
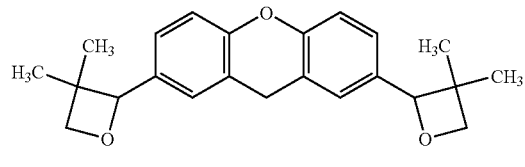
III-18
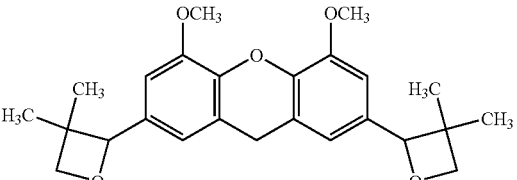
III-19
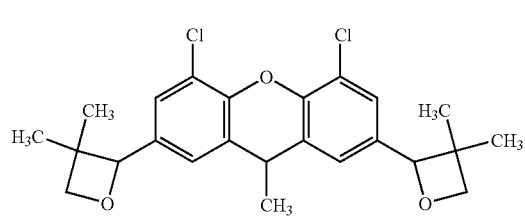
III-20
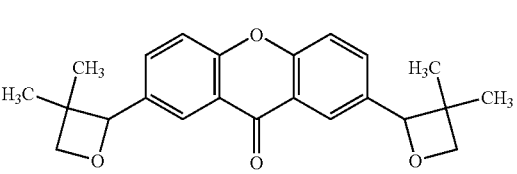

-continued
III-21
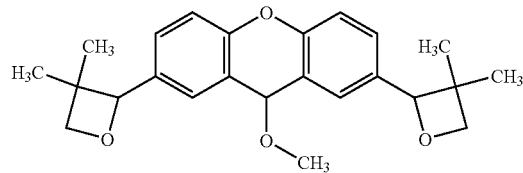
III-22
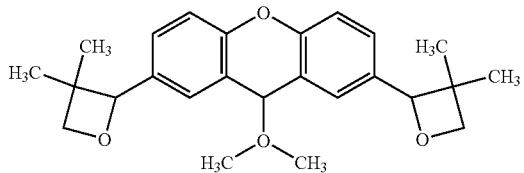
III-23
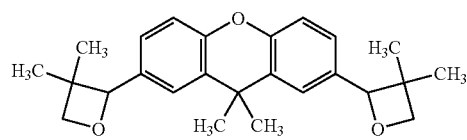
IV-1
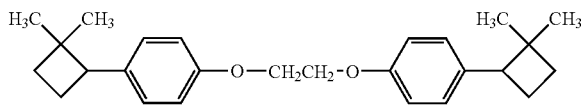
IV-2
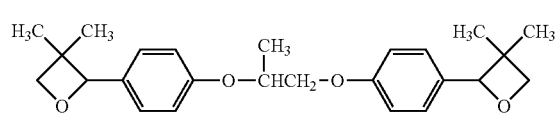
IV-3
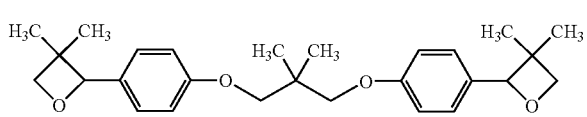
IV-4
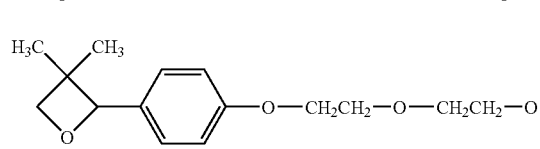
IV-5
IV-6
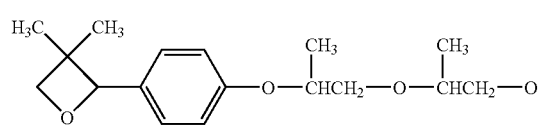
IV-7
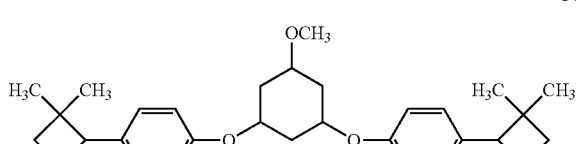
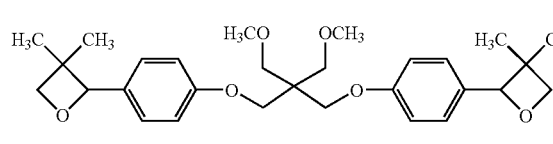
IV-8
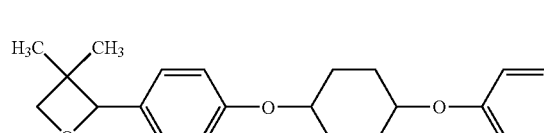
IV-9
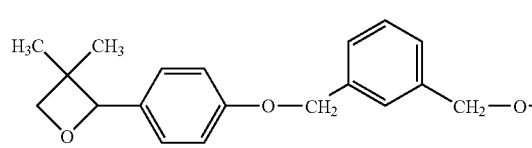
IV-10
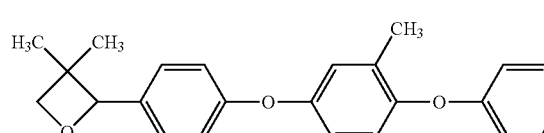
IV-11
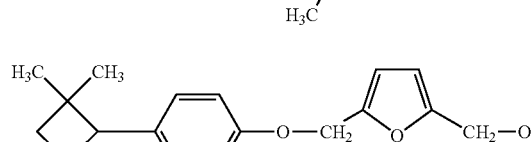

-continued
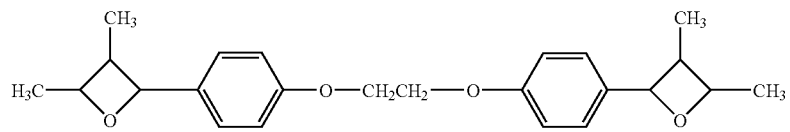
IV-12
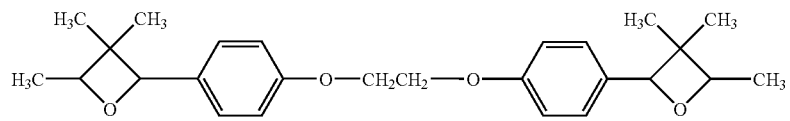
IV-13
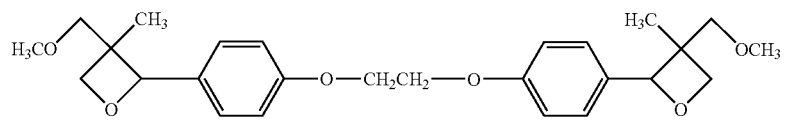
IV-14
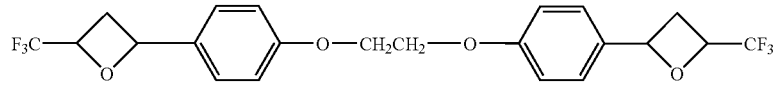
IV-15
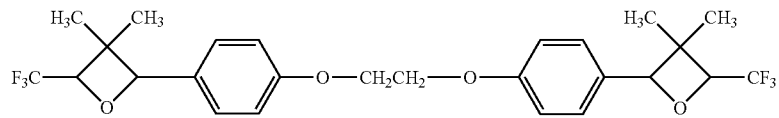
IV-16
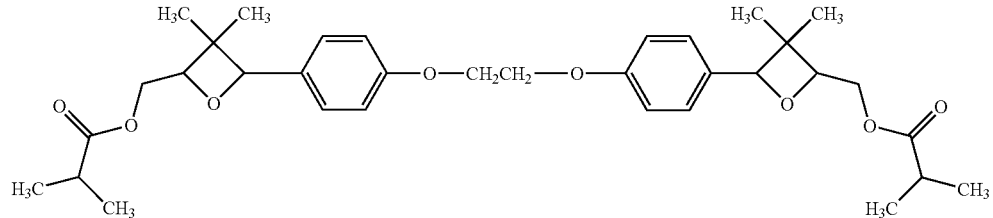
IV-17
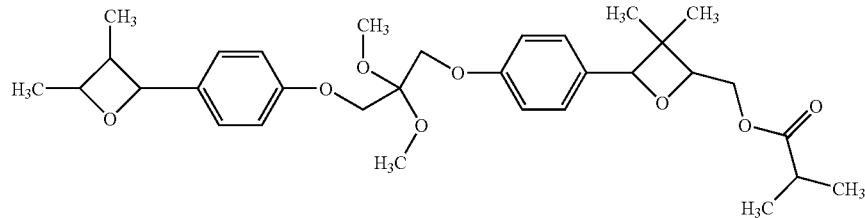
IV-18
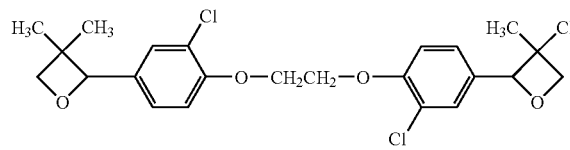
IV-19
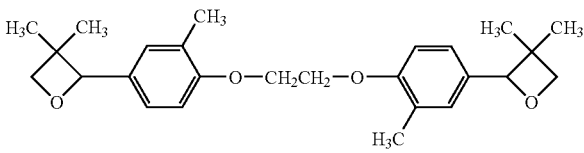
IV-20
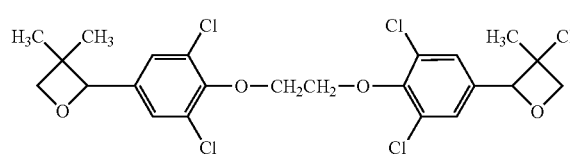
IV-21
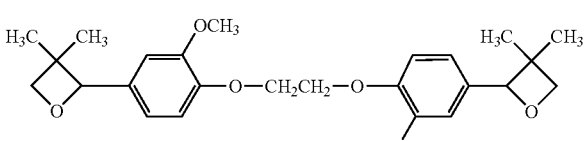
IV-22
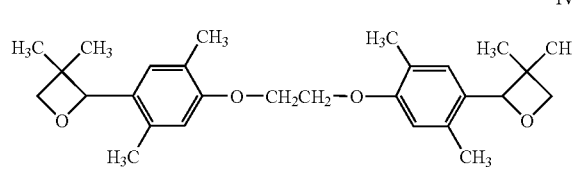
IV-23
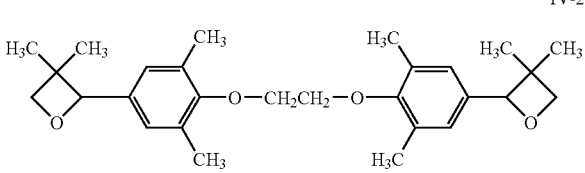
IV-24

-continued
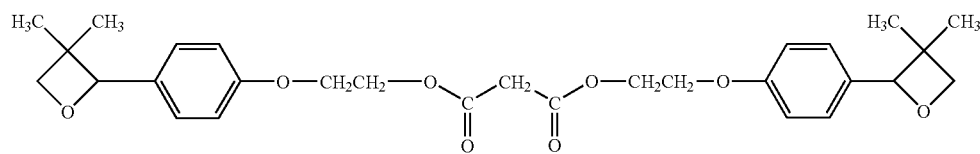
IV-25
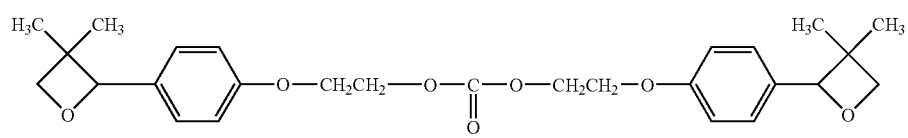
IV-26
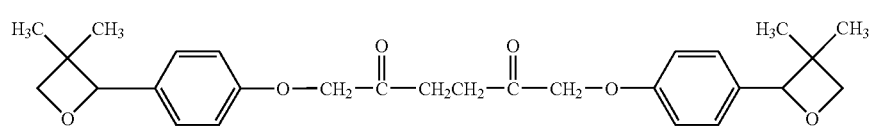
IV-27
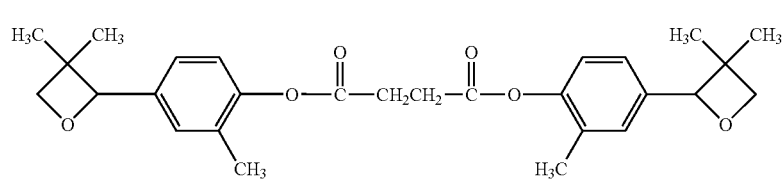
IV-28
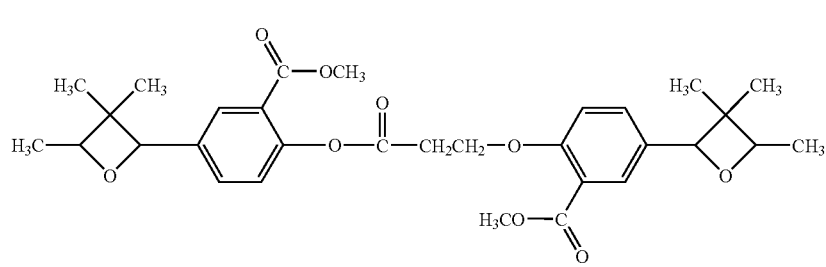
IV-29
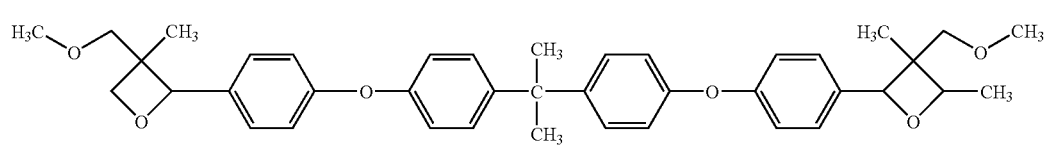
IV-30
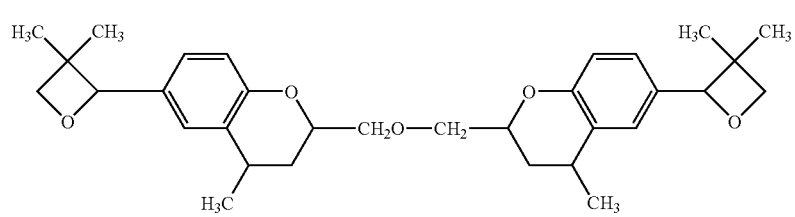
IV-31
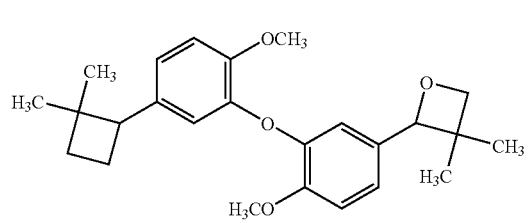
V-1
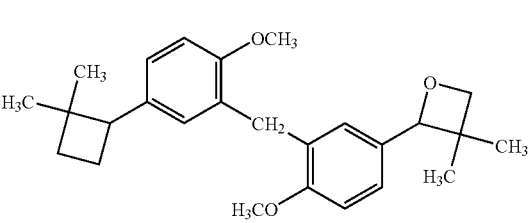
V-2

-continued
V-3
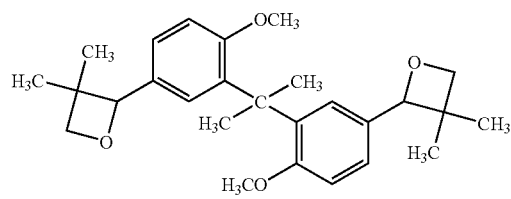
V-4
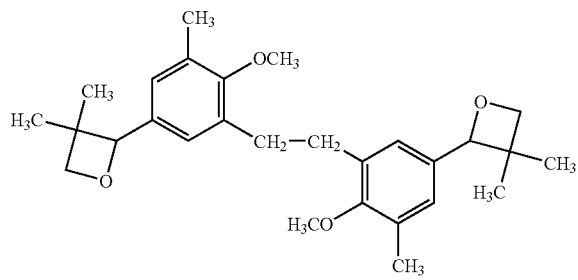
V-5
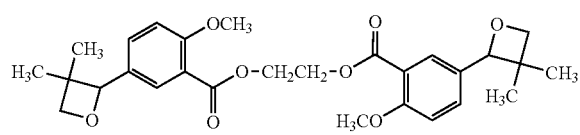
V-6
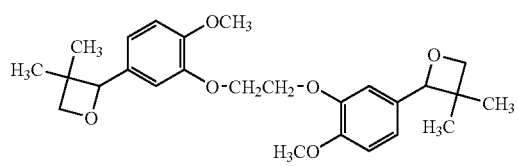
V-7
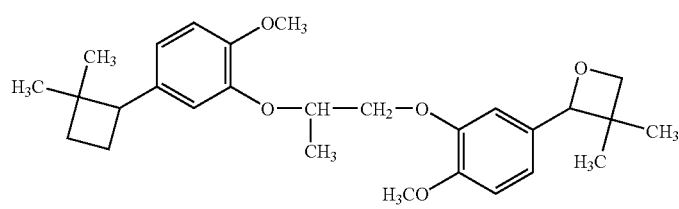
V-8
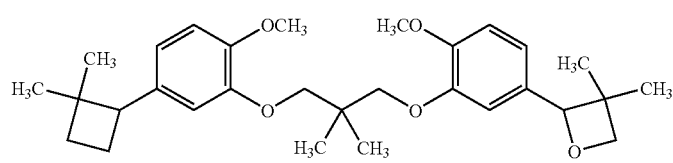
V-9
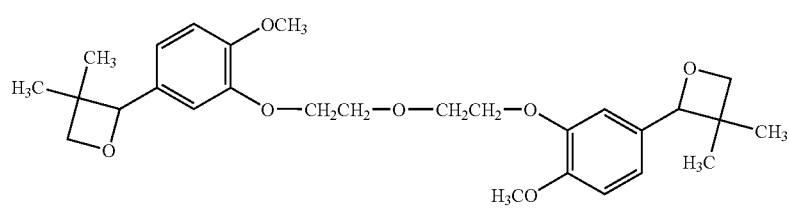
V-10
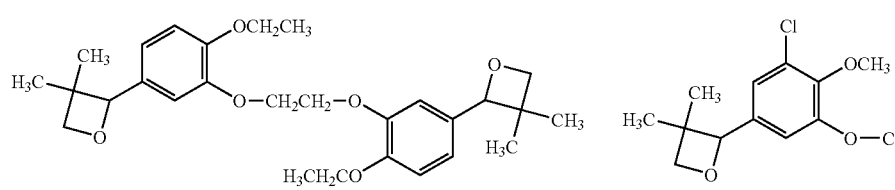
V-11
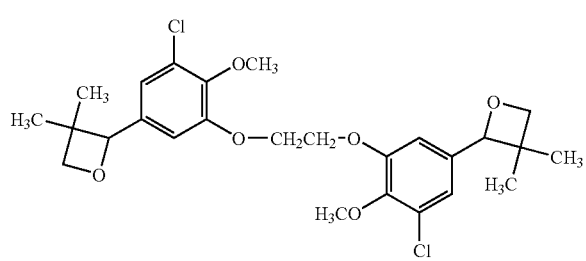
V-12
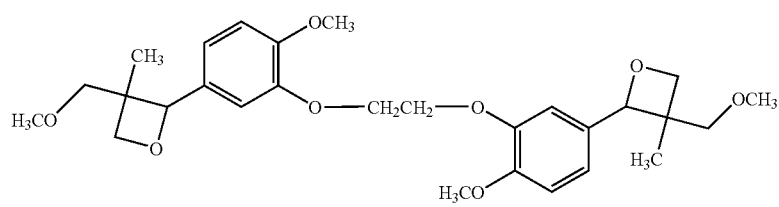

-continued

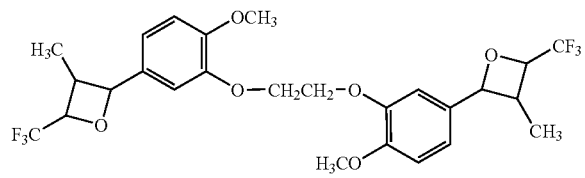
V-13

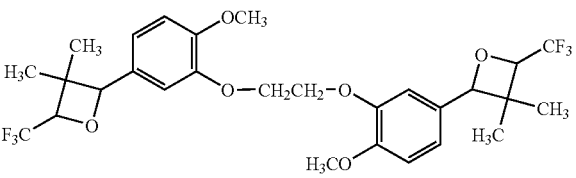
V-14

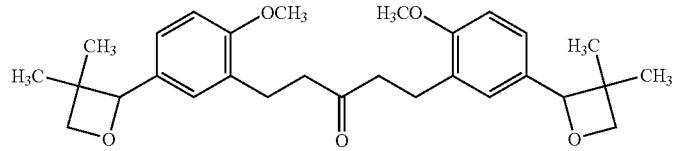
V-15

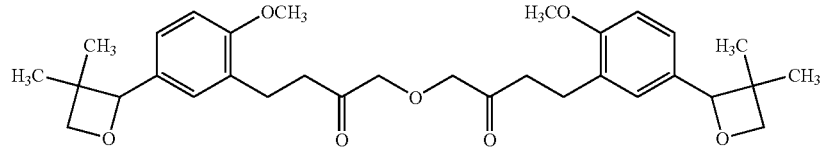
V-16

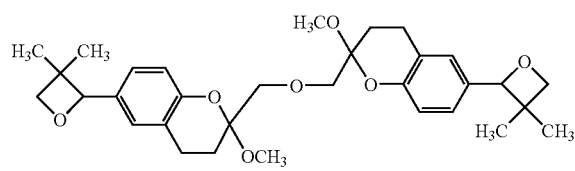
V-17

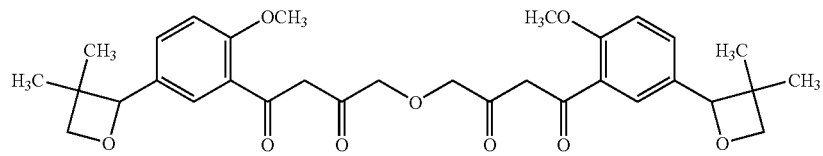
V-18

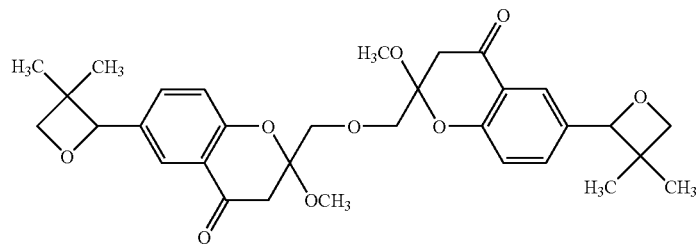
V-19

V-20

The oxetane compound of the invention can be synthesized according to a method described in the following literatures.

A: Hu Xianming, Richard M. Kellogg, Synthesis, 533–538, May (1955).
B: A. O. Fitton, J. Hill, D. Ejane, R. Miller, Synth., 12, 1140 (1987).
C: Toshiro Imai and Sinya Nishida, Can. J. Chem. Vol. 59, 2503–2509 (1981).
D: Nobujiro Shimizu, Shintaro Yamaoka, and Yuho Tsuno, Bull. Chem. Soc. Jpn., 56, 3853–3854 (1983).
E: Walter Fisher and Cyril A. Grob, Helv. Chim. Acta., 61, 2336 (1978).
F: Chem. Ber., 101, 1850 (1968).
G: "Heterocyclic Compounds with Three- and Four-membered Rings", Part Two, Chapter IX, Interscience Publishers, John Wiley & Sons, New York (1964).
H: Bull. Chem. Soc. Jpn., 61, 1653 (1988)
I: Pure Appl. Chem., A29 (10), 915 (1992)
J: Pure Appl. Chem., A30 (2 & amp; 3), 189 (1993)
K: Japanese Patent O.P.I. Publication No. 6-16804
L: German Patent No. 1,021,858

According to the disclosures of the above literatures, synthetic examples of the oxetane compound of the invention will be shown below, but the invention is not limited thereto.

SYNTHETIC EXAMPLE 1

Exemplified Compound I-1: Synthesis of 1,4-Bis(3,3-dimethyloxetan-2-yl)-benzene

Isobutyl aldehyde of 4.2 equivalent amount and a 1.0 equivalent amount of terephthalaldehyde were dissolved in methanol, and a methanol solution of a 2.1 equivalent amount of potassium hydroxide was dropwise added thereto at room temperature. The resulting solution was reacted at 60° C. for 6 hours, and concentrated under reduced pressure. The concentrate was dissolved in water ten times the concentrate while heating and allowed to cool to precipitate crystals. The precipitated crystals were filtered off, washed with water, and dried over a drying agent for 2 days under reduced pressure to obtain white crystals, 1,4-bis(3,3-dimethyloxetan-2-yl)-benzene. The yield was 80 to 85%.

1H-NMR (CD$_3$OD) δ (ppm): 0.77 (s, 6H, CH$_3$—); 0.86 (s, 6H, CH$_3$—); 3.34 (d, 2H, —CH$_2$—OH); 3.49 (d, 2H, —CH$_2$—OH); 4.61 (s, 2H, —CH—OH—, benzyl); 7.29 (s, 4H, —CH—, benzene ring)

The tetraol compound obtained above was reacted and sulfonated in methylene chloride, employing methanesulfonyl chloride in am amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The yield was 90 to 95%.

The crude product was recrystallized from hexane-methylene chloride to obtain an oxetane compound of Exemplified compound I-1.

1H-NMR (CDCl$_3$) δ (ppm): 0.77 (s, 6H, CH$_3$—); 1.40 (s, 6H, CH$_3$—); 4.27 (d, 2H, —O—CH$_2$—, oxetane ring); 4.52 (d, 2H, —O—CH$_2$—, oxetane ring); 5.51 (s, 2H, —CH—O—, benzyl position on the oxetane ring); 7.29 (s, 4H, —CH—, benzene ring)

Another oxetane compound represented by formula (I) can be synthesized with good yield in the same manner as above from terephthalaldehyde derivatives, which can be prepared according to synthetic methods described in published literatures.

SYNTHETIC EXAMPLE 2

Exemplified Compound II-1: Synthesis of 1,3-Bis(3,3-dimethyloxetan-2-yl)-benzene Isobutyl aldehyde of 4.2 equivalent amount and a 1.0 equivalent amount of terephthalaldehyde were dissolved in methanol, and a methanol solution of a 2.1 equivalent amount of potassium hydroxide was dropwise added thereto at room temperature. The resulting solution was reacted at 60° C. for 6 hours, and concentrated under reduced pressure to obtain a crude product of 1,3-phenylene-bis(2,2-dimethyl-1,3-propanediol). The crude product contained a large amount of isobutyric acid, which was not distilled off, and elimination of the acid was carried out. The resulting product was dissolved in methylene chloride ten times the amount of the product, then mixed with alumina three times the product, and reacted at room temperature for 3 hours while stirring. The resulting reaction solution was suction filtered with a filter with alumina two times the amount of the reaction solution, and washed with methylene chloride 5 times the solution to obtain a filtrate. The resulting filtrate was concentrated under reduced pressure to obtain a tetraol containing no isobutyric acid. The yield was 80 to 85%. 1H-NMR (CDCl$_3$) δ (ppm): 0.83 (s, 6H, CH$_3$—); 0.88 (s, 6H, CH$_3$—); 3.45 (d, 2H, —CH$_2$—OH); 3.56 (d, 2H, —CH$_2$—OH); 4.62 (d, 2H, —CH—OH—, benzyl); 7.2–7.4 (m, 4H, —CH—, benzene ring)

The tetraol compound obtained above was reacted and sulfonated in methylene chloride, employing methanesulfonyl chloride in am amount of 2.1 mole per mol of the tetraol and triethylamine in an amount of 2.2 mole per mol of the tetraol. The reaction solution was washed until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 90 to 95%.

The crude product was column chromatographed through an alumina column employing hexane-methylene chloride (10:1) as an eluent and purified to obtain an oxetane compound of Exemplified compound II-1, which was a colorless and transparent liquid. The yield was 70 to 75%.

1H-NMR (CDCl$_3$) δ (ppm): 0.78 (s, 6H, CH$_3$—); 1.44 (s, 6H, CH$_3$—); 4.27 (d, 2H, —O—CH$_2$—, oxetane ring); 4.53 (d, 2H, —O—CH$_2$—, oxetane ring); 5.53 (s, 2H, —CH—O—, benzyl position on the oxetane ring); 7.2–7.4 (S, 4H, —CH—, benzene ring)

Another oxetane compound represented by formula (II) can be synthesized with good yield in the same manner as above from terephthalaldehyde derivatives, which can be prepared according to synthetic methods described in published literatures.

SYNTHETIC EXAMPLE 3

Exemplified Compound III-1: Synthesis of 4,4'-Bis(3,3-dimethyloxetan-2-yl)-diphenyl ether Friedel-Crafts reaction was carried out in a mixture of 2.2 equivalent amount of 3-chloro-2,2-dimethylpropionylchloride, a 1.0 equivalent amount of diphenyl ether, and a 2 equivalent amount of aluminum chloride as a catalyst to obtain 4,4'-bis(3-chloro-3,3-dimethylpropionyl)-diphenyl ether. The yield was 80 to 90%. 1H-NMR (CDCl$_3$) δ (ppm): 1.57 (s, 12H, CH$_3$—); 3.80 (s, 12H, CH$_3$—); 7.08 (d, 4H, —CH—, benzene ring); 7.77 (d, 4H, —CH—, benzene ring)

The diketone compound obtained above was reduced in alcohol employing a 2.4 equivalent amount of sodium boron hydride to obtain 4,4'-bis(3-chloro-3,3-dimethyl-1-hydroxypropyl)-diphenyl ether. The yield was not less than 90%.

1H-NMR (CDCl$_3$) δ (ppm): 0.92 (s, 6H, CH$_3$—); 1.02 (s, 6H, CH$_3$—); 3.35 (d, 2H, —CH$_2$—Cl); 4.77 (s, 2H, —CH—(OH), benzyl position); 6.97 (d, 4H, —CH—, benzene ring); 7.32 (d, 4H, —CH—, benzene ring)

The diol compound obtained above was dissolved in methylene chloride, then added with 1 mol % tetra-n-butyl ammonium hydrogen sulfate and a 50% sodium hydroxide solution, and reacted at (30±5)° C. for 12 hours. After the resulting reaction solution was washed with water, the organic solution phase thereof was washed with water, dried over anhydrous magnesium sulfate, and concentrated under reduced pressure to obtain a crude oxetane compound. The yield was 85 to 90%.

The crude product was column chromatographed through an alumina column employing hexane-methylene chloride (10:1) as an eluent and purified to obtain an oxetane compound of Exemplified compound III-1, which was a colorless and transparent liquid. The yield was 75 to 80%.

1H-NMR (CDCl$_3$) δ (ppm): 0.82 (s, 6H, CH$_3$—); 1.39 (s, 6H, CH$_3$—); 4.26 (d, 2H, —O—CH$_2$—, oxetane ring); 4.54 (d, 2H, —O—CH$_2$—, oxetane ring); 5.48 (s, 2H, —CH—

O—, benzyl position on the oxetane ring); 7.04 (d, 2H, —CH—, benzene ring); 7.27 (d, 2H, —CH—, benzene ring)

SYNTHETIC EXAMPLE 4

Exemplified Compound III-3: Synthesis of 4,4'-Bis (4-isopropyl-3,3-dimethyloxetan-2-yl)-diphenyl ether Diisopropyl ketone in a 2.1 equivalent amount was reacted with a lithium diisopropylamide (a 2 equivalent amount) hexane solution at −10° C. to obtain a lithium enolate solution. An oxy-di-4,4'-benzaldehyde (in a 2.2 equivalent amount) THF solution was dropwise added to the resulting solution at −10° C. in 30 to 60 minutes, reacted at room temperature for 6 hours, and concentrated under reduced pressure. 4,4'-Bis(2,2,4-trimethyl-1-hydroxy-3-oxopentyl)-diphenyl ether was extracted from the concentrated solution, employing methylene chloride. The yield was 70–80%.

1H-NMR (CDCl$_3$) δ (ppm): 0.91 (s, 6H, CH$_3$—); 0.95 (s, 6H, CH$_3$—); 1.12 (s, 12H, (CH$_3$)$_2$CH—); 2.49 (s, 2H, —CO—CH), 4.85 (s, 2H, —CH—(OH), benzyl position); 7.05 (d, 4H, —CH—, benzene ring); 7.33 (d, 4H, —CH—, benzene ring)

This compound obtained above was reduced employing a 2.4 equivalent amount of sodium boron hydride to obtain 4,4'-bis(2,2,4-trimethyl-1,3-dihydroxypentyl)-diphenyl ether. The yield was not less than 90%.

1H-NMR (CDCl$_3$) δ (ppm): 0.80 (s, 6H, CH$_3$—); 0.84 (s, 6H, CH$_3$—); 1.02 (s, 12H, (CH$_3$)$_2$CH—); 1.75 (s, 2H, —CHOH—CH<), 3.20 (s, 2H, —CH—(OH)—CH<); 4.61 (s, 2H, —CH—(OH), benzyl position); 7.03 (d, 4H, —CH—, benzene ring); 7.34 (d, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed until the water exhibited pH 7, then added with 1 mol % tetra-n-butyl ammonium hydrogen sulfate and a 50% sodium hydroxide solution (in an amount of 10 equivalent amount), and reacted at (30±5)° C. for 12 hours. After the resulting reaction solution was washed with water, the organic phase thereof was washed with water, dried over anhydrous magnesium sulfate, and concentrated under reduced pressure to obtain a crude oxetane compound. The crude yield was 80 to 85%.

The crude product was column chromatographed through an alumina column employing hexane-methylene chloride (10:1) as an eluent and purified to obtain an oxetane compound of Exemplified compound III-3, which was a colorless and transparent liquid. The yield was 70 to 75%.

1H-NMR (CDCl$_3$) δ (ppm): 0.81 (s, 6H, CH$_3$—); 1.02 (s, 12H, (CH$_3$)$_2$CH—); 1.37 (s, 6H, CH$_3$—); 1.96 (s, 2H, —CHOH—CH<), 4.23 (s, 2H, —O—CH<oxetane ring); 5.47 (s, 2H, —CH—O—, benzyl position on the oxetane ring); 7.03 (d, 2H, —CH—, benzene ring); 7.26 (d, 2H, —CH—, benzene ring)

SYNTHETIC EXAMPLE 5

Exemplified Compound III-7: Synthesis of 4,4'-Bis (4-trifluoromethyl-3,3-dimethyloxetan-2-yl)-diphenyl ether Friedel-Crafts reaction was carried out in a mixture of 2.2 equivalent amount of 4,4,4-trifluoro-2,2-dimethyl-3-oxobutyrylchloride, a 1.0 equivalent amount of diphenyl ether, and a 2 equivalent amount of aluminum chloride as a catalyst to obtain 4,4'-bis(4,4,4-trifluoro-2,2-dimethyl-3-oxobutyryl)-diphenyl ether. The yield was 80 to 90%.

1H-NMR (CDCl$_3$) δ (ppm): 1.70 (s, 12H, CH$_3$—); 7.10 (d, 4H, —CH—, benzene ring); 7.96 (d, 4H, —CH—, benzene ring)

The diketone compound obtained above was reduced in alcohol employing sodium boron hydride in an amount of 4.6 mole per mol of the diketone to obtain 4,4'-bis(4,4,4-trifluoro-2,2-dimethyl-3-dihydroxybutyryl)-diphenyl ether. The yield was not less than 90%.

1H-NMR (CDCl$_3$) δ (ppm): 0.85 (s, 6H, CH$_3$—); 0.89 (s, 6H, CH$_3$—); 4.13 (s, 2H, —CHCF$_3$—OH); 4.65 (d, 2H, —CH—(OH), benzyl position); 7.05 (d, 4H, —CH—, benzene ring); 7.29 (d, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed until the water exhibited pH 7, then added with 1 mol % tetra-n-butyl ammonium hydrogen sulfate and a 50% sodium hydroxide solution (in an amount of 10 equivalent amount), and reacted at (30±5)° C. for 12 hours. After the resulting reaction solution was washed with water, the organic phase thereof was washed with water, dried over anhydrous magnesium sulfate, and concentrated under reduced pressure to obtain a crude oxetane compound. The crude yield was 85 to 90%.

The crude product was column chromatographed through an alumina column employing hexane-methylene chloride (10:1) as an eluent and purified to obtain an oxetane compound of Exemplified compound III-7, which was a colorless and transparent liquid. The yield was 75 to 80%.

1H-NMR (CDCl$_3$) δ (ppm): 0.83 (s, 6H, CH$_3$—); 1.40 (s, 6H, CH$_3$—); 4.13 (s, 2H, —CHCF$_3$—OH); 5.35 (s, 2H, —O—CH—, oxetane ring); 5.50 (d, 2H, —CH—(OH), benzyl position on the oxetane ring); 7.05 (d, 2H, —CH—, benzene ring); 7.29 (d, 2H, —CH—, benzene ring)

Another oxetane compound represented by formula (III) can be synthesized with good yield in the same manner as above from terephthalaldehyde derivatives, which can be prepared according to synthetic methods described in published literatures.

SYNTHETIC EXAMPLE 6

Exemplified Compound IV-1: Synthesis of Ethylenedioxy bis(p-phenylene)-bis-2,2'-(3,3-dimethyloxetane)

Ethylene glycol di-p-toluene sulfonate in a 1 equivalent amount, 4-hydroxybenzaldehyde in a 2.2 equivalent amount, potassium carbonate in a 2.2 equivalent amount, and potassium iodide in a 0.2 equivalent amount were dissolved in DMF 4 times the amount of ethylene glycol di-p-toluene sulfonate, heated at 120 to 130° C. in an oil bath, and reacted for 10 hours. After the reaction solution was allowed to cool, ice water in an amount 2 times that of the solution was added thereto to precipitate crystals. The precipitated crystals were filtered off, sufficiently washed with water, and dried. The yield was 80%. The resulting crystals were recrystallized from ethanol to obtain ethylenedioxy bis(4,4'-benzaldehyde). The yield was 65 to 70%.

1H-NMR (CDCl$_3$) δ (ppm): 4.51 (s, 4H, —CH$_2$—); 7.08 (d, 4H, —CH—, benzene ring); 7.86 (d, 4H, —CH—, benzene ring); 9.90 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 4 hours, and concentrated under reduced pressure. The resulting concentrate was dissolved in water ten times the concentrate while heating, and allowed to cool to produce a viscous product. The resulting viscous product was separated, dissolved in methylene chloride ten times the amount of the product, then mixed with alumina two times the product, and reacted at room temperature for 3 hours while stirring. The resulting solution was suction filtered with a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain ethylenedioxy bis(p-phenylene)-bis-1,1'-(2,2-dimethyl-1,3-propanediol). The yield was 70 to 75%.

1H-NMR (CDCl$_3$) δ (ppm): 0.81 (S, 6H, CH$_3$—); 0.85 (s, 6H, CH$_3$—); 3.47 (d, 2H, —CH$_2$—OH); 3.56 (d, 2H, —CH$_2$—OH); 4.33 (S, 4H, —CH$_2$—); 4.60 (s, 2H, —CH—OH—, benzyl position); 6.90 (d, 4H, —CH—, benzene ring); 7.26 (d, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%.

The crude product was recrystallized from acetonitrile to obtain an oxetane compound of Exemplified compound IV-1. The crude yield was 80 to 85%. mp. 113–116° C. (decomposition point)

1H-NMR (CDCl$_3$) δ (ppm): 0.83 (s, 6H, CH$_3$—); 1.50 (s, 6H, CH$_3$—); 4.25 (d, 2H, —O—CH$_2$—, oxetane ring); 4.33 (s, 4H, —CH$_2$—); 4.51 (d, 2H, —O—CH$_2$—, oxetane ring); 5.45 (s, 2H, —CH—O—, benzyl position on the oxetane ring); 6.97 (d, 4H, —CH—, benzene ring); 7.22 (d, 4H, —CH—, benzene ring)

SYNTHETIC EXAMPLE 7

Exemplified Compound IV-2: Synthesis of Propylenedioxy bis(p-phenylene)-bis-2,2'-(3,3-dimethyloxetane)

Propylene glycol di-p-toluene sulfonate in a 1 equivalent amount, 4-hydroxybenzaldehyde in a 2.2 equivalent amount, potassium carbonate in a 2.2 equivalent amount, and potassium iodide in a 0.2 equivalent amount were dissolved in DMF 4 times the amount of propylene glycol di-p-toluene sulfonate, heated at 120 to 130° C. in an oil bath, and reacted for 10 hours. After the reaction solution was allowed to cool, ice water in an amount 6 times that of the solution was added thereto to precipitate crystals. The precipitated crystals were filtered off, sufficiently washed with water, and dried. The yield was 75%. The resulting crystals were recrystallized from ethanol to obtain propylenedioxy bis(4,4'-benzaldehyde). The yield was 65 to 70%.

1H-NMR (CDCl$_3$) δ (ppm): 1.45 (d, 3H, —CH$_3$—); 4.23 (m, 1H, —CH$_2$—); 4.45 (m, 1H, —CH$_2$—); 4.76 (m, 1H, —CH$_2$—); 7.00–7.15 (m, 4H, —CH—, benzene ring); 7.86 (d, 4H, —CH—, benzene ring); 9.89 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 6 hours, and concentrated under reduced pressure. The concentrate was dissolved in water ten times the amount of the concentrate while heating, and allowed to cool to produce a viscous product. The resulting viscous product was separated, dissolved in methylene chloride ten times the product, then mixed with alumina two times the product, and reacted at room temperature for 3 hours while stirring. The resulting reaction solution was suction filtered employing a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain propylenedioxy bis(p-phenylene)-bis-1,1'-(2,2-dimethyl-1,3-propanediol). The yield was 70 to 75%. 1H-NMR (CDCl$_3$) δ (ppm): 0.81 (s, 6H, CH$_3$—); 0.85 (s, 6H, CH$_3$—); 1.40 (s, 3H, CH$_3$—); 3.47 (d, 2H, —CH$_2$—OH); 3.56 (d, 2H, —CH$_2$—OH); 4.03 (m, 1H, —CH$_2$—); 4.15 (m, 1H, —CH$_2$—); 4.76 (m, 1H, —CH—); 4.60 (s, 2H, —CH—OH—, benzyl position); 6.90–7.20 (m, 4H, —CH—, benzene ring); 7.26 (d, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%.

The crude product was column chromatographed through alumina column employing hexane-methylene chloride (10:1) as an eluent and purified to obtain an oxetane compound of Exemplified compound IV-2. The crude yield was 70 to 75%. This compound was solidified on cooling.

1H-NMR (CDCl$_3$) δ (ppm): 0.79 (s, 6H, CH$_3$—); 1.34 (s, 6H, CH$_3$—); 1.45 (d, 3H, CH$_3$—); 4.03 (m, 1H, —CH$_2$—); 4.13 (m, 1H, —CH$_2$—); 4.24 (d, 2H, —O—CH$_2$—, oxetane ring); 4.50 (d, 2H, —O—CH$_2$—, oxetane ring); 4.75 (m, 1H, —CH—); 5.44 (s, 2H, —CH—O—, benzyl position on the oxetane ring); 6.92 (d, 2H, —CH—, benzene ring); 7.21 (d, 4H, —CH—, benzene ring)

SYNTHETIC EXAMPLE 8

Exemplified Compound IV-3: Synthesis of 2,2-Dimethyl-1,3-propylenedioxy bis(p-phenylene)-bis-2,2'-(3,3-dimethyloxetane)

Neopentylene glycol di-p-toluene sulfonate in a 1 equivalent amount, 4-hydroxybenzaldehyde in a 2.2 equivalent amount, potassium carbonate in a 2.2 equivalent amount, and potassium iodide in a 0.2 equivalent amount were dissolved in DMF 4 times the amount of neopentylene glycol di-p-toluene sulfonate, heated at 120 to 130° C. in an oil bath, and reacted for 10 hours. After the reaction solution was allowed to cool, ice water in an amount 6 times that of the solution was added thereto to precipitate crystals. The precipitated crystals were filtered off, sufficiently washed with water, and dried. The yield was 80%. The resulting crystals were recrystallized from ethanol to obtain 2,2-dimethyl-1,3-propylenedioxy bis(4,4'-benzaldehyde). The yield was 65 to 70%.

1H-NMR (CDCl$_3$) δ (ppm): 1.20 (s, 6H, —CH$_2$—); 3.94 (s, 4H, —CH$_2$—); 7.00 (d, 4H, —CH—, benzene ring); 7.82 (d, 4H, —CH—, benzene ring); 9.87 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 6 hours, and concentrated under reduced pressure. The resulting concentrate was dissolved in water ten times the amount of the concentrate while heating, and allowed to cool to produce a viscous product. The resulting viscous product was separated, dissolved in methylene chloride ten times the amount of the product, then mixed with alumina two times the product, and reacted at room temperature for 3 hours while stirring. The resulting solution was suction filtered employing a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain 2,2-dimethyl-1,3-propylenedioxy bis(4,4'-benzaldehyde). The yield was 65 to 70%.

1H-NMR (CDCl$_3$) δ (ppm): 0.79 (s, 6H, CH$_3$—); 0.83 (s, 6H, CH$_3$—); 1.15 (s, 6H, CH$_3$—); 3.43 (d, 2H, —CH$_2$—OH); 3.53 (d, 2H, —CH$_2$—OH); 3.83 (m, 4H, —CH$_2$—); 4.55 (s, 2H, —CH—OH—, benzyl position); 6.83 (d, 4H, —CH—, benzene ring); 7.20 (d, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%.

The crude product was recrystallized from acetonitrile to obtain an oxetane compound of Exemplified compound IV-3. The crude yield was 70 to 75%. mp. 93–95° C. (decomposition point)

1H-NMR (CDCl$_3$) δ (ppm): 0.78 (s, 6H, CH$_3$—); 1.16 (s, 6H, CH$_3$—); 1.36 (s, 6H, CH$_3$—); 3.83 (m, 4H, —CH$_2$—); 4.23 (d, 2H, —O—CH$_2$—, oxetane ring); 4.49 (d, 2H, —O—CH$_2$—, oxetane ring); 5.43 (s, 2H, —CH—O—, benzyl position on the oxetane ring); 6.90 (d, 4H, —CH—, benzene ring); 7.19 (d, 4H, —CH—, benzene ring)

SYNTHETIC EXAMPLE 9

Exemplified Compound IV-24: Synthesis of Ethylenedioxy bis(2,6-dimethyl-p-phenylene)-bis-2,2'-(3,3-dimethyloxetane)

4-Hydroxy-3,5-dimethylbenzylaldehyde was prepared from 2,6-xylenol according to a method described on page 704, [Experiment Example 4.27] in "YUkikagobutsu no Gosei to Hanno (II)" of Shinjikken Kagakukoza Vol. 14 published by Maruzen Co., Ltd. The yield was not less than 95%.

1H-NMR (CDCl$_3$) δ (ppm): 2.31 (s, 6H, —CH$_2$—); 5.42 (s, 1H, —OH); 7.51 (s, 2H, —CH—, benzene ring); 9.81(s, 2H, —CHO)

Ethylene glycol di-p-toluene sulfonate in a 1 equivalent amount, 4-hydroxy-3,5-dimethylbenzaldehyde in a 2.2 equivalent amount, potassium carbonate in a 2.2 equivalent amount, and potassium iodide in a 0.2 equivalent amount were dissolved in DMF 4 times the amount of ethylene glycol di-p-toluene sulfonate, heated at 120 to 130° C. in an oil bath, and reacted for 10 hours. After the reaction solution was allowed to cool, ice water 6 times the amount of the solution was added thereto to precipitate crystals. The precipitated crystals were filtered off, sufficiently washed with water, and dried. The yield was 80%. The resulting crystals were recrystallized from ethanol to obtain ethylenedioxy bis(3,5-dimethyl-4,4'-benzaldehyde). The yield was 70 to 75%.

1H-NMR (CDCl$_3$) δ (ppm): 2.41 (s, 12H, CH$_3$—); 4.20 (s, 4H, —CH$_2$—); 7.59 (d, 4H, —CH—, benzene ring); 9.92 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 4 hours, and concentrated under reduced pressure. The resulting concentrate was dissolved in water ten times the amount of the concentrate while heating, and allowed to cool to produce a viscous product. The resulting viscous product was separated, dissolved in methylene chloride ten times the product, then mixed with alumina two times the product, and reacted at room temperature for 3 hours while stirring. The reaction solution was suction filtered employing a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain white crystals, ethylenedioxy bis(2,6-dimethyl-p-phenylene)-bis-1,1'-(2,2-dimethyl-1,3-propanediol. The yield was 70 to 75%.

1H-NMR (CDCl$_3$) δ (ppm): 0.90 (s, 12H, CH$_3$—); 2.34 (s, 12H, CH$_3$-Ph); 3.47 (m, 4H, —CH$_2$—OH); 4.13 (m, 4H, —CH$_2$—O—); 4.58 (s, 2H, —CH(OH)— at benzyl position); 6.98 (s, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%. The crude product was column chromatographed through alumina column employing hexane-methylene chloride (10:1) as an eluent and purified to obtain a colorless viscous liquid, an oxetane compound of Exemplified compound IV-24. The yield was 70 to 75%.

1H-NMR (CDCl$_3$) δ (ppm): 0.82 (s, 6H, CH$_3$—); 1.42 (s, 6H, CH$_3$—); 2.42 (s, 12H, CH$_3$—); 4.12 (s, 4H, —O—CH$_2$CH$_2$—O—); 4.25 (d, 2H, —O—CH$_2$—, oxetane ring); 4.50 (d, 2H, —O—CH$_2$—, oxetane ring); 5.40 (s, 2H, —CH—O—, benzyl position on the oxetane ring); 6.94 (d, 4H, —CH—, benzene ring)

Another oxetane compound represented by formula (IV) can be synthesized with good yield in the same manner as above from 4-hydroxybenzaldehyde derivatives, which can be prepared according to synthetic methods described in published literatures.

SYNTHETIC EXAMPLE 10

Exemplified Compound V-2: Synthesis of Methylene bis(p-methoxy-m-phenylene)-bis-2,2'-(3,3-dimethyloxetane)

4-Methoxybenzaldehyde in an 2.0 equivalent amount was dissolved in methylene chloride 5 times the volume of the aldehyde, and was added with zinc chloride of 0.2 equivalent amount. To the resulting solution was dropwise added a 1.5 equivalent amount of chloromethyl methyl ether, while cooling so that the temperature of the reaction solution does not exceed 40° C. Thereafter, the reaction solution was reacted at room temperature for further 4 hours. Then the reaction solution was washed with water, dried over anhydrous magnesium sulfate, and concentrated under reduced pressure to obtain crude crystals. The yield was 80%. The crude crystals were recrystallized from ethanol to obtain methylene bis-3,3'-(4-methoxybenzaldehyde). The yield was 65 to 70%. 1H-NMR (CDCl$_3$) δ (ppm): 3.84 (s, 6H, —CH$_3$—O—); 3.90 (s, 2H, —CH$_2$—); 7.0 (m, 2H, —CH—, benzene ring); 7.70–7.75 (m, 4H, —CH—, benzene ring); 9.90 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 4 hours, and concentrated under reduced pressure. The resulting concentrate was dissolved in water ten times the amount of the concentrate while heating, and allowed to cool to produce a viscous product. The resulting viscous product was separated, dissolved in methylene chloride ten times the amount of the product, then mixed with alumina two times the product, and reacted at room temperature for 3 hours while stirring. The resulting reaction solution was suction filtered employing a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain white crystals, methylene bis(2-methoxy-m-phenylene)-bis-1,1'-(2,2-dimethyl-1,3-propanediol). The yield was 70 to 75%.

1H-NMR (CDCl$_3$) δ (ppm): 0.80 (s, 6H, CH$_3$—); 0.84 (s, 6H, CH$_3$—); 3.45 (d, 2H, —CH$_2$—OH); 3.53 (d, 2H, —CH$_2$—OH); 3.84 (s, 6H, CH$_3$—O—); 3.90 (s, 2H, —CH$_2$—); 4.56 (s, 2H, —CH(—OH)—, benzyl position); 6.78 (m, 2H, —CH—, benzene ring); 7.2 (m, 4H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%.

The crude product was recrystallized from acetonitrile to obtain an oxetane compound of Exemplified compound V-2. The yield was 70 to 75%.

1H-NMR (CDCl$_3$) δ (ppm): 0.84 (s, 6H, CH$_3$—); 1.51 (s, 6H, CH$_3$—); 3.84 (s, 6H, CH$_3$—O—); 3.90 (s, 2H, —CH$_2$—); 4.24 (d, 2H, —O—CH$_2$—, oxetane ring); 4.50 (d, 2H, —O—CH$_2$—, oxetane ring); 5.44 (s, 2H, —CH—O—, benzyl position on the oxetane ring); 6.82 (m, 2H, —CH—, benzene ring); 7.2–7.3 (m, 4H, —CH—, benzene ring)

SYNTHETIC EXAMPLE 11

Exemplified Compound V-6: Synthesis of ethylenedioxy bis(p-methoxy-m-phenylene)-bis-2,2'-(3,3-dimethyloxetane)

Ethylene glycol di-p-toluene sulfonate in a 1 equivalent amount, 3-hydroxy-4-methoxybenzaldehyde in a 2.2 equivalent amount, potassium carbonate in a 2.2 equivalent amount, and potassium iodide in a 0.2 equivalent amount were dissolved in DMF 4 times the amount of ethylene glycol di-p-toluene sulfonate, heated at 120 to 130° C. in an oil bath, and reacted for 10 hours. After the reaction solution was allowed to cool, ice water 2 times the amount of the solution was added thereto to precipitate crystals. The precipitated crystals were filtered off, sufficiently washed with water, and dried. The yield was 80%. The resulting crystals were recrystallized from ethanol to obtain ethylenedioxy bis-3,3'-(4-methoxybenzaldehyde). The yield was 65 to 70%.

1H-NMR (CDCl$_3$) δ (ppm): 3.82 (s, 6H, —CH$_3$—O—); 4.49 (s, 4H, —CH$_2$—), 6.99 (m, 4H, —CH—, benzene ring); 7.37 (m, 4H, —CH—, benzene ring); 7.45 (m, 4H, —CH—, benzene ring); 9.90 (s, 2H, —CHO)

Isobutyl aldehyde of 4.2 equivalent amount and a 1.0 equivalent amount of the dialdehyde obtained above were dissolved in methanol, and a methanol solution of a 2.1 equivalent amount of potassium hydroxide was dropwise added thereto at room temperature. The resulting solution was reacted at 60° C. for 4 hours, and concentrated under reduced pressure. The resulting concentrate was dissolved in water ten times the amount of the concentrate while heating, and allowed to cool to produce a viscous product. The resulting viscous product was separated, dissolved in methylene chloride ten times the amount of the product, then mixed with alumina two times the product, and reacted at room temperature for 3 hours while stirring. The resulting reaction solution was suction filtered employing a filter with a slight amount of alumina, and washed with methylene chloride in the same amount as the solution to obtain a filtrate. The resulting filtrate was concentrated under reduced pressure to obtain crude crystals. The crude crystals were recrystallized from toluene-methylene chloride to obtain ethylenedioxy bis(p-phenylene)-bis-1,1'-(2,2-dimethyl-1,3-propanediol). The yield was 70 to 75%.

1H-NMR (CDCl$_3$) δ (ppm): 0.80 (s, 6H, CH$_3$—); 0.84 (s, 6H, CH$_3$—); 3.46 (d, 2H, —CH$_2$—OH); 3.54 (d, 2H, —CH$_2$—OH); 3.82 (s, 6H, CH$_3$—O—); 4.30 (s, 4H, —CH$_2$—); 4.50 (s, 2H, —CH—OH—, benzyl position); 6.8–6.9 (m, 6H, —CH—, benzene ring)

The tetraol compound obtained above was reacted and sulfonated in methylene chloride, employing methanesulfonyl chloride in an amount of 2.1 mole per mol of the tetraol and triethylamine in an amount of 2.2 mole per mol of the tetraol. The reaction solution was washed with water until the water exhibited pH 7, then added with 1 mol % tetra-n-butyl ammonium hydrogen sulfate and a 50% sodium hydroxide solution (in an amount of 10 equivalent amount), and reacted at (30±5)° C. for 6 hours. The resulting reaction solution was washed with water, dried over anhydrous magnesium sulfate, and concentrated under reduced pressure to obtain a crude oxetane compound. The crude yield was 80 to 85%.

The crude product was recrystallized from acetonitrile to obtain an oxetane compound of Exemplified compound V-6. The crude yield was 70 to 75%.

1H-NMR (CDCl$_3$) δ (ppm): 0.80 (s, 6H, CH$_3$—); 1.49 (s, 6H, CH$_3$—); 4.25 (d, 2H, —O—CH$_2$—, oxetane ring); 4.30 (s, 4H, —CH$_2$—); 4.50 (d, 2H, —O—CH$_2$—, oxetane ring); 5.40 (s, 2H, —CH—O—, benzyl position on the oxetane ring); 6.8–6.9 (m, 6H, —CH—, benzene ring)

Another oxetane compound represented by formula (V) can be synthesized with good yield from 4-alkoxybenzaldehyde derivatives, which can be synthesized according to methods described in known literatures.

An ink composition for ink jet recording containing an oxetane compound with an oxetane ring having no substituent at the 2-position together with the oxetane compound of the invention is preferred since it can increase its sensitivity and improve physical properties of cured ink film.

Next, explanation will be made regarding the oxetane compound with an oxetane ring having no substituent at the 2-position. As one example of the oxetane compound with an oxetane ring having no substituent at the 2-position, an oxetane compound represented by the following formula (101) is cited.

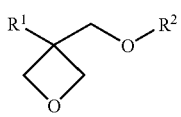

Formula (101)

In formula (101), R$^1$ represents a hydrogen atom, an alkyl group having from 1 to 6 carbon atoms such as a methyl group, an ethyl group, a propyl group, a butyl group, etc.; a fluoroalkyl group having from 1 to 6 carbon atoms; an allyl group; an aryl group; a furyl group; or a thienyl group; and R$^2$ represents an alkyl group having from 1 to 6 carbon atoms such as a methyl group, an ethyl group, a propyl group, a butyl group, etc.; an alkenyl group having from 2 to 6 carbon atoms such as a 1-propenyl group, a 2-propenyl group, a 2-methyl-1-propenyl group, a 2-methyl-2-propenyl group, a 1-butenyl group, a 2-butenyl group, a 3-butenyl group, etc.), an aromatic ring-containing group such as a phenyl group, a benzyl group, a fluorobenzyl group, a methoxybenzyl group; a phenoxyethyl group, etc.; an alkylcarbonyl group having from 2 to 6 carbon atoms such as an ethylcarbonyl group, a propylcarbonyl group, a butylcarbonyl group, etc.; an alkoxycarbonyl group having from 2 to 6 carbon carbons such as an ethoxycarbonyl group, a propoxycarbonyl group, a butoxycarbonyl group, etc.; an N-alkylcarbamoyl group having from 2 to 6 carbon atoms such as an ethylcarbamoyl group, a propylcarbamoyl group, a butylcarbamoyl group, a pentylcarbamoyl, etc. The oxetane compound used in the invention is preferably a compound having one oxetane ring in that the composition containing such a compound is excellent in tackiness, low in viscosity, and is easy to handle.

As one example of an oxetane compound having two oxetane rings, an oxetane compound represented by the following formula (102) is cited.

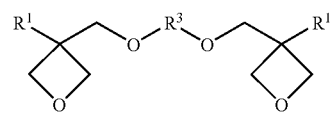

Formula (102)

In formula (102), R$^1$ represents the same group as those denoted in R$_1$ in formula (101); and R$^3$ represents a straight chained or branched alkylene group such as an ethylene group, a propylene group, a butylene group, etc.; a straight chained or branched polyalkyleneoxy group such as a poly(ethyleneoxy) group, a poly(propyleneoxy group, etc.; a straight chained or branched unsaturated divalent hydrocarbon group such a propenylene group, a methylpropenylene group, a butenylene group, etc.; an alkylene group containing a carbonyl group; an alkylene group containing a carbonyloxy group; or an alkylene group containing a carbamoyl group.

R$^3$ also represents a divalent group selected from groups represented by the following formulae (103), (104), and (105).

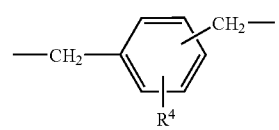

Formula (103)

In formula (103), R$^4$ represents a hydrogen atom, an alkyl group having from 1 to 4 carbon atoms such as a methyl group, an ethyl group, a propyl group, a butyl group, etc.; an alkoxy group having from 1 to 4 carbon atoms such as a methoxy group, an ethoxy group, a propoxy group, a butoxy group, etc.; a halogen atom such as a chlorine atom, a bromine atom, etc.; a nitro group; a cyano group; a mercapto group; a lower alkylcarboxy group; a carboxyl group; or a carbamoyl group.

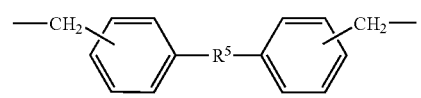

Formula (104)

In formula (104), $R^5$ represents an oxygen atom, a sulfur atom, a methylene group, —NH—, —SO—, —SO$_2$—, —(CF$_3$)$_2$—, or —C(CH$_3$)$_2$—.

Formula (105)

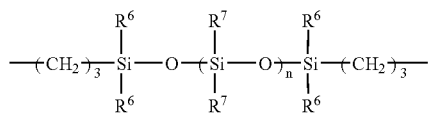

In formula (105), $R^6$ represents an alkyl group having from 1 to 4 carbon atoms such as a methyl group, an ethyl group, a propyl group, a butyl group, etc., or an aryl group; "n" represents an integer of from 0 to 2000; and $R^7$ represents an alkyl group having from 1 to 4 carbon atoms such as a methyl group, an ethyl group, a propyl group, a butyl group, etc, or an aryl group, or a group represented by the following formula (106).

Formula (106)

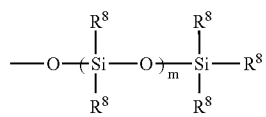

In formula (106), $R^8$ represents an alkyl group having from 1 to 4 carbon atoms such as a methyl group, an ethyl group, a propyl group, a butyl group, etc., or an aryl group; and m represents an integer of from 0 to 100.

Examples of a compound having two oxetane rings include the following compounds.

Exemplified compound 11

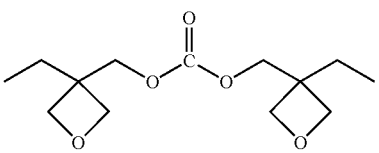

Exemplified compound 12

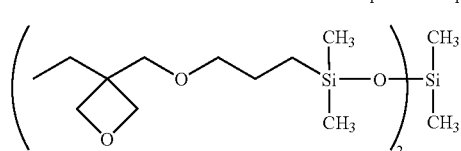

Exemplified compound 11 is a compound in which in formula (102), $R^1$ is an ethyl group, and $R^3$ is a carbonyl group. Exemplified compound 12 is a compound in which in formula (102), $R^1$ is an ethyl group, and $R^3$ is a group in which in formula (105), $R^6$ is a methyl group, $R^7$ is a methyl group, and n is 1.

As another example of an oxetane compound having two oxetane rings, an oxetane compound represented by the following formula (107) is cited.

Formula (107)

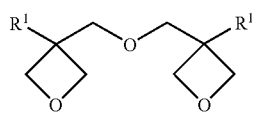

In formula (107), $R^1$ is the same as those denoted in $R^1$ of formula (101).

As an example of an oxetane compound having three or four oxetane rings, an oxetane compound represented by the following formula (108) is cited.

Formula (108)

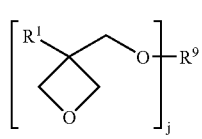

In formula (108), $R^1$ is the same as those denoted in $R^1$ of formula (101); $R^9$ represents a branched alkylene group having 1 to 12 carbon atoms such as a group represented by formula A, B or C below, a branched polyalkyleneoxy group such as a group represented by formula D below, or a branched alkylene group containing a silylether group such as a group represented by E below; and j represents an integer of 3 or 4.

A

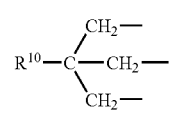

B

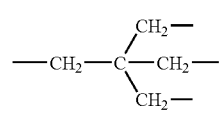

C

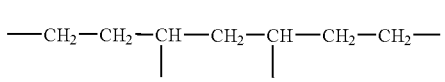

D

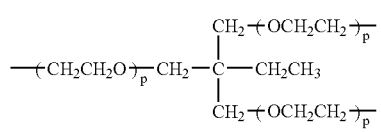

E

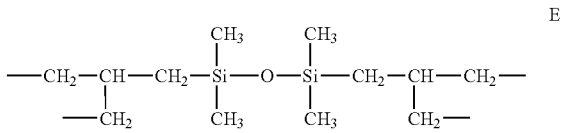

In formula A, $R^{10}$ represents a lower alkyl group such as a methyl group, an ethyl group, or a propyl group. In formula D, p represents an integer of from 1 to 10.

As an example of an oxetane compound having four oxetane rings, Exemplified compound 13 below is cited.

Exemplified compound 13

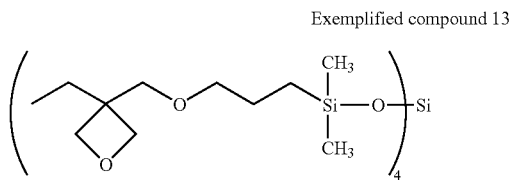

As a compound having 1 to 4 oxetane rings other than the compounds described above, a compound represented by formula (109) below is cited.

Formula (109)

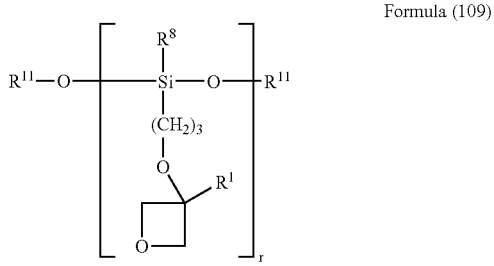

In formula (109), $R^8$ is the same as those denoted in $R^8$ of formula (106); $R^{11}$ represents an alkyl group having 1 to 4 carbon atoms such as a methyl group, an ethyl group, a propyl group or a butyl group, or a trialkylsilyl group; r represents an integer of from 1 to 4; and $R^1$ is the same as those denoted in $R^1$ of formula (106).

The preferred oxetane compounds used in the invention are Exemplified compounds (14), (15) and (16) as shown below.

Exemplified compound (14)

Exemplified compound (15)

Exemplified compound (16)

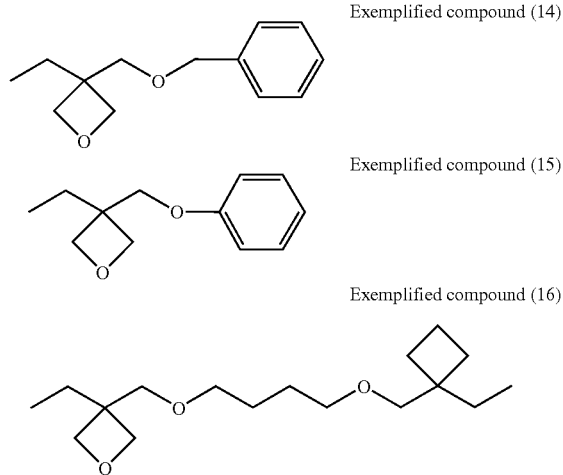

Synthetic method of the above-described oxetane compounds is not specifically limited, and known methods can be used. There is, for example, a method disclosed in D. B., Pattison, J. Am. Chem. Soc., 3455, 79 (1957) in which an oxetane ring is synthesized from diols.

Besides the above-described oxetane compounds, polymeric oxetane compounds having 1 to 4 oxetane rings with a molecular weight of 1000 to 5000 can be used. Examples thereof include the following compounds.

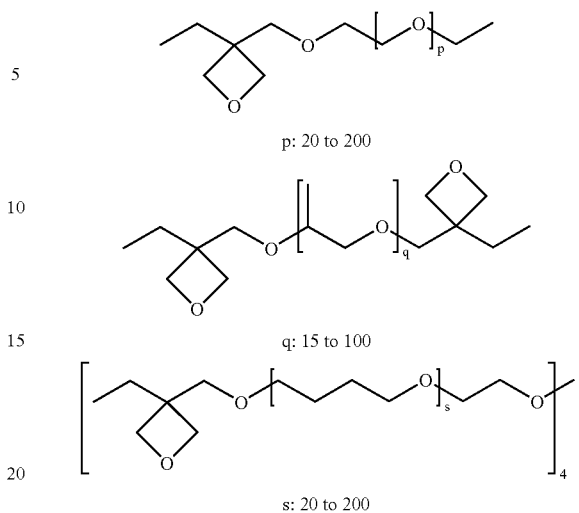

p: 20 to 200 q: 15 to 100 s: 20 to 200

The ink composition for ink jet recording of the invention can contain an epoxy compound or a vinyl ether compound together with the oxetane compound of the invention.

The epoxy compound content of the ink composition for ink jet recording of the invention is preferably from 0 to 50% by weight, more preferably from 0 to 40% by weight, and still more preferably from 5 to 30% by weight.

In the epoxy compound, a preferable aromatic epoxide is a di- or poly-glycidyl ether manufactured by a reaction of polyhydric phenol having at least one aromatic ring or of an alkylene oxide adduct thereof with epichlorohydrin, and includes, for example, such as di- or poly-glycidyl ether of bisphenol A or of an alkylene oxide adduct thereof, di- or poly-glycidyl ether of hydrogenated bisphenol A or of an alkylene oxide adduct thereof and novolac type epoxy resin. Herein, alkylene oxide includes such as ethylene oxide and propylene oxide.

An alicyclic epoxide is preferably a compound containing cyclohexene oxide or cyclopentene oxide obtained by epoxydizing a compound having at least one cycloalkane ring such as cyclohexene or cyclopentene by use of a suitable oxidizing agent such as hydrogen peroxide or a peracid.

A preferable aliphatic epoxide is such as di- or polyglycidyl ether of aliphatic polyhydric alcohol or of an alkylene oxide adduct thereof; the typical examples include diglycidyl ether of alkylene glycol, such as diglycidyl ether of ethylene glycol, diglycidyl ether of propylene glycol and diglycidyl ether of 1,6-hexane diol; polyglycidyl ether of polyhydric alcohol such as di- or triglycidyl ether of glycerin or of an alkylene oxide adduct thereof; and diglycidyl ether of polyalkylene glycol such as diglycidyl ether of polyethylene glycol or of an alkylene oxide adduct thereof and diglycidyl ether of polypropylene glycol or of an alkylene oxide adduct thereof. Herein, alkylene oxide includes such as ethylene oxide and propylene oxide.

Among these epoxides above, aromatic epoxide and alicyclic epoxide are preferable and alicyclic epoxide is specifically preferable, taking a quick curing property in consideration. In the invention, the epoxides described above may be utilized alone or as a mixture of two or more kinds thereof.

Especially preferred compounds as the alicyclic epoxide are compounds represented by formula (VI), (VII) or (VIII) above.

In formula (VI), $R_{601}$ represents an aliphatic group; m7 represents an integer of from 0 to 2; $X_1$ represents $—(CH_2)_{n6}—$ or $—(O)_{n6}—$, in which n6 is 0 or 1; p1 and q1 independently represent 0 or 1; r1 is an integer of from 1 to 3; and $L_3$ represents a simple bond or a (r1+1)-valent linkage group having a carbon atom number of from 1 to 15, which may contain an oxygen atom or a sulfur atom in the main chain.

In formula (VII), $R_{701}$ represents an aliphatic group; m7 represents an integer of from 0 to 2; $X_2$ represents $—(CH_2)_{n7}—$ or $—(O)_{n7}—$, in which n7 is 0 or 1; p2 and q2 independently represent 0 or 1; r2 is an integer of from 1 to 3; and $L_4$ represents a simple bond or a (r2+1)-valent linkage group having a carbon atom number of from 1 to 15, which may contain an oxygen atom or a sulfur atom in the main chain.

In formula (VIII), $R_{801}$ represents an aliphatic group; m8 represents an integer of from 0 to 2; $X_3$ represents $—(CH_2)_{n8}—$ or $—(O)_{n8}—$, in which n8 is 0 or 1; $R_{802}$ and $R_{803}$ represent a substituent; and p3 represents 0 or 1.

Further, the alicyclic epoxide represented by formula (VI), (VII) or (VIII) above will be explained.

In the formulas above, $R_{601}$, $R_{701}$ and $R_{801}$ independently represent an aliphatic group. Examples of the aliphatic group include an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group). The aliphatic group is preferably an alkyl group having a carbon atom number of from 1 to 3, and more preferably a methyl group or an ethyl group. m6, m7, and m8 independently represent an integer of from 0 to 2, and are preferably 2 or more. $X_1$ represents $—(CH_2)_{n6}—$ or $—(O)_{n6}—$, $X_2$ represents $—(CH_2)_{n7}—$ or $—(O)_{n7}—$, and $X_3$ represents $—(CH_2)_{n8}—$ or $—(O)_{n8}—$. n6, n7 and n8 independently represent 0 or 1. When n6, n7 and n8 are 0, none of $X_1$, $X_2$, and $X_3$ exist. (m6+n6), (m7+n7) and (m8+n8) are preferably 1 or more, respectively.

$L_3$ represents a simple bond or a (r1+1)-valent linkage group having a carbon atom number of from 1 to 15, which may contain an oxygen atom or a sulfur atom in the main chain. $L_4$ represents a simple bond or a (r2+1)-valent linkage group having a carbon atom number of from 1 to 15, which may contain an oxygen atom or a sulfur atom in the main chain. Examples of a divalent linkage group having a carbon atom number of from 1 to 15, which may contain an oxygen atom or a sulfur atom in the main chain include groups described below and a combination of these groups and $—O—$, $—S—$, $—CO—$, or $—CS—$.

a methylene group [$—CH_2—$], an ethylidene group [$>CHCH_3$], an isopropylidene group [$>C(CH_3)_2$], a 1,2-ethylene group [$—CH_2CH_2—$], a 1,2-propylene group [$—CH(CH_3)CH_2—$], a 1,3-propanediyl group [$—CH_2CH_2CH_2—$], a 2,2-dimethyl-1,3-propanediyl group [$—CH_2C(CH_3)_2CH_2—$], a 2,2-dimethoxy-1,3-propanediyl group [$—CH_2C(OCH_3)_2CH_2—$], a 2,2-dimethoxymethyl-1,3-propanediyl group [$—CH_2C(CH_2OCH_3)_2CH_2—$], a 1-methyl-1,3-propanediyl group [$—CH(CH_3)CH_2CH_2—$], a 1,4-butanediyl group [$—CH_2CH_2CH_2CH_2—$], a 1,5-pentanediyl group [$—CH_2CH_2CH_2CH_2CH_2—$], an oxydiethylene group [$—CH_2CH_2OCH_2CH_2—$], a thiodiethylene group [$—CH_2CH_2SCH_2CH_2—$], a 3-oxothiodiethylene group [$—CH_2CH_2SOCH_2CH_2—$], a 3,3-dioxothiodiethylene group [$—CH_2CH_2SO_2CH_2CH_2—$], a 1,4-dimethyl-3-oxa-1,5-pentanediyl group [$—CH(CH_3)CH_2O$ $CH(CH_3)CH_2—$], a 3-oxopentanediyl group [$—CH_2CH_2COCH_2CH_2—$], a 1,5-dioxo-3-oxapentanediyl group [$—COCH_2OCH_2CO—$], a 4-oxa-1,7-heptanediyl group [$—CH_2CH_2CH_2OCH_2CH_2CH_2—$], a 3,6-dioxa-1,8-octanediyl group [$—CH_2CH_2OCH_2CH_2OCH_2CH_2—$], a 1,4,7-trimethyl-3,6-dioxa-1,8-octanediyl group [$—CH(CH_3)CH_2O$ $CH(CH_3)CH_2OCH(CH_3)CH_2—$], a 5,5-dimethyl-3,7-dioxa-1,9-nonanediyl group [$—CH_2CH_2OCH_2C(CH_3)_2CH_2OCH_2CH_2—$], 5,5-dimethoxy-3,7-dioxa-1,9-nonanediyl group [$CH_2CH_2OCH_2C(OCH_3)_2CH_2OCH_2CH_2—$], a 5-dimethoxymethyl-3,7-dioxa-1,9-nonanediyl group [$—CH_2CH_2OCH_2C(CH_2OCH_3)_2CH_2OCH_2CH_2—$], a 4,7-dioxo-3,8-dioxa-1,10-decanediyl group [$—CH_2CH_2O—COCH_2CH_2CO—OCH_2CH_2—$], a 3,8-dioxo 4,7-dioxa-1,10-decanediyl group [$—CH_2CH_2CO—OCH_2CH_2O—COCH_2CH_2—$], a 1,3-cyclopentanediyl group [-1,3-$C_5H_8$—], a 1,2-cyclohexanediyl group [-1,2-$C_6H_{10}$—], a 1,3-cyclohexanediyl group [-1,3-$C_6H_{10}$—], a 1,4-cyclohexanediyl group [-1,4-$C_6H_{10}$—], a 2,5-tetrahydrofuranediyl group [2,5-$C_4H_6O$—], a p-phenylene group [$—P—C_6H_4—$], a m-phenylene group [-m-$C_6H_4—$], an α,α'-o-xylylene group [-o-$CH_2—C_6H_4—CH_2—$], an α,α'-m-xylylene group [-m-$CH_2—C_6H_4—CH_2—$], an α,α'-p-xylylene group [-p-$CH_2—C_6H_4—CH_2—$], a furane-2,5-diyl-bismethylene group [2,5-$CH_2—C_4H_2O—CH_2—$], a thiophene-2,5-diyl-bismethylene group [2,5-$CH_2—C_4H_2S—CH_2—$], an isopropylidene-p-phenylene group [-p-$C_6H_4—C(CH_3)_2$-p-$C_6H_4—$].

Examples of the 3 or more valent linkage group include groups, which is obtained by eliminating a hydrogen atom from the divalent linkage groups exemplified above, and a combination of these groups and $—O—$, $—S—$, $—CO—$, or $—CS—$.

$L_3$ and $L_4$ may have a substituent. Examples of the substituent include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, an alkyl group, and an alkoxy group.

$L_3$ and $L_4$ represent preferably a divalent linkage group having a carbon atom number of from 1 to 8, which may contain an oxygen atom or a sulfur atom in the main chain, and more preferably a divalent linkage group having a carbon atom number of from 1 to 5, the main chain of which consists of a carbon atom. $L_3$ and $L_4$ are preferably one having a secondary carbon atom in the main chain and more preferably one having a tertiary carbon atom in the main chain. p1 and q1 independently represent an integer of 0 or 1, and (p1+q1) represents an integer of preferably 1 or more.

P2 and q2 independently represent an integer of 0 or 1, and p2 and q2 represent an integer of preferably 1, respectively.

$R_{802}$ and $R_{803}$ independently represent a substituent. Examples of the substituent include a halogen atom (for example, a chlorine atom, a bromine atom, or a fluorine atom), an alkyl group having a carbon atom number of from 1 to 8 (for example, a methyl group, an ethyl group, a propyl group, an isopropyl group, or a butyl group), an alkoxy group having a carbon atom number of from 1 to 8 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, an alkyl group, an alkoxy group, and an alkoxycarbonyl group. These substituents may be further substituted. Examples of the substituent include the same as those denoted above. $R_{802}$ and $R_{803}$ may combine with each other to form a ring. $R_{802}$ and $R_{803}$ may share the same carbon atom in the formula. P3 is an integer of 0 or 1, and preferably 0.

Preferred examples of the alicyclic epoxide will be listed below, but the invention is not limited thereto.

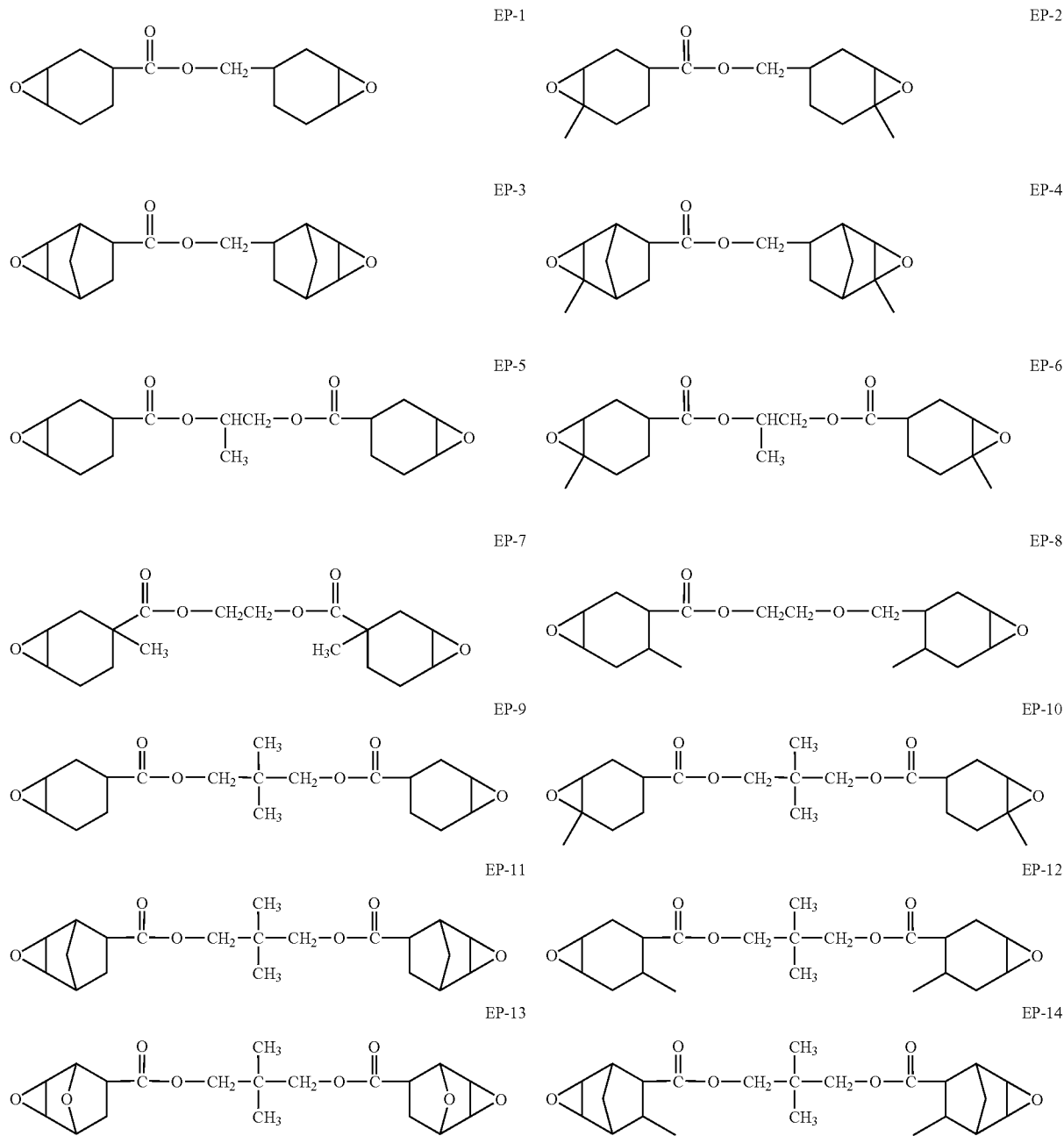

-continued
EP-15
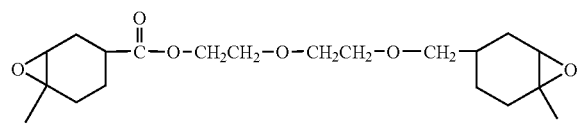
EP-16
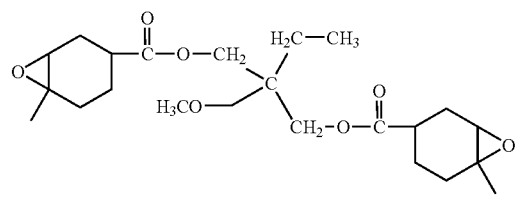
EP-17
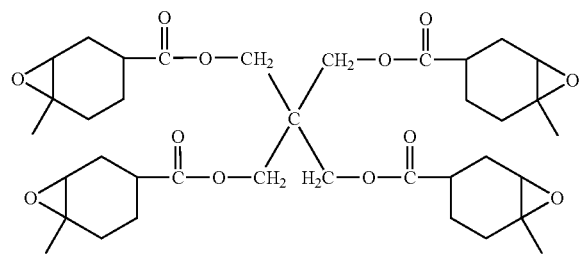
EP-18
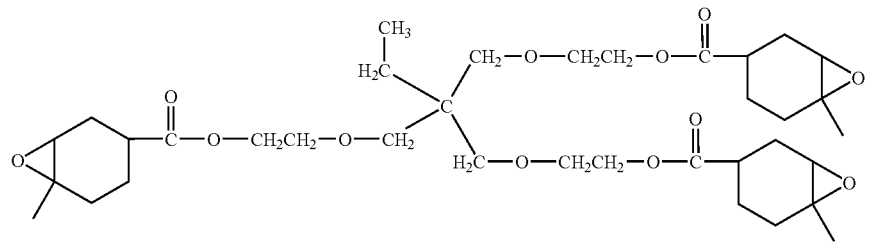
EP-19
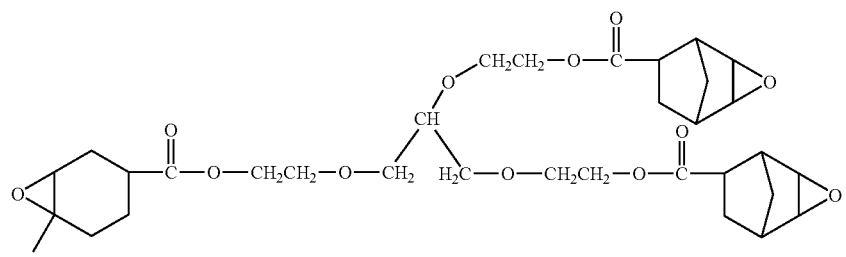
EP-20
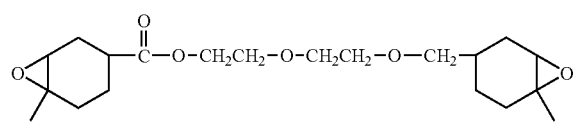
EP-21
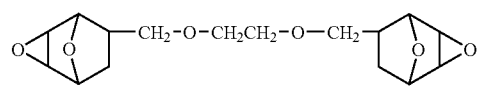
EP-22
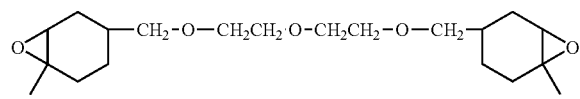
EP-23
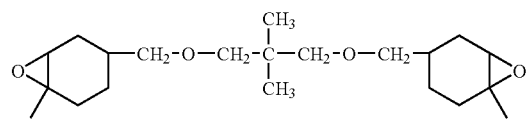
EP-24
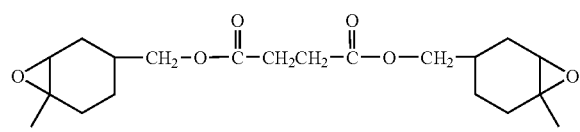
EP-25
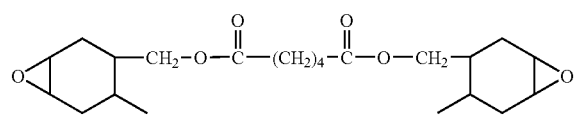

-continued

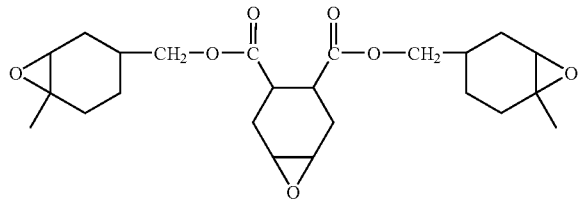

EP-26

EP-27

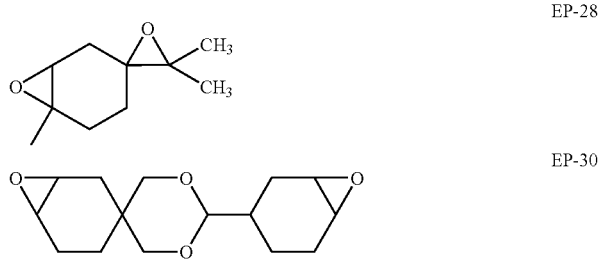

EP-28

EP-29

EP-30

EP-31

Examples of the vinyl ether compound include di- or tri-vinyl ether compounds such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, and trimethylol propane trivinyl ether; and mono vinyl ether compounds such as ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether and octadecyl vinyl ether.

In these vinyl ether compounds, when the hardenability, adhesion or surface hardness is considered, di- or tri-vinyl ether compounds are preferable, and particularly divinyl ether compounds are preferable. In the present invention, these vinyl ether compounds may be used alone or as an admixture of two or more kinds thereof.

The ink composition for ink jet recording of the invention contains a compound generating an acid on irradiation of actinic ray (hereinafter also referred to as a photolytically acid generating agent) together with the oxetane compound of the invention.

The photolytically acid generating agent content of the ink composition for ink jet recording of the invention is preferably from 1 to 20% by weight, and more preferably from 2 to 10% by weight.

As the photolytically acid generating agent used in ink of a cationic polymerization type, for example, compounds used in a chemical amplification type photo resist or in a light cation polymerizable composition are used (Organic electronics material seminar "Organic material for imaging" from Bunshin publishing house (1993), refer to page 187–192). Example suitable for the present invention will be listed below.

Firstly, an onium compound, for example, a $B(C_6F_5)_4^-$, $PF_6^-$, $AsF_6^-$, $SbF_6^-$, $CF_3SO_3^-$ salt of an aromatic onium ion such as an aromatic diazonium, ammonium, iodonium, sulfonium, or phosphonium, can be listed.

Onium compounds having a borate anion or $PF_6^-$ as a counter anion is preferred in view of high acid generation capability. Example of the onium compounds used in the invention will be shown below.

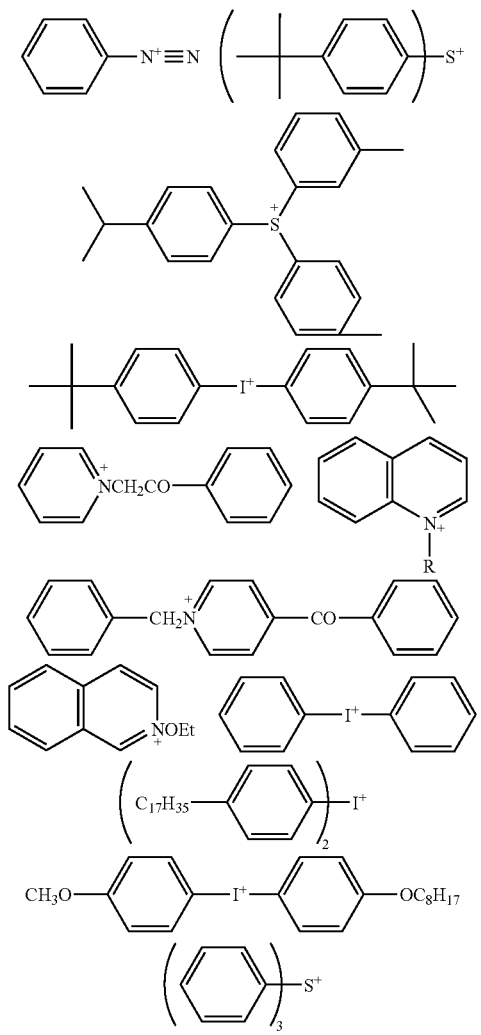

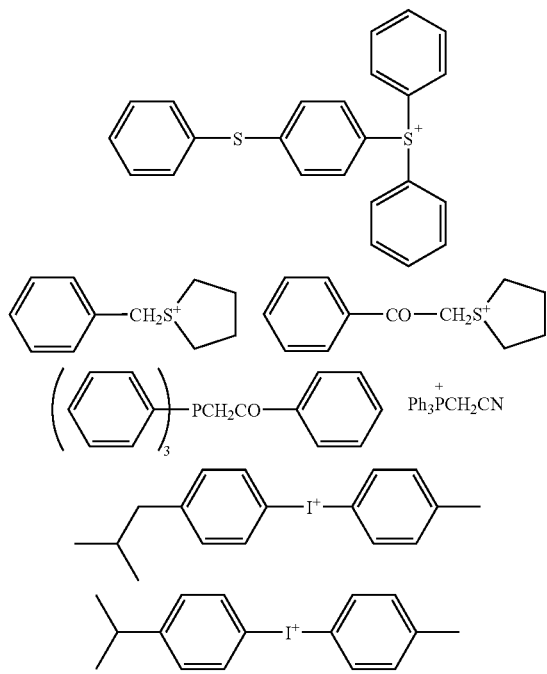

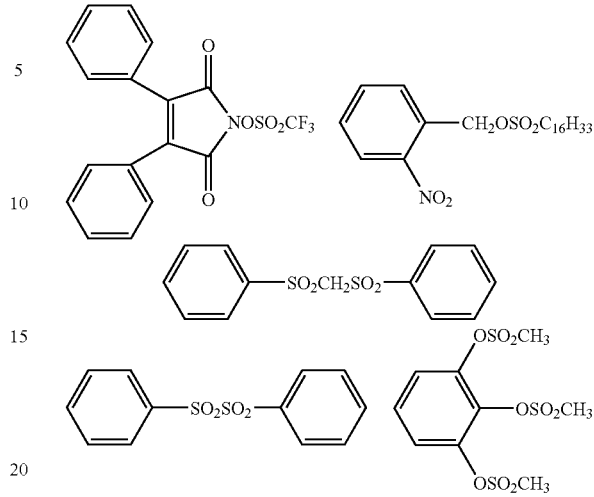

Secondly, sulfone compounds, which generate sulfonic acid, can be listed. Examples thereof will be shown below.

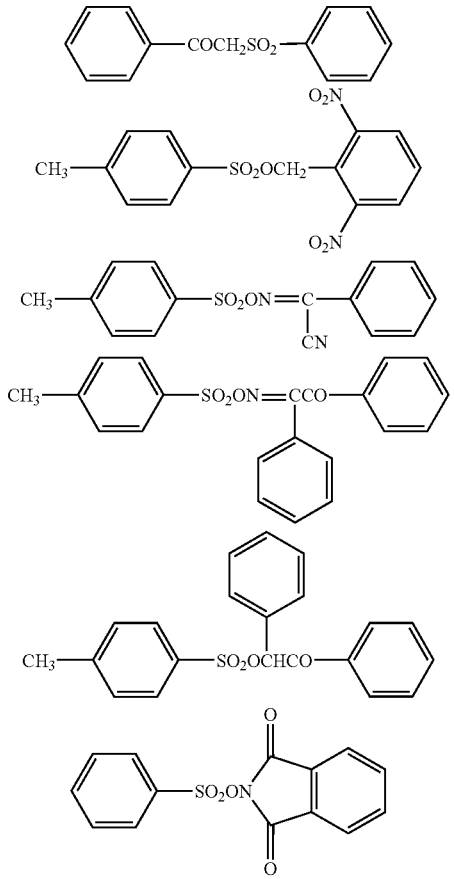

Thirdly, halide compounds, which generate hydrogen halide, can also be used. Examples thereof will be shown below.

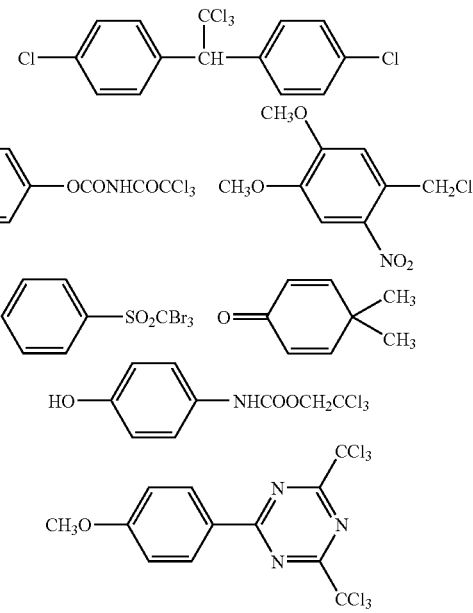

Fourthly, iron arene complexes, for example, those as described below can be listed.

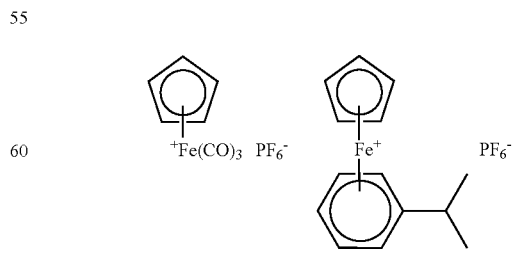

Examples of the photolytically acid generating agent used in the invention include arylsulfonium derivatives (for example, Silacure UVI-6990 or Silacure UVI-6974 produced by Union Carbide Co., Ltd., or Adekaoptomer SP-150, Adekaoptomer SP-152, Adekaoptomer SP-170, or Adekaoptomer SP-172 produced by Asahi Denka Kogyo Co., Ltd.); aryliodonium derivatives (for example, RP-2074 produced by Rodia Co., Ltd.); Arene-ion complexes (for example, Irgacure 261 produced by Ciba Geigy Co., Ltd.); diazonium salts; triazine type initiator; and halogenides. The photolytically acid generating agent content is preferably from 0.2 to 20 parts by weight of 100 parts by weight of cation polymerizable compound. The content less than 0.2 parts by weight provides a poor hardening property, and the content exceeding 20 parts by weight does not exhibit a further hardening property. These photolytically acid generating agents may be used singly or as a mixture of two or more kinds thereof.

The photolytically acid generating agent is preferably an onium salt such as a sulfonium salt, a iodonium salt, an ammonium salt, or a phosphonium salt, and more preferably a sulfonium salt.

The preferred sulfonium salt is a sulfonium salt represented by formula (I-1), (I-2), or (I-3) above.

In formula (I-1), $R_{11}$, $R_{12}$, and $R_{13}$ represent a substituent; m, n and p independently represent an integer of from 0 to 2; and $X_{11}^-$ represents a counter ion.

In formula (I-2), $R_{14}$ represents a substituent; q represents an integer of from 0 to 2; $R_{15}$ and $R_{16}$ independently represent a substituted or unsubstituted alkyl group, a substituted or unsubstituted alkenyl group, a substituted or unsubstituted alkinyl group, or a substituted or unsubstituted aryl group; and $X_{12}^-$ represents a counter ion.

In formula (I-3), $R_{17}$ represents a substituent; r represents an integer of from 0 to 3; $R_{18}$ represents a hydrogen atom, or a substituted or unsubstituted alkyl group; $R_{19}$ and $R_{20}$ independently represent a substituted or unsubstituted alkyl group, a substituted or unsubstituted alkenyl group, a substituted or unsubstituted alkinyl group, or a substituted or unsubstituted aryl group; and $X_{13}^-$ represents a counter ion.

Further explanation will be made as to a sulfonium salt represented by formula (I-1), (I-2) or (I-3).

In formula (I-1), $R_{11}$, $R_{12}$, and $R_{13}$ represent a substituent. Examples of the substituent include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, an n-butoxy group or a tert-butoxy group); an alkylthio group having a carbon atom number of from 1 to 6 (for example, a methylthio group, an ethylthio group, an n-propylthio group, an isopropylthio group, a n-butylthio group or a tert-butylthio group); an aryl group having a carbon atom number of from 6 to 14 (for example, a phenyl group, a naphthyl group or a anthracenyl group); an aryloxy group having a carbon atom number of from 6 to 10 (for example, a phenoxy group or a naphthoxy group); an arylthio group having a carbon atom number of from 6 to 10 (for example, a phenylthio group or a naphthylthio group); an acyl group (for example, an acetyl group, a propionyl group, a trifluoroacetyl group, or a benzoyl group); an acyloxy group (for example, an acetoxy group, a propionyloxy group, a trifluoroacetoxy group, or a benzoyloxy group); an alkoxycarbonyl group (for example, a methoxycarbonyl group, an ethoxycarbonyl group or a tert-butoxycarbonyl group); a hetero atom-containing aromatic group having a carbon atom number of from 4 to 8 (for example, a furyl group or a thienyl group); a nitro group; and a cyano group.

The preferred substituent is a halogen atom, an alkyl group, an alkyloxy group, an aryl group, an aryloxy group, an arylthio group or an acyl group. These substituents may have another substituent if possible. m, n and p independently represent an integer of from 0 to 2, and preferably 1 or more. $X_{11}^-$ represents a counter ion. Examples of the counter ion include a complex ion such as $BF_4^-$, $B(C_6F_5)_4^-$, $PF_6^-$, $AsF_6^-$, or $SbF_6^-$, and a sulfonate ion such as $p\text{-}CH_3C_6H_4SO_3^-$ or $CF_3SO_3^-$. The counter ion is preferably a borate ion or $PF_6^-$, in view of high acid generation capability.

In formula (I-2), $R_{14}$ represents a substituent. Examples of the substituent include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, a n-butoxy group or a tert-butoxy group); an alkylthio group having a carbon atom number of from 1 to 6 (for example, a methylthio group, an ethylthio group, an n-propylthio group, an isopropylthio group, a n-butylthio group or a tert-butylthio group); an aryl group having a carbon atom number of from 6 to 14 (for example, a phenyl group, a naphthyl group or a anthracenyl group); an aryloxy group having a carbon atom number of from 6 to 10 (for example, a phenoxy group or a naphthoxy group); an arylthio group having a carbon atom number of from 6 to 10 (for example, a phenylthio group or a naphthylthio group); an acyl group (for example, an acetyl group, a propionyl group, a trifluoroacetyl group, or a benzoyl group); an acyloxy group (for example, an acetoxy group, a propionyloxy group, a trifluoroacetoxy group, or a benzoyloxy group); an alkoxycarbonyl group (for example, a methoxycarbonyl group, an ethoxycarbonyl group or a tert-butoxycarbonyl group); a hetero atom-containing aromatic group having a carbon atom number of from 4 to 8 (for example, a furyl group or a thienyl group); a nitro group and a cyano group. The preferred substituent is a halogen atom, an alkyl group, an aryl group, an alkoxy group, or an aryloxy group. These substituents may have another substituent if possible. q represents an integer of from 0 to 2, preferably 1 or more, and more preferably 2.

$R_{15}$ and $R_{16}$ independently represent a substituted or unsubstituted alkyl group, a substituted or unsubstituted alkenyl group, a substituted or unsubstituted alkinyl group or a substituted or unsubstituted aryl group. Examples of the substituent include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, a n-butoxy group or a tert-butoxy group); an alkylthio group having a carbon atom number of from 1 to 6 (for example, a methylthio group, an ethylthio group, an n-propylthio group, an isopropylthio group, a n-butylthio group or a tert-butylthio group); an aryl group having a carbon atom number of from 6 to 14 (for example, a phenyl group, a naphthyl group or a anthracenyl group); an aryloxy group having a carbon atom number of from 6 to 10 (for example, a phenoxy group or a naphthoxy group); an arylthio group having a carbon atom number of from 6 to 10 (for example, a phenylthio group or a naphthylthio group); an acyl group (for example, an acetyl group, a propionyl group, a trifluoroacetyl group, or a benzoyl group); an acyloxy group (for example, an acetoxy group, a propionyloxy group, a trifluoroacetoxy group, or a benzoyloxy group); an alkoxycarbonyl group (for example, a methoxycarbonyl group, an ethoxycarbonyl group or a tert-butoxycarbonyl group); a hetero atom-containing aromatic group having a carbon atom number of from 4 to 8 (for example, a furyl group or a thienyl group); a nitro group; a cyano group; and a hydroxyl group. The preferred substituent is a halogen atom, an alkyl group, an alkoxy group, an aryloxy group, or an acyl group. These substituents may have another substituent if possible.

$R_{15}$ and $R_{16}$ independently represent preferably a substituted or unsubstituted alkyl group or a substituted or unsubstituted aryl group. The preferred substituent is a halogen atom, an alkyl group, an alkoxy group, an aryloxy group, an acyl group or a hydroxyl group.

$X_{12}^-$ represents a counter ion. Examples of the counter ion include a complex ion such as $BF_4^-$, $B(C_6F_5)_4^-$, $PF_6^-$, $AsF_6^-$, or $SbF_6^-$, and a sulfonate ion such as p-$CH_3C_6H_4SO_3^-$ or $CF_3SO_3^-$. The counter ion is preferably a borate ion or $PF_6^-$, in view of high acid generation capability.

In formula (I-3), $R_{17}$ represents a substituent. Examples of the substituent include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, a n-butoxy group or a tert-butoxy group); an aryl group having a carbon atom number of from 6 to 14 (for example, a phenyl group, a naphthyl group or a anthracenyl group); an acyl group (for example, an acetyl group, a propionyl group, a trifluoroacetyl group, or a benzoyl group); an acyloxy group (for example, an acetoxy group, a propionyloxy group, a trifluoroacetoxy group, or a benzoyloxy group); an alkoxycarbonyl group (for example, a methoxycarbonyl group, an ethoxycarbonyl group or a tert-butoxycarbonyl group); a hetero atom-containing aromatic group having a carbon atom number of from 4 to 8 (for example, a furyl group or a thienyl group); a nitro group and a cyano group. The preferred substituent is a halogen atom, an alkyl group, an alkoxy group, an aryl group, an aryloxy group, or an acyl group. r represents an integer of from 0 to 3, preferably 1 or more, and more preferably 2.

$R_{18}$ represents a hydrogen atom, or a substituted or unsubstituted alkyl group. $R_{19}$ and $R_{20}$ independently represent a substituted or unsubstituted alkyl group, a substituted or unsubstituted alkenyl group, a substituted or unsubstituted alkinyl group or a substituted or unsubstituted aryl group. Examples of the substituent include a halogen atom (for example, a chlorine atom, a bromine atom, or a fluorine atom); an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); an alkinyl group having a carbon atom number of from 2 to 6 (for example, an acetylenyl group, a 1-propinyl group, a 2-propinyl group, or a 2-butinyl group); an alkoxy group having a carbon atom number of from 1 to 6 (for example, a methoxy group, an ethoxy group, an n-propoxy group, an isopropoxy group, a n-butoxy group or a tert-butoxy group); an aryl group having a carbon atom number of from 6 to 14 (for example, a phenyl group, a naphthyl group or a anthracenyl group); an acyl group (for example, an acetyl group, a propionyl group, a trifluoroacetyl group, or a benzoyl group); an acyloxy group (for example, an acetoxy group, a propionyloxy group, a trifluoroacetoxy group, or a benzoyloxy group); an alkoxycarbonyl group (for example, a methoxycarbonyl group, an ethoxycarbonyl group or a tert-butoxycarbonyl group); a hetero atom-containing aromatic group having a carbon atom number of from 4 to 8 (for example, a furyl group or a thienyl group); a nitro group; and a cyano group. The preferred substituent is a halogen atom, an alkyl group, an alkoxy group, an aryl group, an aryloxy group, or an acyl group.

$R_{18}$ represents preferably a hydrogen atom or an unsubstituted lower alkyl group (for example, a methyl group, an ethyl group or a propyl group). $R_{19}$ and $R_{20}$ independently represent preferably a substituted or unsubstituted alkyl group or a substituted or unsubstituted aryl group. The preferred substituent is a halogen atom, an alkyl group, an alkoxy group, an aryloxy group, or an acyl group.

$X_{13}^-$ represents a counter ion. Examples of the counter ion include a complex ion such as $BF_4^-$, $B(C_6F_5)_4^-$, $PF_6^-$, $AsF_6^-$, or $SbF_6^-$, and a sulfonate ion such as p-$CH_3C_6H_4SO_3^-$ or $CF_3SO_3^-$. The counter ion is preferably a borate ion or $PF_6^-$, in view of high acid generation capability.

Examples of the sulfonium salts represented by formula (I-1), (I-2), or (I-3) will be listed below, but the invention is not limited thereto.

-continued
PI-1
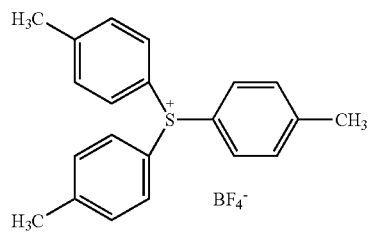
PI-6
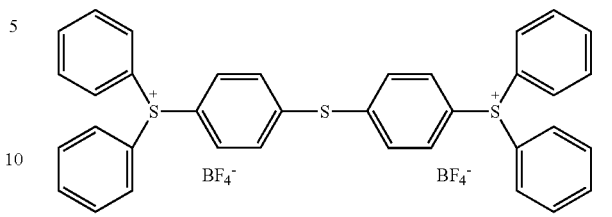
PI-2
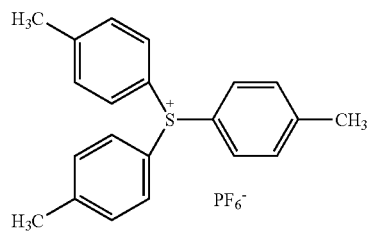
PI-7
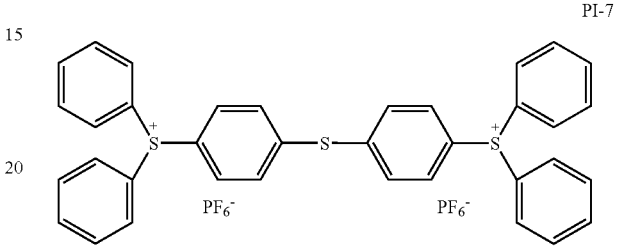
PI-3
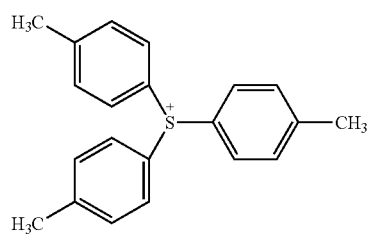
PI-8
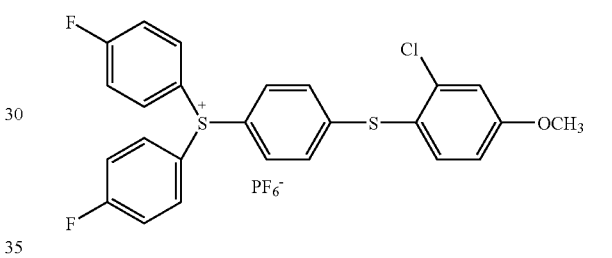
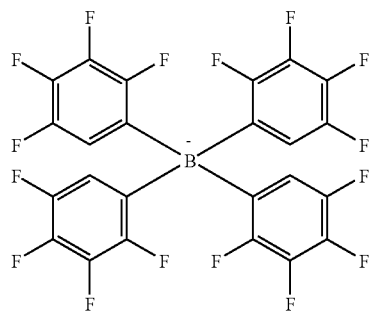
PI-9
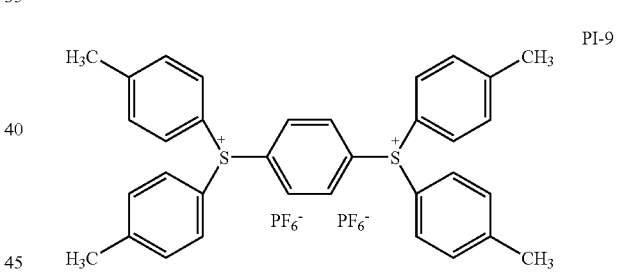
PI-4
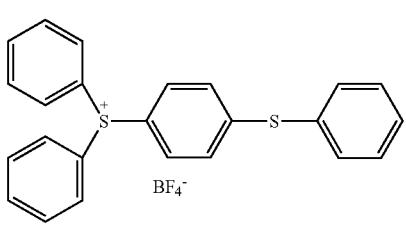
PI-10
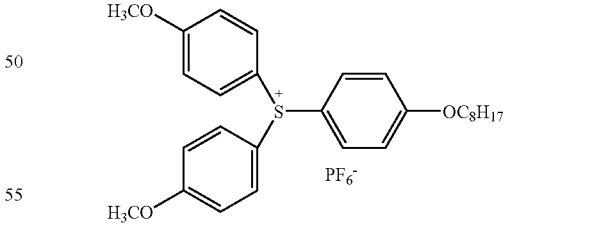
PI-5
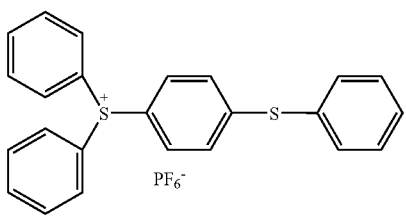
PI-11
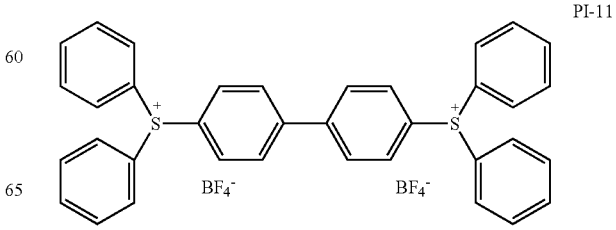

-continued

PI-12, PI-13, PI-14, PI-15, PI-16, PI-17, PI-18, PI-19, PI-20, PI-21, PI-22, PI-23, PI-24

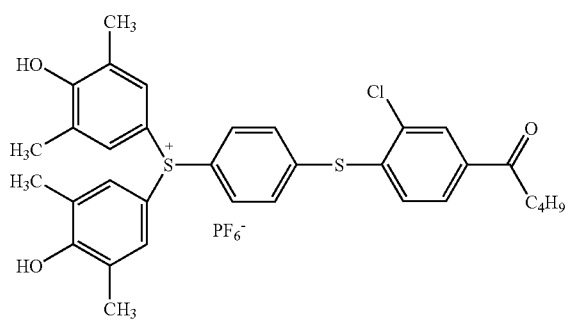
PI-25

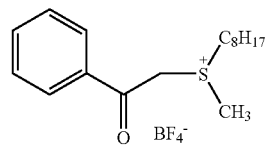
PI-26

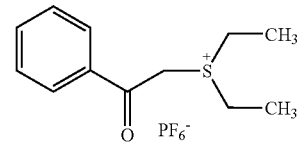
PI-27

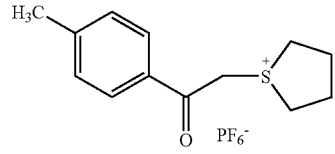
PI-28

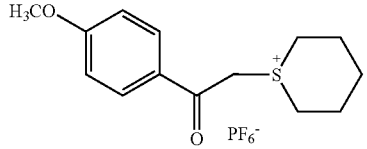
PI-29

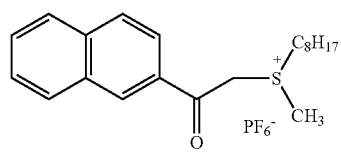
PI-30

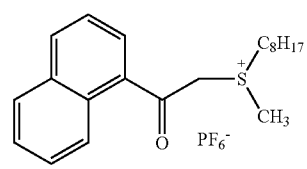
PI-31

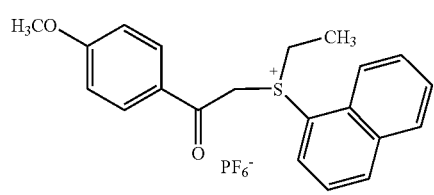
PI-32

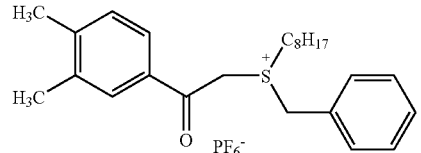
PI-33

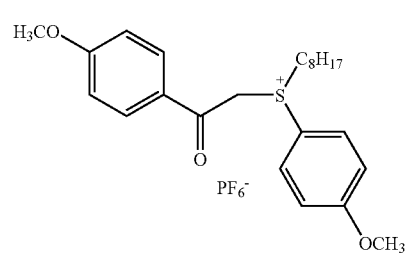
PI-34

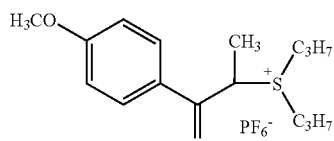
PI-35

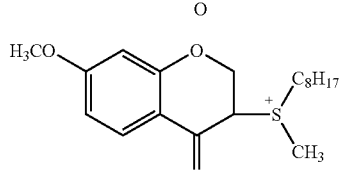
PI-36

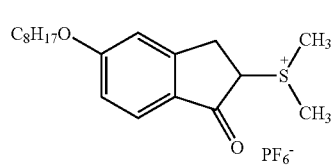
PI-37

Examples of a photopolymerization promoting agent include anthracene; anthracene derivatives (for example, Adekaoptomer SP-100 produced by Asahi Denka Kogyo Co., Ltd.); phenothiazine (10H-phenothiazine); and phenothiazine derivatives (for example, 10-methylphenothiazine, 10-ethylphenothiazine, 10-decylphenothiazine, 10-acetylphenothiazine, 10-decylphenothiazine-5-oxide, 10-decylphenothiazine-5,5-dioxide, or 10-acetylphenothiazine-5,5-dioxide). These photopolymerization promoting agents may be used singly or as a mixture of two or more kinds thereof.

The ink composition for ink jet recording can contain various additives in addition to the components described above.

As colorants used in the ink composition for ink jet recording of the invention, colorants capable of being dissolved or dispersed in a polymerizable compound can be used. Pigment is preferably used in view of weather resistance.

The colorant content of the ink composition for ink jet recording of the invention is preferably from 1 to 20% by weight, and more preferably from 3 to 10% by weight.

Pigments preferably utilized in the invention will be listed below:

C.I. Pigment Yellow-1,3, 12, 13, 14, 17, 81, 83, 87, 95, 109, 42,

C.I. Pigment Orange-16, 36, 38,

C.I. Pigment Red-5, 22, 38, 48:1, 48:2, 48:4, 49:1, 53:1, 57:1, 63:1, 144, 146, 185, 101, C.I. Pigment Violet-19, 23, C.I. Pigment Blue-15:1, 15:3, 15:4, 4, 18, 60, 27, 29, C.I. Pigment Green-7, 36, C.I. Pigment White-6, 18, 21, C.I. Pigment Black-7, To disperse the above-described pigment, for example, a ball mill, a sand mill, an attritor mill, a roll mill, an agitator, a Henshel mixer, a colloidal mixer, a ultrasonic homogenizer, a pearl mill, a wet jet mill, a paint shaker, etc. can be utilized. Further, a dispersant can be added at dispersion of a pigment. As a dispersant, a polymer dispersant is preferably utilized and Solsperse Series manufactured by Avecia Co. is included. Further, as a dispersion aid, a synergist corresponding to kinds of pigment can also be utilized. The dispersant and dispersion aid are preferably added in a range of from 1 to 50 weight parts based on 100 parts of a pigment. As a dispersion medium, a solvent or a polymerizable compound is utilized, however, the actinic ray curable ink used in the invention is preferably an ink containing no solvent, since curing is carried out immediately after the ink has been deposited on recording medium. When a solvent is left in the cured image, there cause problems of deterioration of resistance against solvents and VOC of residual solvent. Therefore, as a dispersion medium, not a solvent but a polymerizing compound, and a monomer having a low viscosity among them is preferably selected, in respect to dispersion suitability.

In dispersion of a pigment, selection of a pigment, a dispersant and a dispersion medium, dispersion conditions and filtering conditions are suitably set so as to make a mean particle diameter of a pigment of preferably from 0.08 to 0.5 μm and the maximum particle diameter of from 0.3 to 10 μm and preferably from 0.3 to 3 μl. By this particle diameter control, it is possible to depress clogging of a head nozzle and maintain stability of ink, as well as transparency and curing sensitivity of ink.

In the invention, thermo-base generation agents can be used for the purpose of improving ejection stability or storage stability of ink.

As thermo-base generation agents, preferably used are, for example, salts of organic acids with bases which are decarboxylated in decomposition by heating, compounds which decompose to release amines by reactions such as intermolecular nucreophilic substitution, Lossen rearrangement or Beckmann rearrangement, and compounds causing some sort of reaction to release a base by heating. Specifically listed are salts of trichloroacetic acid described in British Patent 998,949, salts of alpha-sulfonylacetic acid described in U.S. Pat. No. 4,060,420, salts of propyl acids and derivatives of 2-carboxycarboxamide described in JP-A 59-157637, salts of thermal decomposition acids using alkaline metals and alkaline-earth metals other than organic bases as basic components described in JP-A 59-168440, hydroxamcarbamates using Lossen rearrangement described in JP-A 59-180537, and aldoxymecarbamates generating nitrites by heating described in JP-A 59-195237. In addition to these, useful are thermo base generation agents described in British Patent 998,945, U.S. Pat. No. 3,220,846, British Patent 279,480, JP-A Nos. 50-22625, 61-32844, 61-51139, 61-52638, 61-51140, 61-53634-61-53640, 61-55644, and 61-55645.

Further examples of the thermo-base generation agents include guanidine trichloroacetate, methylguanidine trichloroacetate, potassium trichloroacetate, guanidine p-methanesulfonylphenylsulfonylacetate, guanidine p-chlorophenylsulfonylacetate, guanidine p-methanesulfonylphenylsulfonylacetate, potassium phenylpropyolate, guanidine phenylpropyolate, cesium phenylpropyolate, guanidine p-chlorophenylpropyolate, guanidine p-phenylene-bis-phenylpropylate, tetramethyl ammonium phenylsulfonylacetate, and tetramethyl ammonium phenylpropyolate. The thermo-base generation agents may be employed in the wide range.

The ink composition for ink jet recording of the invention can contain an acid increasing agent generating a new acid by an acid generated by irradiation of actinic rays, which is disclosed in Japanese Patent O.P.I. Publication Nos. 8-248561 and 9-34106.

The ink composition for ink jet recording of the invention can be prepared by dispersing pigment, an actinic ray curable compound and a dispersant for pigment in a conventional disperser such as a sand mill. It is preferred that a solution containing a high concentration of pigment prepared in advance is diluted with an actinic ray curable compound. A conventional disperser can be used. Therefore, neither excessive dispersion energy nor much dispersion time is necessary, and ink with excellent stability is obtained without causing deterioration of the ink components. It is preferred that the dispersed ink composition is filtered with a filter with a pore diameter of not more than 3 μm, and then with a filter with a pore diameter of not more than 1 μm.

The ink composition for ink jet recording of the invention has a viscosity at 25° C. of preferably from 5 to 50 Pa·s. Ink having a viscosity at 25° C. of from 5 to 50 Pa·s is stably ejected not only from a recording head with a normal frequency of 4 to 10 KHz but also from a recording head with a high frequency of 10 to 50 KHz. Ink having a viscosity at 25° C. of less than 5 Pa·s lowers a following property of ink ejection from a recording head with a high frequency, and ink having a viscosity at 25° C. exceeding 50 Pa·s lowers ink ejection stability, resulting in incapability of ejection, even if a recording head is provided with a viscosity decreasing mechanism for lowering ink viscosity such as a heater.

It is preferred that the ink composition for ink jet recording of the invention used in a piezo type recording head be adjusted to an electroconductivity of not more than 10 μS/cm so that the inside of the head is not corroded by ink the composition. It is preferred that the electroconductivity of the ink composition used in a continuous type recording head be adjusted by an electrolyte to not less than 0.5 mS/cm.

In the invention, the surface tension of the ink is preferably in the range of 25–40 mN/m at 25° C. When the surface tension of the ink is less than 25 mN/m at 25° C., it is difficult to achieve stable ink ejection. Ink having a surface tension falling outside the above range is extremely difficult to record dots with a uniform diameter on various recording mediums, even if the ink is ejected and photo-cured while controlling a moisture content or a viscosity of the ink.

In order to adjust the surface tension, if desired, surface active agents may be incorporated. Examples of surface active agents which are preferably employed in the present invention include anionic surface active agents such as dialkylsulfosuccinic acid salts, alkylnaphthalenesulfonic acid salts, and fatty acid salts; nonionic surface active agents such as polyoxyethylene alkyl ethers, polyoxyethylene alkyl allyl ethers, acetylene glycols, polyoxyethylene-polyoxypropylene block copolymers; cationic surface active agents such as alkylamine salts and quaternary ammonium salts; and surface active agents having a polymerizable group. Of these, specifically preferred are surface active agents having a polymerizable group such as an unsaturated bond, oxysilane, or an oxetane ring, for example, silicon modified acrylate, fluorine modified acrylate, silicon modified epoxide, fluorine modified epoxide, silicon modified oxetane, and fluorine modified oxetane. It is possible to obtain a radical-cation polymerizable hybrid curable ink by using a radical polymerization monomer and an initiator in combination.

The ink composition for ink recording of the invention can contain other additives other than the above. These include a leveling additive agent, a mat agent, and polyester resin polyurethane resin, vinyl resin, acrylic resin, rubber resin, or wax for adjusting the film property. In order to improve the adhesion to the recording medium, it is also effective that a slight amount of an organic solvent is added. In this case, the addition within the range that the problem of the solvent resistance or VOC is not generated, is effective, and the amount is 0.1–5 weight %, preferably 0.1–3 weight % of total ink weight.

In the image forming method of the invention, an ink composition is ejected onto a recording medium to form images. Subsequently, the resulting ink composition is exposed to actinic radiation such as ultraviolet radiation to cure the ink.

In the image forming method of the invention, it is preferable to decrease the viscosity of an ink composition by heating, during ink ejection, each of nozzles from which the ink is ejected. The heating temperature is commonly 30 to 80° C., and preferably 35 to 60° C.

In the invention, the thickness of an ink layer, after ink has been ejected onto a recording medium and cured by actinic ray irradiation, is preferably from 2 to 20 µm. In ink jet recording employing an actinic ray curable ink, the total thickness of the ink on the recording medium is at present over 20 µm in the screen printing field. Excessive ink cannot be ejected onto the recording medium in the flexible package printing field where a thin plastic film is used as recording medium, because problems are caused in that stiffness and texture of printed matter vary, in addition to problems of the aforementioned curl and wrinkles of the recording medium. In the invention, a volume of the photocurable ink droplets ejected from nozzles is preferably 2 to 15 pl.

In the invention, it is preferred that UV light irradiation timing is as early as possible in order to form an image with high resolution. The UV light irradiation is preferably started at a timing when the ink viscosity or moisture content is in a preferable state.

It is preferred that actinic ray is irradiated 0.001 to 2.0 seconds after ink has been ejected on recording medium, and it is more preferred that actinic ray is irradiated 0.001 to 1.0 second after ink has been ejected on recording medium. It is preferred that actinic ray irradiation has been carried out until ink fluidity is lost, and is completed in 0.1 to 3 seconds, preferably in 0.2 to 2 seconds. This can prevent undesired enlargement of dots or blurring of dots.

As an actinic ray irradiation method, a basic method is disclosed in JP-A No. 60-132767, in which light sources are provided at the both sides of a head unit where a head and a light are scanned in a shuttle mode. Irradiation is performed in a certain time interval after ink has been ejected onto recording medium. Further, curing is completed by another light source which is not driven. As a light irradiation method, a method utilizing optical fiber, and a method in which collimated light source is reflected by a mirror provided on the side surface of a head unit and UV light (ultraviolet light) is irradiated on a recording portion are disclosed in U.S. Pat. No. 6,145,979. In an image forming method of the invention, any of these irradiation methods can be utilized.

Further, a method is also a preferable embodiment, in which actinic ray irradiation is divided into two steps; firstly, a first actinic ray irradiation is carried between the period from 0.001 to 2.0 seconds after ink was deposited on recording medium by the above-described method and further a second actinic ray irradiation is carried after printing has been completed. Shrinkage of recording mediums caused at the time of ink curing can be depressed by dividing actinic ray irradiation into two steps.

Examples of a light source for actinic ray irradiation include a mercury arc lamp, a xenon arc lamp, a fluorescent lamp, a carbon arc lamp, a tungsten-halogen lamp, a high pressure mercury lamp, a metal halide lamp, a non-electrode UV lamp, a low pressure mercury lamp, a UV laser, a xenon flash lamp, an insect trap lamp, a black light, a germicidal lamp, a cold cathode tube, and an LED, to which the examples are not restricted. The fluorescent lamp is preferred in view of low energy and low cost. Light has a maximum emission wavelength in the range of preferably 250 to 370 nm, and more preferably 270 to 320 nm, in view of sensitivity. Light illumination intensity is 1 to 3000 mW/cm$^2$, and preferably 1 to 200 mW/cm$^2$. Ink can be ordinarily cured employing an electron beam having energy of not more than 300 eV, but can be also cured instantly by irradiation of 1 to 5 Mrad.

A printing image is recorded on a recording medium (hereinafter also referred to as a substrate) employing the ink composition of the invention for ink jet recording. As materials for the recording medium, conventional synthetic resins widely used for various use can be used. Examples of the resins include polyester, polyethylene, polyurethane, polypropylene, acryl resin, polycarbonate, polystyrene, acrylonitrile-butadiene-styrene copolymer, polyethylene terephthalate, and polybutadiene terephthalate. Thickness or form of these resins is not specifically limited.

As the recording medium used in the invention, ordinary non-coated paper or coated paper, or non-absorptive recording sheets can be utilized. Among them, non-absorptive recording sheets are preferred.

As the non-absorptive recording sheets used in the invention, various non-absorptive plastic films can be used. Examples of the plastic films include, for example, a PET (polyethylene terephthalate) film, an OPS film, an OPP film, an ONy film, a PVC film, a PE film and a TAC film. Plastic films other than these, polycarbonate, acryl resin, ABS, polyacetal, PVA and a rubber series can be utilized. A metal series and a glass series are also applicable. The invention is effective especially in forming an image on a PET film, an OPS film, an OPP film, an ONy film or a PVC film, which are capable of thermal shrinking, among the above recording films. These films are liable to cause curl and deformation of film due to such as curing shrinkage of ink or heat accompanied with curing reaction of ink, and, in addition, the formed ink layer is hard to follow shrinkage of the films.

Plastic films greatly differ in surface energy depending on the kinds, and heretofore, there has been a problem in that the ink dot diameter after ink deposition on recording medium varies depending on the kinds of the recording mediums. The recording mediums used in the invention ranges from an OPP or OPS film each having a low surface energy to a PET film having a relatively high surface energy. In the invention, the recording mediums have a surface energy of preferably from 40 to 60 mN/m.

In the invention, a long length web recording medium is advantageously used in view of recording medium cost such as production cost and packaging cost, image recording efficiency, or adaptability to various sizes of prints.

EXAMPLES

The invention will now be described with reference to examples, however, the embodiments of the invention are not limited thereto.

<<Preparation of Ink for Ink Jet Recording>>

(Preparation of Magenta Ink 1)

Magenta Ink 1 comprising the composition described below was prepared as follows. A mixture of components except for a photolytically acid generating agent was dispersed for 4 hours, employing a sand grinder. Thereafter, the photolytically acid generating agent was added. After filtering the resulting mixture employing a 0.8 μm pore membrane filter, vacuum dehydration was carried out while heated to 50° C. Thus, Magenta Ink 1 was prepared.

| | |
|---|---|
| C.I. Pigment Red 184 | 3 weight parts |
| Oxetane compound A | 20 weight parts |
| Aron oxetane OXT221 | 80 weight parts |
| Solsperse 24000 (manufactured by Avecia) | 1 weight part |
| UVI-6990 | 5 weight parts |

(Preparation of Magenta Inks 2 through 20)

Magenta Inks 2 through 20 were prepared in the same manner as in Magenta Ink 1 above, except that pigment, an epoxy compound, an oxetane compound and a photolytically acid generating agent as shown in Table 1 were used.

Details of the components described in Table 1 is as follows:

<Pigments>

P0: C.I. Pigment Red 184

P1: Crude copper phthalocyanine ("Copper phthalocyanine" produced by Toyo Ink Manufacturing Co., Ltd.) of 250 parts, 2500 parts of sodium chloride, and 160 parts of polyethylene glycol (Polyethylene glycol 300 produced by Tokyo Kasei Co., Ltd.) were placed in a 4.55 liter (1 gallon) polystyrene kneader (produced by Inoue Seisakusho o., Ltd.) and kneaded for 3 hours. The resulting mixture was poured into a 2.5 liter hot water, and stirred in a high speed mixer at about 80° C. for about one hour to obtain a slurry. The resulting slurry was filtered off, washed with water 5 times to eliminate the sodium chloride and the solvent, and dried employing a spray drying method. Thus, Pigment P1 was obtained.

P2: Quinacridone type red pigment ("Cincasia Magenta RT-355-D" produced by Ciba Geigy Co., Ltd.) of 250 parts, 2500 parts of sodium chloride, and 160 parts of polyethylene glycol (Polyethylene glycol 300 produced by Tokyo Kasei Co., Ltd.) were placed in a 4.55 liter (1 gallon) polystyrene kneader (produced by Inoue Seisakusho o., Ltd.). The resulting mixture was processed in the same manner as in P1 above. Thus, Pigment P2 was obtained.

<Epoxy Compounds]

Celoxide 3000: Alicyclic epoxide (produced by Daiseru UCB)

Celoxide 2021P: Alicyclic epoxide (produced by Daiseru UCB)

TABLE 1

| Ink No. | Pigment Kind | Epoxy compound Kind | *1 | Oxetane compound Kind | *1 | Kind | *1 | Photolytically acid generating agent Kind | *1 |
|---|---|---|---|---|---|---|---|---|---|
| 1 | P0 | 3.0 None | — | OXT221 | 80.0 | Oxetane compound A | 20.0 | UVI6990 | 5.0 |
| 2 | P0 | 3.0 Celoxide 3000 | 30.0 | OXT221 | 70.0 | None | — | UVI6990 | 5.0 |
| 3 | P0 | 3.0 Celoxide 2021P | 30.0 | OXT221 | 70.0 | None | — | UVI6990 | 5.0 |
| 4 | P0 | 3.0 Celoxide 3000 | 30.0 | OXT221 | 60.0 | Oxetane compound A | 10.0 | UVI6990 | 5.0 |
| 5 | P0 | 3.0 Celoxide 2021P | 30.0 | OXT221 | 65.0 | Oxetane compound A | 5.0 | UVI6990 | 5.0 |
| 6 | P0 | 3.0 Celoxide 3000 | 20.0 | OXT221 | 60.0 | Compound I-7 | 20.0 | UVI6990 | 5.0 |
| 7 | P0 | 3.0 Celoxide 2021P | 30.0 | OXT221 | 60.0 | Compound I-7 | 10.0 | SP-152 | 5.0 |
| 8 | P0 | 3.0 EP-2 | 30.0 | OXT221 | 65.0 | Compound I-7 | 5.0 | PI-10 | 5.0 |
| 9 | P0 | 3.0 Celoxide 3000 | 20.0 | OXT221 | 60.0 | Compound II-7 | 20.0 | PI-2 | 5.0 |
| 10 | P0 | 3.0 Celoxide 2021P | 30.0 | OXT221 | 60.0 | Compound II-7 | 10.0 | UVI6990 | 5.0 |
| 11 | P0 | 3.0 EP-9 | 30.0 | OXT221 | 65.0 | Compound II-7 | 5.0 | SP-152 | 5.0 |
| 12 | P1 | 4.0 Celoxide 3000 | 20.0 | OXT221 | 60.0 | Compound III-1 | 20.0 | PI-2 | 5.0 |
| 13 | P1 | 4.0 Celoxide 2021P | 30.0 | OXT221 | 60.0 | Compound III-1 | 10.0 | PI-29 | 5.0 |
| 14 | P1 | 4.0 EP-10 | 30.0 | OXT221 | 65.0 | Compound III-1 | 5.0 | SP-152 | 5.0 |
| 15 | P2 | 4.0 Celoxide 3000 | 25.0 | OXT221 | 65.0 | Compound IV-1 | 10.0 | PI-2 | 5.0 |
| 16 | P2 | 4.0 Celoxide 2021P | 30.0 | OXT221 | 65.0 | Compound IV-1 | 5.0 | UVI6990 | 5.0 |
| 17 | P2 | 4.0 EP-23 | 32.0 | OXT221 | 66.0 | Compound IV-1 | 2.0 | SP-152 | 5.0 |
| 18 | P2 | 4.0 Celoxide 3000 | 25.0 | OXT221 | 65.0 | Compound V-6 | 10.0 | PI-10 | 5.0 |
| 19 | P2 | 4.0 Celoxide 2021P | 30.0 | OXT221 | 65.0 | Compound V-6 | 5.0 | PI-29 | 5.0 |
| 20 | P2 | 4.0 EP-26 | 32.0 | OXT221 | 66.0 | Compound V-6 | 2.0 | SP-152 | 5.0 |

*1 Addition amount (parts by weight)
Celoxide 2021P = EP-1,
Celoxide 3000 = EP-27

<Photolytically Acid Generating Agent>
SP-152: Triphenyl sulfonium salt (Adekaoptomer SP-152 produced by Asahi Denka)
UVI-6990: Triphenyl sulfonium salt (Silacure UVI-6990 produced by Union Carbide)

<Oxetane Compound>
OXT-211: Di[1-ethyl(3-oxetanyl)]methyl ether (produced by TOAGOSEI Co., Ltd.)
Oxetane compound A: 2-(4-methoxyphenyl)-3,3-dimethyloxetane (oxetane described in Japanese Patent O.P.I. Publication No. 2001-181386)

<<Ink Jet Image Recording and Evaluation>>

By employing each of the magenta inks prepared as above, image recording was carried out as follows, and the resulting images were evaluated according to the methods described below.

(Image Evaluation A)

(Image Recording)

Each of the magenta inks prepared as above was ejected as ink droplets with a volume of 7 pl onto a polyethylene terephthalate film substrate, which had been subjected to corona discharge treatment, from piezo type ink-jet nozzles (having a nozzle pitch of 360 dpi; dpi, as described in the present invention, refers to the number of dots per inch or 2.54 cm) while heating the nozzle section to 50° C., whereby a solid magenta image and 6-point MS Ming-cho type characters were formed on the substrate. Subsequently, employing as a light source a fluorescent tube having a 308 nm peak, exposure was initiated 0.2 second and completed 0.7 second after ink had been ejected on the substrate, the illuminance on the substrate surface right under the light source being 10 mW/cm². Incidentally, the exposure energy was 5 mJ/cm². The above image recording was performed at a low humidity ambience (25° C. and 20% RH) as well as at a high humidity ambience (25° C. and 80%).

(Image Evaluation)

Each image formed above was subjected to the evaluation described below.

<Evaluation of Ink Curability>

The ink curability of each of the recorded images formed under the different ambiences was evaluated according to the following criteria.
A: No tackiness was noted by touching the image immediately after exposure
B: Slight tackiness was noted by touching the image immediately after exposure, but no tackiness was noted one minute after exposure
C: Tackiness was noted even one minute after exposure <Evaluation of Adhesion of Ink to Substrate>

A 25 mm wide Cellotape R was adhered onto the solid image formed under different ambiences, and strongly pressed. Thereafter, the adhered Cellotape was rapidly pulled at a peeling angle of 90 degrees and the state of the images after peeling was visually observed. The adhesion of ink to substrate was then evaluated according to the following criteria.
A: No image was peeled away by pulling the tape
B: Some part of the image was peeled away by pulling the tape
C: The entire image was peeled away by pulling the tape <Evaluation of Image Bleeding Resistance>

The 6-point MS Ming-cho type characters formed under each ambience were observed employing a magnifying glass. The state of dots adjacent to each other was observed and the image bleeding resistance was evaluated according to the following criteria.
A: Almost no bleeding was noticed between two dots adjacent to each other
B: Slight bleeding was noticed between two dots adjacent to each other
C: Marked bleeding was noticed in the dots The results are shown in Table 2.

TABLE 2

| Ink No. | Recording ambience (% RH) | Ink Curability | Ink adhesion to substrate | Image Bleeding Resistance | Remarks |
|---|---|---|---|---|---|
| 1 | 20 | A | A | A | Comp. |
| 1 | 80 | A | A | B | Comp. |
| 2 | 20 | A | A | A | Comp. |
| 2 | 80 | B | B | B | Comp. |
| 3 | 20 | A | A | A | Comp. |
| 3 | 80 | B | B | B | Comp. |
| 4 | 20 | A | A | A | Comp. |
| 4 | 80 | A | A | B | Comp. |
| 5 | 20 | A | A | A | Comp. |
| 5 | 80 | B | B | C | Comp. |
| 6 | 20 | A | A | A | Inv. |
| 6 | 80 | A | A | A | Inv. |
| 7 | 20 | A | A | A | Inv. |
| 7 | 80 | A | A | A | Inv. |
| 8 | 20 | A | A | A | Inv. |
| 8 | 80 | B | A | B | Inv. |
| 9 | 20 | A | A | A | Inv. |
| 9 | 80 | A | A | A | Inv. |
| 10 | 20 | A | A | A | Inv. |
| 10 | 80 | A | A | A | Inv. |
| 11 | 20 | A | A | A | Inv. |
| 11 | 80 | B | A | B | Inv. |
| 12 | 20 | A | A | A | Inv. |
| 12 | 80 | A | A | A | Inv. |
| 13 | 20 | A | A | A | Inv. |
| 13 | 80 | A | A | A | Inv. |
| 14 | 20 | A | A | A | Inv. |
| 14 | 80 | A | A | A | Inv. |
| 15 | 20 | A | A | A | Inv. |
| 15 | 80 | A | A | A | Inv. |
| 16 | 20 | A | A | A | Inv. |
| 16 | 80 | A | A | A | Inv. |
| 17 | 20 | A | A | A | Inv. |
| 17 | 80 | A | A | A | Inv. |
| 18 | 20 | A | A | A | Inv. |
| 18 | 80 | A | A | A | Inv. |
| 19 | 20 | A | A | A | Inv. |
| 19 | 80 | A | A | A | Inv. |
| 20 | 20 | A | A | A | Inv. |
| 20 | 80 | A | A | A | Inv. |

Comp.: Comparative,
Inv.: Inventive

[Image Evaluation B]

Image recording and evaluation were carried out in the same manner as in Image evaluation A above, except that the exposure was initiated 0.6 seconds and completed 1.1 seconds after ink had been ejected on the substrate.

The results are shown In Table 3.

TABLE 3

| Ink No. | Recording ambience (% RH) | Evaluation Result | | | Remarks |
|---|---|---|---|---|---|
| | | Ink Curability | Ink adhesion to substrate | Image Bleeding Resistance | |
| 1 | 20 | A | A | B | Comp. |
| 1 | 80 | B | B | C | Comp. |
| 2 | 20 | A | B | B | Comp. |
| 2 | 80 | C | C | C | Comp. |
| 3 | 20 | A | B | B | Comp. |
| 3 | 80 | C | C | C | Comp. |
| 4 | 20 | A | A | A | Comp. |
| 4 | 80 | B | B | C | Comp. |
| 5 | 20 | A | B | B | Comp. |
| 5 | 80 | C | C | C | Comp. |
| 6 | 20 | A | A | A | Inv. |
| 6 | 80 | B | A | A | Inv. |
| 7 | 20 | A | A | A | Inv. |
| 7 | 80 | B | A | A | Inv. |
| 8 | 20 | A | A | A | Inv. |
| 8 | 80 | B | A | B | Inv. |
| 9 | 20 | A | A | A | Inv. |
| 9 | 80 | B | A | A | Inv. |
| 10 | 20 | A | A | A | Inv. |
| 10 | 80 | B | A | A | Inv. |
| 11 | 20 | A | A | A | Inv. |
| 11 | 80 | B | A | B | Inv. |
| 12 | 20 | A | A | A | Inv. |
| 12 | 80 | A | A | B | Inv. |
| 13 | 20 | A | A | A | Inv. |
| 13 | 80 | B | A | B | Inv. |
| 14 | 20 | A | A | A | Inv. |
| 14 | 80 | B | A | A | Inv. |
| 15 | 20 | A | A | A | Inv. |
| 15 | 80 | A | A | B | Inv. |
| 16 | 20 | A | A | A | Inv. |
| 16 | 80 | B | A | B | Inv. |
| 17 | 20 | A | A | A | Inv. |
| 17 | 80 | B | A | A | Inv. |
| 18 | 20 | A | A | A | Inv. |
| 18 | 80 | A | A | B | Inv. |
| 19 | 20 | A | A | A | Inv. |
| 19 | 80 | B | A | B | Inv. |
| 20 | 20 | A | A | A | Inv. |
| 20 | 80 | B | A | A | Inv. |

Comp.: Comparative,
Inv.: Inventive

As is apparent from Tables 2 and 3, inks comprising the oxetane compound of the present invention provide excellent ink curability as well as excellent adhesion to substrate and high quality images without bleeding under a high humidity ambience or under various exposure conditions, as compared to the comparative examples.

EFFECTS OF THE INVENTION

The present invention can provide an oxetane compound, an actinic ray curable composition, and an ink composition for ink jet recording, which provide excellent curability, excellent adhesion to a substrate, and high quality images with no bleeding, without being influenced by ambient humidity, even when exposure is carried out employing a light source with a low light intensity, and to provide an image formation method employing the ink composition for ink jet recording.

The invention claimed is:

1. An oxetane compound represented by the following formula (I), (II), (III), (IV) or (V):

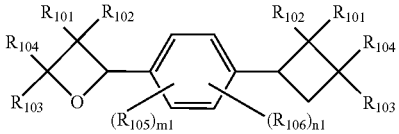

Formula (I)

wherein $R_{101}$ through $R_{104}$ independently represent a hydrogen atom, a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an acyl group, an acyloxy group, an alkoxycarbonyl group, or an aryloxycarbonyl group;

$R_{105}$ represents a substituted or unsubstituted alkoxy group or a substituted or unsubstituted aryloxy group; m1 represents an integer of 0 to 2; $R_{106}$ represents a halogen atom or a substituted or unsubstituted alkyl group having a carbon atom number of from 1 to 6; and n1 represents an integer of 0 to 3,

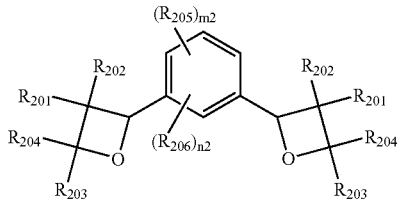

Formula (II)

wherein $R_{201}$ through $R_{204}$ independently represent a hydrogen atom, a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an acyl group, an acyloxy group, an alkoxycarbonyl group, or an aryloxycarbonyl group;

$R_{205}$ represents a substituted or unsubstituted alkoxy group or a substituted or unsubstituted aryloxy group; m2 represents an integer of 0 to 2; $R_{206}$ represents a halogen atom or a substituted or unsubstituted alkyl group having a carbon atom number of from 1 to 6; and n2 represents an integer of 0 to 3,

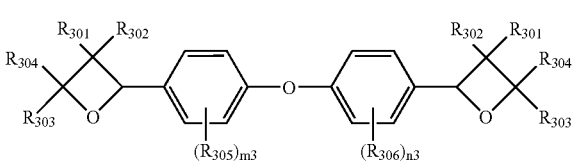

Formula (III)

wherein $R_{301}$ through $R_{304}$ independently represent a hydrogen atom, a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an acyl group, an acyloxy group, an alkoxycarbonyl group, or an aryloxycarbonyl group;

$R_{305}$ through $R_{306}$ independently represent a halogen atom, an alkyl group having a carbon atom number of from 1 to 6, an alkoxy group having a carbon atom number of from 1 to 6, an acyl group, an acyloxy group or an alkoxycarbonyl group; and m3 and n3 independently represent an integer of 0 to 4,

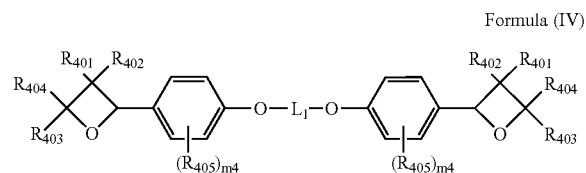

Formula (IV)

wherein $R_{401}$ through $R_{404}$ independently represent a hydrogen atom, a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an acyl group, an acyloxy group, an alkoxycarbonyl group, or an aryloxycarbonyl group;

$R_{405}$ represents a halogen atom, an alkyl group having a carbon atom number of from 1 to 6, an alkoxy group having a carbon atom number of from 1 to 6, an acyl group or an acyloxy group; m4 represents an integer of 0 to 4; and $L_1$ represents a divalent linkage group having a carbon atom number of from 1 to 15, provided that the divalent group may contain an oxygen atom or a sulfur atom in the main chain of the divalent group,

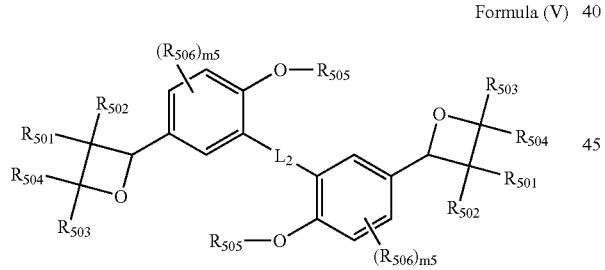

Formula (V)

wherein $R_{501}$ through $R_{504}$ independently represent a hydrogen atom, a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an acyl group, an acyloxy group, an alkoxycarbonyl group, or an aryloxycarbonyl group;

$R_{505}$ represents a substituted or unsubstituted alkyl group; $R_{506}$ represents a halogen atom, an alkyl group having a carbon atom number of from 1 to 6 or an alkoxy group having a carbon atom number of from 1 to 6; m5 represents an integer of 0 to 3; and $L_2$ represents an oxygen atom or a divalent linkage group having a carbon atom number of from 1 to 15, provided that the divalent group may contain an oxygen atom or a sulfur atom in the main chain of the of the divalent group.

2. The oxetane compound of claim 1, wherein in formula (I) $R_{101}$ and $R_{102}$ are not simultaneously hydrogens, in formula (II) $R_{201}$ and $R_{202}$ are not simultaneously hydrogens, in formula (III) $R_{301}$ and $R_{302}$ are not simultaneously hydrogens, in formula (IV) $R_{401}$ and $R_{402}$ are not simultaneously hydrogens, and in formula (V) $R_{501}$ and $R_{502}$ are not simultaneously hydrogens.

3. The oxetane compound of claim 1, wherein in formula (I) $R_{101}$ and $R_{102}$ independently represent a substituted or unsubstituted alkyl group, in formula (II) $R_{201}$ and $R_{202}$ independently represent a substituted or unsubstituted alkyl group, in formula (III) $R_{301}$ and $R_{302}$ independently represent a substituted or unsubstituted alkyl group, in formula (IV) $R_{401}$ and $R_{402}$ independently represent a substituted or unsubstituted alkyl group, and in formula (V) $R_{501}$ and $R_{502}$ independently represent a substituted or unsubstituted alkyl group.

4. An actinic ray curable composition containing a compound generating an acid on irradiation of actinic ray and the oxetane compound of claim 1 represented by formula (I), (II), (III), (IV) or (V).

5. The actinic ray curable composition of claim 4, wherein the compound generating an acid on irradiation of actinic ray is an onium salt.

6. The actinic ray curable composition of claim 5, wherein the onium salt is a sulfonium salt.

7. The actinic ray curable composition of claim 6, wherein the sulfonium salt is represented by the following formula (I-1), (I-2) or (I-3):

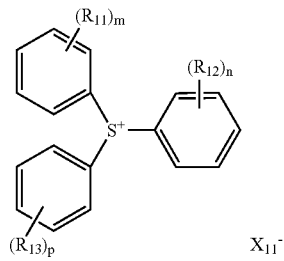

Formula (I-1)

wherein $R_{11}$, $R_{12}$ and $R_{13}$ independently represent a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an alkylthio group having a carbon atom number of from 1 to 6, an aryl group having a carbon atom number of from 6 to 14, an aryloxy group having a carbon atom number of from 6 to 10, an arylthio group having a carbon atom number of from 6 to 10, an acyl group, an acyloxy group, an alkoxycarbonyl group, a hetero atom-containing aromatic group having a carbon atom number of from 4 to 8, a nitro group or a cyano group: m, p, and n independently represent an integer of from 0 to 2; and $X^-_{11}$ represents a counter ion, Formula (I-2)

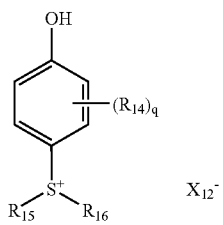

wherein R$_{14}$ represents a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an alkylthio group having a carbon atom number of from 1 to 6, an aryl group having a carbon atom number of from 6 to 14, an aryloxy group having a carbon atom number of from 6 to 10, an arylthio group having a carbon atom number of from 6 to 10, an acyl group, an acyloxy group, an alkoxycarbonyl group, a hetero atom-containing aromatic group having a carbon atom number of from 4 to 8, a nitro group or a cyano group: q represents an integer of from 0 to 2; R$_{15}$ and R$_{16}$ independently represent a substituted or unsubstituted alkyl group, a substituted or unsubstituted alkenyl group, a substituted or unsubstituted alkinyl group or a substituted or unsubstituted aryl group; and X$^-_{12}$ represents a counter ion, Formula (I-3)

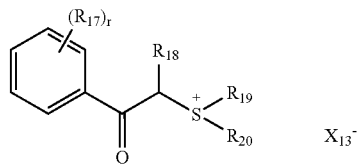

wherein R$_{17}$ represents a halogen atom, an alkyl group having a carbon atom number of from 1 to 6, a cycloalkyl group having a carbon number of from 3 to 6, an alkenyl group having a carbon atom number of from 2 to 6, an alkinyl group having a carbon atom number of from 2 to 6, an alkoxy group having a carbon atom number of from 1 to 6, an aryl group having a carbon atom number of from 6 to 14, an acyl group, an acyloxy group, an alkoxycarbonyl group, a hetero atom-containing aromatic group having a carbon atom number of from 4 to 8, a nitro group or a cyano group;

r represents an integer of from 0 to 3; R$_{18}$ represents a hydrogen atom or a substituted or unsubstituted alkyl group; R$_{19}$ and R$_{20}$ independently represent a substituted or unsubstituted alkyl group, a substituted or unsubstituted alkenyl group, a substituted or unsubstituted alkinyl group or a substituted or unsubstituted aryl group; and X$^-_{13}$ represents a counter ion.

8. An ink composition for ink jet recording comprising a compound generating an acid on irradiation of actinic ray and the oxetane compound of claim 1 represented by formula (I), (II), (III), (IV) or (V).

9. The ink composition for ink jet recording of claim 8, further containing an oxetane compound having no substituent at the 2-position of an oxetane ring in the molecule.

10. The ink composition for ink jet recording of claim 8, further containing a vinyl ether compound.

11. The ink composition for ink jet recording of claim 9, further containing an epoxy compound.

12. The ink composition for ink jet recording of claim 11, wherein the epoxy compound is an alicyclic epoxy compound represented by the following formula (VI), (VII), or (VIII), Formula (VI)

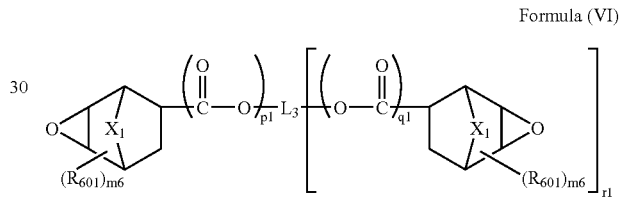

wherein R$_{601}$ represents an aliphatic group; m6 represents an integer of from 0 to 2; X$_1$ represents —(CH$_2$)$_{n6}$— or —(O)$_{n6}$—, in which n6 represents an integer of 0 or 1; p1 and q1 independently represent an integer of from 0 or 1; r1 represents an integer of from 1 to 3; L$_3$ represents a simple bond or a (r1+1)—valent linkage group having a carbon atom number of from 1 to 15, provided that the (r1+1)—valent linkage group may contain an oxygen atom or a sulfur atom in the main chain of the linkage group, Formula (VII)

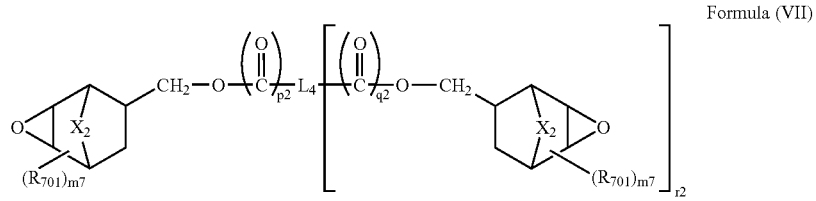

wherein R$_{701}$ represents an aliphatic group; m7 represents an integer of from 0 to 2; X$_2$ represents —(CH$_2$)$_{n7}$— or —(O)$_{n7}$—, in which n7 represents an integer of 0 or 1; p2 and q2 independently represent an integer of from 0 or 1; r2 represents an integer of from 1 to 3; L$_4$ represents a simple bond or a (r2+1) valent linkage group having a carbon atom number of from 1 to 15, provided that the (r2+1)—valent linkage group may contain an oxygen atom or a sulfur atom in the main chain of the linkage group,

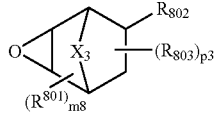

Formula (VIII)

wherein $R_{801}$ represents an aliphatic group; m8 represents an integer of from 0 to 2; $X_3$ represents —$(CH_2)_{n8}$— or —$(O)_{n8}$—, in which n8 represents an integer of 0 or 1; $R_{802}$ and $R_{803}$ represent a halogen atom, an alkyl group having a carbon atom number of from 1 to 8, an alkoxy group having a carbon atom number of from 1 to 8, an acyl group, an acyloxy group, or an alkoxycarbonyl group; and p3 represents an integer of from 0 or 1.

13. The ink composition for ink jet recording of claim 11, wherein the composition contains the oxetane compound having no substituent at the 2-position of an oxetane ring in the molecule in an amount of from 50 to 80 parts by weight, the epoxy compound in an amount of from 0 to 50 parts by weight, and the oxetane compound represented by formula (I), (II), (III), (IV) or (V) in an amount of from 1 to 20 parts by weight.

14. An image formation method employing the ink composition for ink jet recording of claim 8, the method comprising the steps of ejecting the ink composition as ink droplets from a recording head onto a recording medium to form an ink image, the recording head comprising at least one nozzle capable of selectively ejecting the ink droplets; and exposing the resulting ink image to actinic ray to cure the ink.

* * * * *